(12) United States Patent
Dai et al.

(10) Patent No.: US 10,979,875 B2
(45) Date of Patent: Apr. 13, 2021

(54) SYSTEM AND METHOD FOR WIRELESS INTERFACE SELECTION AND FOR COMMUNICATION AND ACCESS CONTROL OF SUBSYSTEMS, DEVICES, AND DATA IN A VEHICULAR ENVIRONMENT

(71) Applicant: Cisco Technology, Inc., San Jose, CA (US)

(72) Inventors: Lillian Lei Dai, Rockville, MD (US); Sateesh K. Addepalli, San Jose, CA (US); Xiaoqing Zhu, Mountain View, CA (US); Preethi Natarajan, Los Gatos, CA (US); Rong Pan, Sunnyvale, CA (US); Fabio R. Maino, Palo Alto, CA (US); Flavio Bonomi, Palo Alto, CA (US); Alexander Loukissas, San Francisco, CA (US); Vina Ermagan, San Jose, CA (US); Pere Monclus, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 16 days.

(21) Appl. No.: 16/128,027

(22) Filed: Sep. 11, 2018

(65) Prior Publication Data
US 2019/0020985 A1    Jan. 17, 2019

Related U.S. Application Data

(62) Division of application No. 14/485,050, filed on Sep. 12, 2014, now Pat. No. 10,117,066, which is a
(Continued)

(51) Int. Cl.
*H04W 4/40* (2018.01)
*H04W 76/45* (2018.01)
(Continued)

(52) U.S. Cl.
CPC ............. *H04W 4/40* (2018.02); *B60R 16/023* (2013.01); *B60W 50/10* (2013.01); *G06F 3/017* (2013.01);
(Continued)

(58) Field of Classification Search
None
See application file for complete search history.

(56) References Cited

U.S. PATENT DOCUMENTS

| 5,428,666 A | 6/1995 | Fyfe et al. |
| 5,604,787 A | 2/1997 | Kotzin et al. |

(Continued)

FOREIGN PATENT DOCUMENTS

| WO | WO 92/19078 | 10/1992 |
| WO | WO 99/24938 | 5/1999 |

(Continued)

OTHER PUBLICATIONS 802.3, "Part 3: Carrier Sense Multiple Access with Collision Detection (CSMA/CD) Access Method and Physical Layer Specifications" IEEEXPLORE, Oct. 27, 2010, all pages.
(Continued)

*Primary Examiner* — Jutai Kao

(57) ABSTRACT

A method in one embodiment includes intercepting a message in an on-board unit (OBU) of a vehicular network environment between a source and a receiver in the vehicular network environment, verifying the message is sent from the source, verifying the message is not altered, evaluating a set of source flow control policies associated with the source, and blocking the message if the set of source flow control policies indicate the message is not permitted. In specific embodiments, the message is not permitted if a level of access assigned to the source in the set of source flow control policies does not match a level of access tagged on
(Continued)

the message. In further embodiments, the method includes evaluating a set of receiver flow control policies associated with the receiver, and blocking the message if the set of receiver flow control policies indicates the message is not permitted.

20 Claims, 24 Drawing Sheets

Related U.S. Application Data division of application No. 13/071,367, filed on Mar. 24, 2011, now Pat. No. 8,848,608.

(60) Provisional application No. 61/433,138, filed on Jan. 14, 2011.

(51) Int. Cl.

| | | |
|---|---|---|
| *H04W 52/12* | (2009.01) | |
| *H04W 28/06* | (2009.01) | |
| *H04L 12/26* | (2006.01) | |
| *H04W 12/00* | (2021.01) | |
| *H04W 72/04* | (2009.01) | |
| *G06F 9/54* | (2006.01) | |
| *H04W 48/06* | (2009.01) | |
| *H04W 48/18* | (2009.01) | |
| *B60W 50/10* | (2012.01) | |
| *G06F 3/01* | (2006.01) | |
| *G06F 3/16* | (2006.01) | |
| *G06F 21/45* | (2013.01) | |
| *H04W 28/02* | (2009.01) | |
| *H04W 40/20* | (2009.01) | |
| *H04W 48/02* | (2009.01) | |
| *H04L 29/06* | (2006.01) | |
| *H04L 29/08* | (2006.01) | |
| *B60R 16/023* | (2006.01) | |
| *H04L 12/721* | (2013.01) | |
| *H04L 29/12* | (2006.01) | |
| *H04W 8/06* | (2009.01) | |
| *H04W 8/08* | (2009.01) | |
| *H04W 8/26* | (2009.01) | |
| *H04W 40/02* | (2009.01) | |
| *H04L 1/00* | (2006.01) | |
| *H04W 4/00* | (2018.01) | |
| *H04W 4/10* | (2009.01) | |
| *H04W 80/02* | (2009.01) | |
| *H04Q 9/00* | (2006.01) | |
| *H04L 12/58* | (2006.01) | |
| *H04W 48/16* | (2009.01) | |
| *H04W 36/08* | (2009.01) | |
| *H04W 52/14* | (2009.01) | |
| *H04W 52/22* | (2009.01) | |
| *H04W 52/24* | (2009.01) | |
| *H04W 52/34* | (2009.01) | |
| *H04W 84/00* | (2009.01) | |
| *H04W 36/00* | (2009.01) | |
| *H04W 84/12* | (2009.01) | |
| *H04W 92/18* | (2009.01) | |

(52) U.S. Cl.
CPC ............ *G06F 3/167* (2013.01); *G06F 9/542* (2013.01); *G06F 21/45* (2013.01); *H04L 1/008* (2013.01); *H04L 29/06578* (2013.01); *H04L 43/0811* (2013.01); *H04L 43/0858* (2013.01); *H04L 43/0876* (2013.01); *H04L 45/12* (2013.01); *H04L 51/02* (2013.01); *H04L 61/2592* (2013.01); *H04L 67/12* (2013.01); *H04L 67/32* (2013.01); *H04L 69/18* (2013.01); *H04Q 9/00* (2013.01); *H04W 4/00* (2013.01); *H04W 4/10* (2013.01); *H04W 8/06* (2013.01); *H04W 8/08* (2013.01); *H04W 8/26* (2013.01); *H04W 12/001* (2019.01); *H04W 28/0215* (2013.01); *H04W 28/06* (2013.01); *H04W 40/02* (2013.01); *H04W 40/20* (2013.01); *H04W 48/02* (2013.01); *H04W 48/06* (2013.01); *H04W 48/18* (2013.01); *H04W 52/12* (2013.01); *H04W 72/0406* (2013.01); *H04W 72/0493* (2013.01); *H04W 76/45* (2018.02); *H04W 80/02* (2013.01); *H04W 36/0009* (2018.08); *H04W 36/08* (2013.01); *H04W 48/16* (2013.01); *H04W 52/143* (2013.01); *H04W 52/225* (2013.01); *H04W 52/241* (2013.01); *H04W 52/346* (2013.01); *H04W 72/042* (2013.01); *H04W 84/005* (2013.01); *H04W 84/12* (2013.01); *H04W 92/18* (2013.01); *Y02A 30/60* (2018.01)

(56) References Cited

U.S. PATENT DOCUMENTS

| | | | |
|---|---|---|---|
| 5,737,215 | A | 4/1998 | Schricker et al. |
| 5,763,862 | A | 6/1998 | Jachimowicz et al. |
| 5,933,773 | A | 8/1999 | Barvesten |
| 5,987,325 | A | 11/1999 | Tayloe |
| 6,002,929 | A | 12/1999 | Bishop et al. |
| 6,026,075 | A | 2/2000 | Linville et al. |
| 6,078,652 | A | 6/2000 | Barak |
| 6,169,387 | B1 | 1/2001 | Kaib |
| 6,175,789 | B1 | 1/2001 | Beckert et al. |
| 6,285,869 | B1 | 9/2001 | Shannon et al. |
| 6,320,351 | B1 | 11/2001 | Ng et al. |
| 6,427,072 | B1 | 7/2002 | Reichelt |
| 6,427,073 | B1 | 7/2002 | Kortesalmi et al. |
| 6,484,082 | B1 | 11/2002 | Millsap et al. |
| 6,490,679 | B1 | 12/2002 | Tumblin et al. |
| 6,516,357 | B1 | 2/2003 | Hamann et al. |
| 6,526,272 | B1 | 2/2003 | Bansal et al. |
| 6,542,071 | B1 | 4/2003 | Ohtsubo et al. |
| 6,574,734 | B1 | 6/2003 | Colson et al. |
| 6,587,127 | B1 | 7/2003 | Leeke et al. |
| 6,604,140 | B1 | 8/2003 | Beck et al. |
| 6,615,186 | B1 | 9/2003 | Kolls |
| 6,643,504 | B1 | 11/2003 | Chow et al. |
| 6,668,179 | B2 | 12/2003 | Jiang |
| 6,714,799 | B1 | 3/2004 | Park et al. |
| 6,721,580 | B1 | 4/2004 | Moon |
| 6,735,506 | B2 | 5/2004 | Breed et al. |
| 6,757,262 | B1 | 6/2004 | Weisshaar et al. |
| 6,823,244 | B2 | 11/2004 | Breed |
| 6,823,457 | B1 * | 11/2004 | Berstis ............... H04L 12/4625 380/262 |
| 6,868,282 | B2 | 3/2005 | Carlsson |
| 6,914,517 | B2 | 7/2005 | Kinsella |
| 6,925,425 | B2 | 8/2005 | Remboski et al. |
| 6,928,299 | B1 | 8/2005 | Rinne et al. |
| 6,934,391 | B1 | 8/2005 | Linkola et al. |
| 6,957,199 | B1 | 10/2005 | Fisher |
| 6,980,830 | B2 | 12/2005 | Ahonen |
| 7,039,221 | B1 | 5/2006 | Tumey et al. |
| 7,050,897 | B2 | 5/2006 | Breed et al. |
| 7,064,711 | B2 | 6/2006 | Strickland et al. |
| 7,069,144 | B2 | 6/2006 | Yoshihara et al. |
| 7,082,359 | B2 | 7/2006 | Breed |
| 7,096,316 | B1 | 8/2006 | Karr et al. |
| 7,171,460 | B2 | 1/2007 | Kalavade et al. |
| 7,178,724 | B2 | 2/2007 | Tamagno et al. |
| 7,185,161 | B2 | 2/2007 | Kang |
| 7,218,930 | B2 | 5/2007 | Ko et al. |
| 7,222,783 | B2 | 5/2007 | Merrien |

(56) References Cited

U.S. PATENT DOCUMENTS

| | | |
|---|---|---|
| 7,259,469 B2 | 8/2007 | Brummet et al. |
| 7,363,056 B2 | 4/2008 | Faisy |
| 7,389,178 B2 | 6/2008 | Raz et al. |
| 7,484,008 B1* | 1/2009 | Gelvin .................. G06F 15/173 709/249 |
| 7,558,110 B2 | 7/2009 | Mizushima et al. |
| 7,564,842 B2 | 7/2009 | Callaway et al. |
| 7,593,605 B2 | 9/2009 | King et al. |
| 7,603,107 B2 | 10/2009 | Ratert et al. |
| 7,606,643 B2 | 10/2009 | Hunt et al. |
| 7,630,802 B2 | 12/2009 | Breed |
| 7,631,033 B2 | 12/2009 | Zehler |
| 7,636,626 B2 | 12/2009 | Oesterling et al. |
| 7,689,231 B2 | 3/2010 | Mardiks et al. |
| 7,689,251 B2 | 3/2010 | Bae |
| 7,729,725 B2 | 6/2010 | Stenmark |
| 7,738,891 B2 | 6/2010 | Tenhunen et al. |
| 7,755,472 B2 | 7/2010 | Grossman |
| 7,778,227 B2 | 8/2010 | Gibbs |
| 7,787,602 B2 | 8/2010 | Pearson et al. |
| 7,791,310 B2 | 9/2010 | Luz et al. |
| 7,792,618 B2 | 9/2010 | Quigley et al. |
| 7,808,375 B2 | 10/2010 | Bertness et al. |
| 7,844,817 B2 | 11/2010 | Mueller et al. |
| 7,849,020 B2 | 12/2010 | Johnson |
| 7,904,569 B1 | 3/2011 | Gelvin et al. |
| 7,917,251 B2 | 3/2011 | Kressner et al. |
| 7,957,729 B2 | 6/2011 | Roter et al. |
| 7,957,744 B2 | 6/2011 | Oesterling et al. |
| 8,054,038 B2 | 11/2011 | Kelty et al. |
| 8,061,140 B2 | 11/2011 | Harmon |
| 8,063,797 B1 | 11/2011 | Sonnabend et al. |
| 8,081,643 B2 | 12/2011 | Sonoda et al. |
| 8,086,395 B2 | 12/2011 | Mino |
| 8,095,184 B2 | 1/2012 | Hiltunen et al. |
| 8,100,206 B2 | 1/2012 | Kressner et al. |
| 8,131,317 B2 | 3/2012 | Lee |
| 8,135,443 B2 | 3/2012 | Aleksic et al. |
| 8,140,064 B2 | 3/2012 | Mardiks |
| 8,143,741 B2 | 3/2012 | Funakoshi et al. |
| 8,144,596 B2 | 3/2012 | Veillette |
| 8,180,400 B2 | 5/2012 | Shin et al. |
| 8,195,233 B2 | 6/2012 | Morikuni et al. |
| 8,195,235 B2 | 6/2012 | Montes |
| 8,207,642 B2 | 6/2012 | Lafontaine et al. |
| 8,233,389 B2 | 7/2012 | Yim et al. |
| 8,244,468 B2 | 8/2012 | Scalisi et al. |
| 8,244,909 B1 | 8/2012 | Hanson et al. |
| 8,249,087 B2 | 8/2012 | Takada et al. |
| 8,294,420 B2 | 10/2012 | Kocher |
| 8,296,373 B2 | 10/2012 | Bosworth et al. |
| 8,335,493 B2 | 12/2012 | Angelhag |
| 8,364,959 B2 | 1/2013 | Bhanoo et al. |
| 8,378,623 B2 | 2/2013 | Kusch et al. |
| 8,514,825 B1 | 8/2013 | Addepalli et al. |
| 8,602,141 B2 | 12/2013 | Yee et al. |
| 8,705,527 B1 | 4/2014 | Addepalli et al. |
| 8,712,474 B2 | 4/2014 | Gehrman |
| 8,718,797 B1 | 5/2014 | Addepalli et al. |
| 8,719,431 B2 | 5/2014 | Reif et al. |
| 8,848,608 B1 | 9/2014 | Addepalli |
| 8,863,256 B1 | 10/2014 | Addepalli et al. |
| 8,903,593 B1 | 12/2014 | Addepalli et al. |
| 8,989,954 B1 | 3/2015 | Addepalli et al. |
| 9,036,509 B1 | 5/2015 | Addepalli et al. |
| 9,083,581 B1 | 7/2015 | Addepalli et al. |
| 9,154,900 B1 | 10/2015 | Addepalli et al. |
| 9,225,782 B2 | 12/2015 | Addepalli et al. |
| 9,277,370 B2 | 3/2016 | Addepalli et al. |
| 9,654,937 B2 | 5/2017 | Addepalli et al. |
| 9,860,709 B2 | 1/2018 | Addepalli et al. |
| 2001/0033225 A1 | 10/2001 | Razavi et al. |
| 2002/0166068 A1* | 11/2002 | Kilgore ............... H04L 63/0218 726/4 |
| 2003/0033435 A1 | 2/2003 | Hanner |
| 2004/0246966 A1 | 12/2004 | Wu et al. |
| 2004/0256451 A1 | 12/2004 | Goman et al. |
| 2005/0009563 A1 | 1/2005 | Stenmark |
| 2005/0018883 A1 | 1/2005 | Scott |
| 2005/0020250 A1 | 1/2005 | Chaddha et al. |
| 2005/0039027 A1 | 2/2005 | Shapiro |
| 2005/0041660 A1 | 2/2005 | Pennec et al. |
| 2005/0060070 A1 | 3/2005 | Kapolka et al. |
| 2005/0065678 A1 | 3/2005 | Smith et al. |
| 2005/0075137 A1 | 4/2005 | Reemtsma |
| 2005/0096836 A1 | 5/2005 | Minami et al. |
| 2005/0101323 A1 | 5/2005 | De Beer |
| 2005/0124288 A1 | 6/2005 | Karmi et al. |
| 2005/0131673 A1 | 6/2005 | Koizumi et al. |
| 2005/0162687 A1 | 7/2005 | Lee |
| 2005/0207408 A1 | 9/2005 | Elliott |
| 2005/0239504 A1 | 10/2005 | Ishi et al. |
| 2005/0266883 A1 | 12/2005 | Chatrath |
| 2005/0271037 A1 | 12/2005 | Habaguchi et al. |
| 2005/0282554 A1 | 12/2005 | Shyy et al. |
| 2006/0020783 A1 | 1/2006 | Fisher |
| 2006/0031590 A1 | 2/2006 | Monette et al. |
| 2006/0059340 A1 | 3/2006 | Eldenmalm et al. |
| 2006/0068786 A1 | 3/2006 | Florence |
| 2006/0075242 A1 | 4/2006 | Aissi et al. |
| 2006/0076420 A1 | 4/2006 | Prevost et al. |
| 2006/0079237 A1 | 4/2006 | Liu et al. |
| 2006/0079254 A1 | 4/2006 | Hogan |
| 2006/0089157 A1 | 4/2006 | Casey |
| 2006/0129311 A1 | 6/2006 | Bauman et al. |
| 2006/0129848 A1 | 6/2006 | Paksoy et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |
| 2006/0183500 A1 | 8/2006 | Choi |
| 2006/0218337 A1 | 9/2006 | Hashimoto |
| 2006/0224887 A1 | 10/2006 | Vesikivi et al. |
| 2006/0234693 A1 | 10/2006 | Isidore et al. |
| 2006/0277589 A1 | 12/2006 | Margis et al. |
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0015485 A1* | 1/2007 | DeBiasio ............... H04B 1/082 455/345 |
| 2007/0021847 A1 | 1/2007 | Hyodo et al. |
| 2007/0027583 A1 | 2/2007 | Tamir et al. |
| 2007/0030119 A1 | 2/2007 | Ono et al. |
| 2007/0030136 A1 | 2/2007 | Teshima et al. |
| 2007/0038772 A1 | 2/2007 | Obata |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder, Jr. |
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1 | 6/2007 | Breed |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0266428 A1 | 11/2007 | Downes et al. |
| 2007/0271014 A1 | 11/2007 | Breed |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1 | 1/2008 | Helm |
| 2008/0028230 A1 | 1/2008 | Shatford |
| 2008/0031207 A1 | 2/2008 | Martinez et al. |

(56) References Cited

U.S. PATENT DOCUMENTS

| | | |
|---|---|---|
| 2008/0040005 A1 | 2/2008 | Breed |
| 2008/0043759 A1 | 2/2008 | Poetker et al. |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0122597 A1 | 5/2008 | Englander |
| 2008/0147265 A1 | 6/2008 | Breed |
| 2008/0147271 A1 | 6/2008 | Breed |
| 2008/0169350 A1 | 7/2008 | Audebert et al. |
| 2008/0205416 A1 | 8/2008 | DeChiara |
| 2008/0209545 A1 | 8/2008 | Asano |
| 2008/0220743 A1 | 9/2008 | Mora et al. |
| 2008/0226074 A1 | 9/2008 | Sammour et al. |
| 2008/0227604 A1 | 9/2008 | Daniel |
| 2008/0238135 A1 | 10/2008 | Takeda et al. |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0267186 A1 | 10/2008 | Boukis |
| 2008/0284575 A1 | 11/2008 | Breed |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0003283 A1 | 1/2009 | Meylan |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1 | 2/2009 | Breed |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0154460 A1 | 6/2009 | Varela et al. |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0265633 A1 | 10/2009 | Lim et al. |
| 2009/0312850 A1 | 12/2009 | Higuchi et al. |
| 2010/0005313 A1 | 1/2010 | Dai |
| 2010/0037057 A1 | 2/2010 | Shim et al. |
| 2010/0049626 A1 | 2/2010 | Hong |
| 2010/0070171 A1 | 3/2010 | Barbeau et al. |
| 2010/0085868 A1 | 4/2010 | Guo et al. |
| 2010/0088401 A1 | 4/2010 | DeGraeve et al. |
| 2010/0112997 A1 | 5/2010 | Roundtree |
| 2010/0167702 A1 | 7/2010 | Madhavan |
| 2010/0167721 A1 | 7/2010 | Madhavan |
| 2010/0167724 A1 | 7/2010 | Haran et al. |
| 2010/0183016 A1 | 7/2010 | Bonk et al. |
| 2010/0195724 A1 | 8/2010 | Yoshida et al. |
| 2010/0202346 A1 | 8/2010 | Sitzes et al. |
| 2010/0208698 A1 | 8/2010 | Lu |
| 2010/0215043 A1 | 8/2010 | Hisada |
| 2010/0226291 A1 | 9/2010 | Gorbachov |
| 2010/0232404 A1 | 9/2010 | Chen et al. |
| 2010/0234009 A1 | 9/2010 | Antani et al. |
| 2010/0234071 A1 | 9/2010 | Shabtay et al. |
| 2010/0248690 A1 | 9/2010 | Biggs et al. |
| 2010/0279653 A1 | 11/2010 | Poltorak |
| 2010/0280956 A1 | 11/2010 | Chutorash et al. |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2011/0153149 A1 | 6/2011 | Jeon et al. |
| 2011/0190967 A1* | 8/2011 | Burk ............... B60L 1/003 701/22 |
| 2012/0109451 A1* | 5/2012 | Tan ............... G01C 21/3664 701/36 |
| 2012/0173051 A1* | 7/2012 | Tarnutzer ............ H04L 12/4625 701/2 |
| 2012/0182935 A1 | 7/2012 | Addepalli et al. |
| 2013/0018575 A1 | 1/2013 | Birken et al. |
| 2013/0159466 A1 | 6/2013 | Mao |
| 2013/0301584 A1 | 11/2013 | Addepalli et al. |
| 2014/0049413 A1 | 2/2014 | Agarwal et al. |
| 2015/0029987 A1 | 1/2015 | Addepalli et al. |
| 2015/0222708 A1 | 8/2015 | Addepalli et al. |
| 2017/0251339 A1 | 8/2017 | Addepalli et al. |

FOREIGN PATENT DOCUMENTS

| | | |
|---|---|---|
| WO | WO 99/27730 | 6/1999 |
| WO | WO 99/46682 | 9/1999 |
| WO | WO 00/79368 | 12/2000 |
| WO | WO 0111577 | 2/2001 |
| WO | WO 02/067563 | 8/2002 |
| WO | WO 02/089449 | 11/2002 |
| WO | WO 03/007639 | 1/2003 |
| WO | WO 2004/021296 | 3/2004 |
| WO | WO 2005/029890 | 3/2005 |
| WO | WO 2006/094564 | 9/2006 |
| WO | WO 2007/143342 | 12/2007 |
| WO | WO 2008/040964 | 4/2008 |
| WO | WO 2009/082759 | 7/2009 |

OTHER PUBLICATIONS

PCT Apr. 22, 2009 International Search Report for PCT/US08/88320; 3 pages.

PCT Jun. 29, 2010 International Preliminary Report on Patentability and Written Opinion of the International Searching Authority for PCT/US08/88320; 10 pages.

Robert Bosch GmbH, *Automotive Electrics Automotive Electronics, Systems and Components, New: Networking Hybrid Drive*, 5th Edition, Nov. 2007, BentleyPublishers.com, 255 pages (two parts submitted: Part 1—121 pages; Part 2—131 pages) [Library of Congress Catalog Record included].

Scarfone, Karen et al., "Guide to Instrusion Detection and Prevention Systems (IDPS)," NIST (National Institute of Standards and Technology), Special Publication 800-94, Feb. 2007, 127 pages http://csrc.ncsi.gov/publications/nistpubs/800-94/SP800-94.pdf.

Shevade, Updendra et al., "Enabling High-Bandwidth Vehicular Content Distribution," ACM CoNEXT 2010, Philadelphia, PA, Nov. 2010, 12 pages http://www.cs.utexas.edu/~lili/papers/pub/context10.pdf.

Weigle, Dr. Michele, "Standards: WAVE/DSCRC/802.11p, CS 795/895 Vehicular Networks," Old Dominion University, Spring 2008, 19 pages.

Zeldovich, Nickalai et al., "Making Information Flow Explicit in HiStar," OSDI '06: 7th USENIX Symposium on Operating Systems Design and Implementation, Nov. 2006, 16 pages.

Zeldovich, Nickolai et al., "Securing Distributed Systems with Information Flow Control," NSDI '08: 5th USENIX Symposium on Networked Systems Design and Implementation, Apr. 2008, 16 pages.

Freeman, Shanna, "How OnStar Works," HowStuffWorks.com, a Discovery Company; Feb. 8, 2006 http://auto.howstuffworks.com/onstar2.htm/printable.

Wahab, et al.,"Driving Profile Modeling and Recognition Based on Soft Computer Approach," IEEE Transactions on Neural Networks, vol. 20, No. 4, Apr. 2009.

Petrescu, et al., "Joint IP Networking and Radio Architecture for Vehicular Networks," 11th International Conference on ITS Telecommunications, Aug. 2011, St. Petersburg, Germany; 7 pages.

Autonet Mobile, "Autonet Mobile Features, Technology Specifications," autonetmobile.com, 1 page; [earliest known publication date: Apr. 8, 2011] http://www.autonetmobile.com/service/anmdev.html.

Autonet Mobile, "CARFI Features, Technology Specifications," autonetmobile.com, 1 page; [earliest known publication date: Apr. 8, 2011] http://autonetmobile.com/service/carfidev.html.

Autonet Mobile, "It's What Your Car has been Waiting For," autonetmobile.com, 2 pages; [retrieved and printed Apr. 8, 2011] http://www.autonetmobile.com/service/.

Blckhart, Ryan W., et al., "Transparent TCP-to-SCTP Translation Shim Layer," EuroBSDCon 2007, Copenhagen, Denmark, Sep. 17-18, 2007; 14 pages.

(56) References Cited

OTHER PUBLICATIONS

Bilstrup, "A Survey Regarding Wireless Communication Standards Intended for a High-Speed Vehicle Environment," Technical Report IDE0712, Feb. 2007, 51 pages.

Blazevic, Ljubica, et al., "A Location-Based Routing Method for Mobile Ad Hoc Networks," IEEE Transactions on Mobile Computing, vol. 4, No. 2, Mar./Apr. 2005 (Issue publication date: Feb. 7, 2005); 14 pages.

Boman, K., Niemi, V., et al., "UMTS Security," Electronics and Communication Engineerying Journal, Oct. 2002, 14 pages; http://www.it.iitb.ac.in/~kavita/GSM_Security_Papers/New%20papers/umts_security.pdf.

Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.

EPO May 22, 2012 European Search Report and Written Opinion from EP 12150208.2.

Farinacci, D. et al., "LISP Mobile Node," Network Working Group Internet Draft, Feb. 1, 2010, 22 pages; http://tools.ietf.org/id/draft-meyer-lisp-mn-01.txt.

Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.

Hsu, WAVE/DSRC Development and Standardization, Industrial Technology Research Institute, Oct. 1, 2010, 84 pages.

Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.

Ibars, Christian et al., "Wireless Services in the Connected Vehicle Era," IEEE Communications Magazine, Dec. 23, 2010, 13 pages.

Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.

Lillian Lei Dai, "*Proactive Mobile Wireless Networks: an infrastructure-less wireless network architecture for delay-sensitive applications,*" Massachusetts Institute of Technology, Jun. 2008 (two parts submitted: Part 1—105 pages; Part 2—97 pages).

U.S. Appl. No. 14/484,664, entitled "System and Method for Enabling Secure Transactions Using Flexible Identity Management in a Vehicular Environment," filed Sep. 12, 2014, Inventors: Sateesh K. Addepalli et al.

U.S. Appl. No. 13/111,425, entitled "System and Method for Providing Resource Sharing, Synchronizing, Media Coordination, Transcoding, and Traffic Management in a Vehicular Environment," filed May 19, 2011, Inventors: Sateesh K. Addepalli et al.

U.S. Appl. No. 13/117,860, entitled "System and Method for Analyzing Vehicular Behavior in a Network Environment," filed May 27, 2011, Inventors: Sateesh K. Addepalli et al.

U.S. Appl. No. 14/243,304, entitled "System and Method for Real-Time Synthesis and Performance Enhancement of Audio/Video Data, and Noise Cancellation and Gesture Based User Interfaces in a Vehicular Environment," filed Apr. 2, 2014, Inventors: Sateesh K. Addepalli et al.

U.S. Appl. No. 13/118,220, entitled "System and Method for Routing, Mobility, Application Services, Discovery, and Sensing in a Vehicular Environment," filed May 27, 2011, Inventors: Sateesh K. Addepalli et al.

U.S. Appl. No. 13/087,884, entitled "System and Method for Discovery, Trusted Execution, Admission Control in a Vehicular Environment," filed Apr. 15, 2011, Inventors: Sateesh K. Addepalli et al.

U.S. Appl. No. 13/083,305, entitled "System and Method for Applications Management in a Networked Vehicular Environment," filed Apr. 8, 2011, Inventors: Sateesh K. Addepalli et al.

U.S. Appl. No. 14/242,122, entitled "System and Method for Internal Networking, Data Optimization and Dynamic Frequency Selection in a Vehicular Environment," filed Apr. 1, 2014, Inventors: Sateesh K. Addepalli et al.

U.S. Appl. No. 13/114,659, entitled "System and Method for Transport, Network, Translation, and Adaptive Coding in a Vehicular Environment," filed May 24, 2011, Inventors: Sateesh K. Addepalli et al.

\* cited by examiner

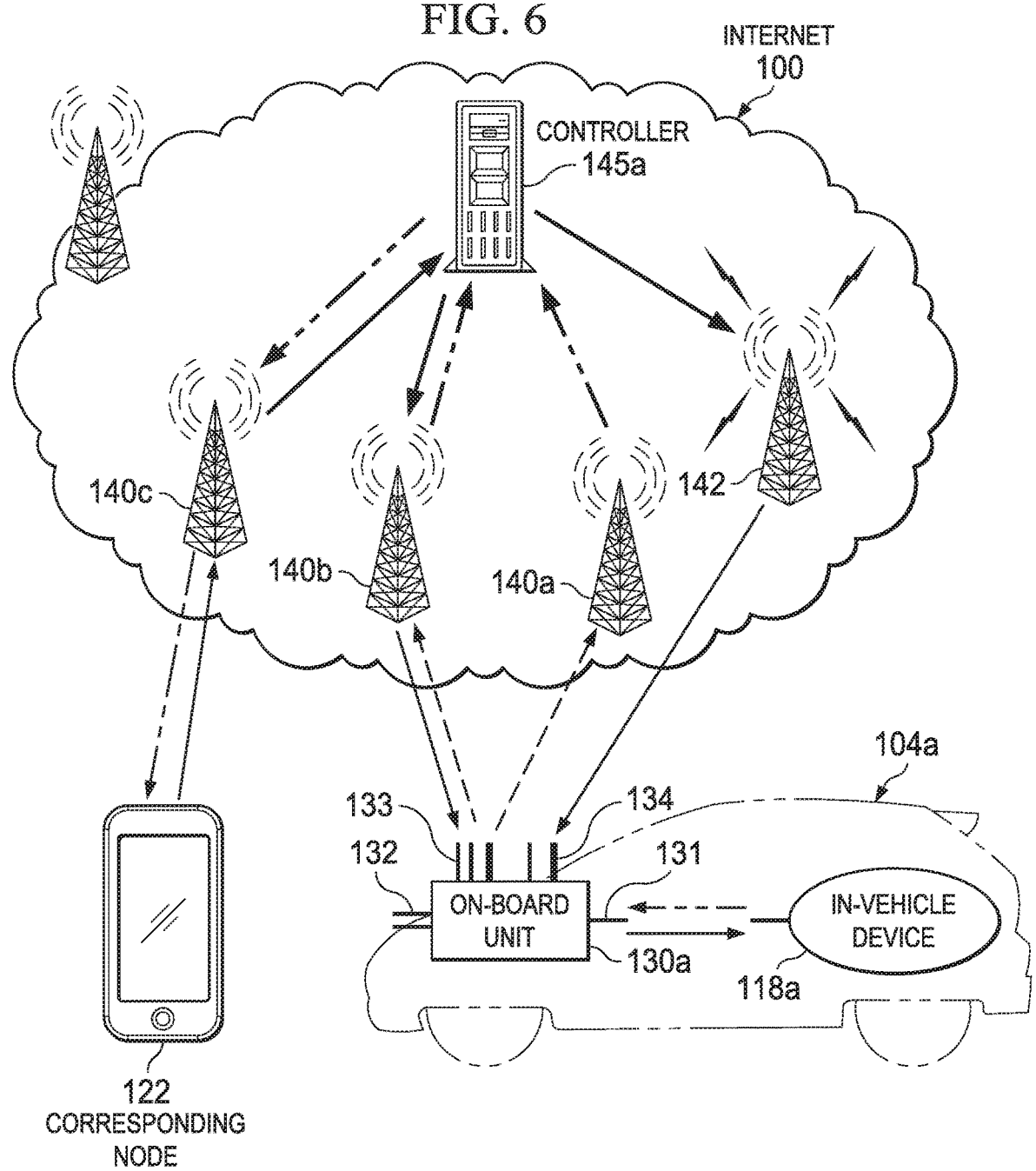

SYSTEM AND METHOD FOR WIRELESS INTERFACE SELECTION AND FOR COMMUNICATION AND ACCESS CONTROL OF SUBSYSTEMS, DEVICES, AND DATA IN A VEHICULAR ENVIRONMENT

CROSS-REFERENCE TO RELATED APPLICATION

This application is a divisional (and claims the benefit under 35 U.S.C. § 120) of U.S. application Ser. No. 14/485,050, filed Sep. 12, 2014, entitled "SYSTEM AND METHOD FOR WIRELESS INTERFACE SELECTION AND FOR COMMUNICATION AND ACCESS CONTROL OF SUBSYSTEMS, DEVICES, AND DATA IN A VEHICULAR ENVIRONMENT," which is a divisional (and claims the benefit under 35 U.S.C. § 120) of U.S. application Ser. No. 13/071,367 (now U.S. Pat. No. 8,848,608), filed Mar. 24, 2011, entitled "SYSTEM AND METHOD FOR WIRELESS INTERFACE SELECTION AND FOR COMMUNICATION AND ACCESS CONTROL OF SUBSYSTEMS, DEVICES, AND DATA IN A VEHICULAR ENVIRONMENT," which claims the benefit of priority under 35 U.S.C. § 119(e) of U.S. Provisional Application Ser. No. 61/433,138, filed Jan. 14, 2011, entitled "SYSTEM, METHOD, AND PROCESSES ASSOCIATED WITH CONNECTED VEHICLES," the entire contents of which are incorporated herein by reference.

TECHNICAL FIELD

This disclosure relates in general to the field of electronic communications and, more particularly, to wireless interface selection and to communication and access control of subsystems, devices, and data in a vehicular environment.

BACKGROUND

Networking architectures have grown increasingly complex and have been designed for use in a wide variety of communications environments. Demand continues to rise among the subscriber base of end users, however, for network access, including Internet access, across diverse network environments. In particular, configuring suitable network architecture for vehicular environments (e.g., automobiles, airplanes, trains, boats, etc.) presents unique difficulties. Vehicles can be mobile across a large geographic area, can travel at various speeds, and can include more than one end user at a time desiring network connectivity. Additionally, vehicles also typically include multiple networking technologies for enabling communications to and from machine devices (e.g., entertainment system, vehicle sensors, actuators, electronic control units, etc.) in the vehicle itself. Providing cost optimized, continuous external network connectivity in vehicular network environments presents significant challenges to system designers, automobile manufacturers, service providers, and the like. Furthermore, facilitating secure communication between disparate in-vehicle network subsystems and controlling information flow across vehicle applications and machine devices of the subsystems is desirable, yet difficult to achieve.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a simplified schematic diagram of an exemplary vehicular network environment illustrating traffic migration associated with embodiments of the present disclosure;

DETAILED DESCRIPTION OF EXAMPLE EMBODIMENTS

Overview

A method in one example embodiment includes detecting a trigger on an electronic device and identifying an interface usage policy for an agent and a corresponding application on the electronic device. The method also includes selecting a first wireless interface of a plurality of wireless interfaces on the electronic device for a network session between an application process of the application and a remote node. The method further includes selecting the first wireless interface based on one or more criteria in the interface usage policy. In specific embodiments the electronic device is an on-board unit of a vehicle. More specific embodiments include selecting the first wireless interface if a first total expected cost of a first wireless option is less than each of the other total expected costs of other wireless options, where at least a portion of the first wireless option corresponds to the first wireless interface.

A method in another example embodiment includes associating an electronic device with a controller in a network environment, associating a first wireless interface of the electronic device with a first wireless infrastructure device in the network environment, providing Internet Protocol (IP) mapping information to the controller, and establishing a network session between the electronic device and a remote node. The network session is established through the first wireless interface and packets of the network session are routed through the controller. In addition, the controller masks the IP mapping information from the remote node. More specific embodiments include detecting a second wireless infrastructure device, associating a second wireless interface of the electronic device with the second wireless infrastructure device, providing new IP mapping information to the controller, and migrating the network session from the first wireless interface to the second wireless interface. In addition, the controller uses the new IP mapping information to route packets to the electronic device from the remote node. In further embodiments, the electronic device is an on-board unit of a vehicle.

Example Embodiments

Figure 1:
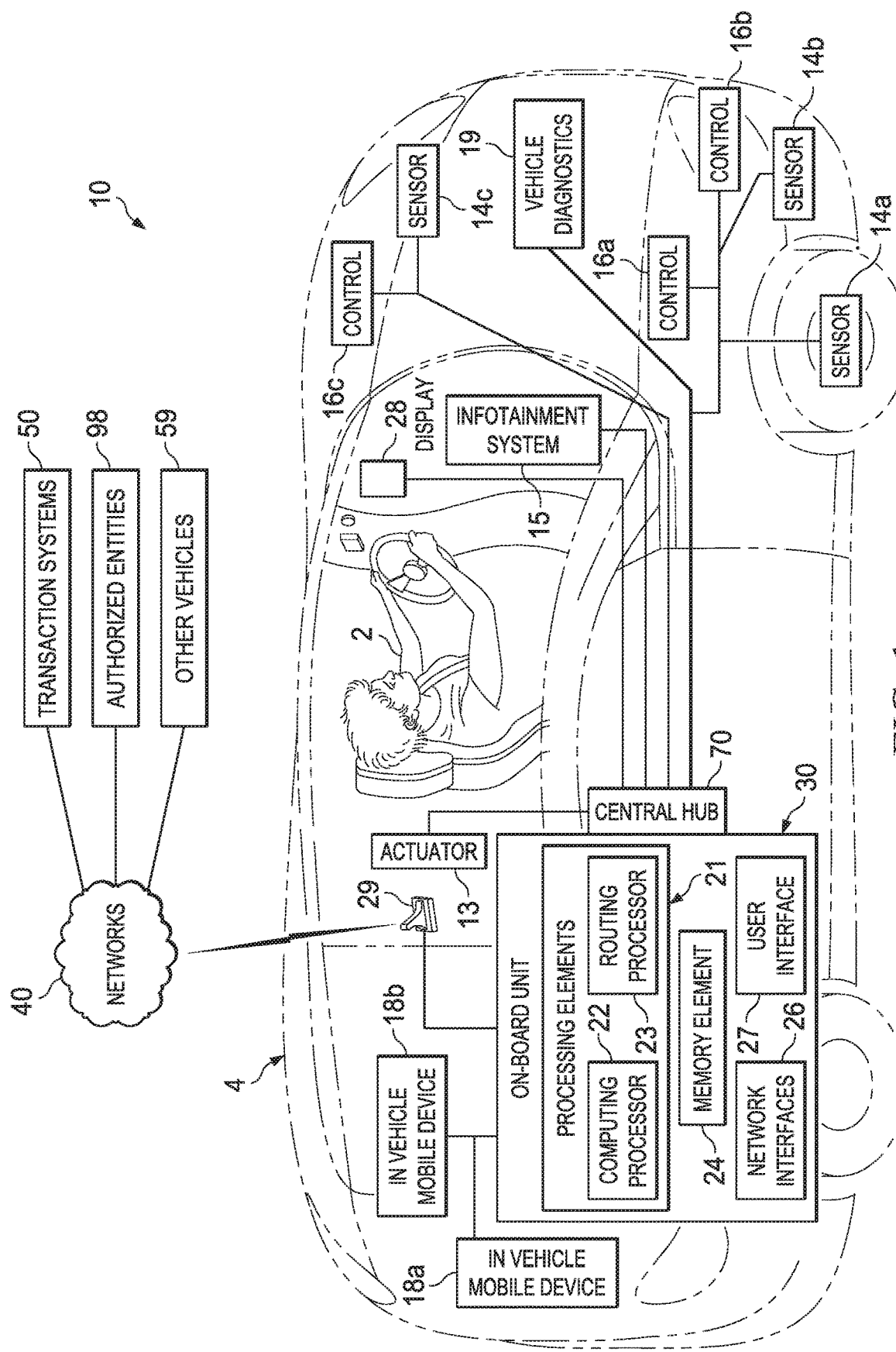
FIG. 1 is a simplified schematic diagram of a communication system for enabling wireless interface selection and for enabling communication and access control of subsystems, devices, and data in a vehicular environment in accordance with embodiments of the present disclosure.

Turning to FIG. 1, FIG. 1 is a simplified block diagram of a communication system 10 for enabling wireless interface selection and communication and access control of subsystems, devices, and data in a vehicular environment. The example architecture of FIG. 1 includes an end user (driver) 2 operating a vehicle 4 that includes an on-board unit (OBU) 30. In this particular example, OBU 30 includes processing elements 21, which include a computing processor 22 and a routing processor 23. OBU 30 also includes a memory element 24, network interfaces 26, a user interface 27, and a display 28. OBU 30 can be suitably coupled to a central hub 70, which interconnects a plurality of sensors 14a-c, a plurality of controls (e.g., electronic control units (ECUs)) 16a-c, and a plurality of actuators, such as actuator 13. In one example embodiment, sensors 14a-b and controls 16a-b may be part of an automotive diagnostic system, indicated by vehicle diagnostics 19, which may be suitably integrated with central hub 70. Central hub 70 may also provide connection to an infotainment subsystem 15, which could include media, audio, and navigation (e.g., a global positioning system (GPS)) elements. At any given time, OBU 30 may be suitably coupled to various in-vehicle mobile devices 18a-b, where such devices may be associated with particular end users (passengers or driver) within vehicle 4.

FIG. 1 also includes networks 40, representing various types of connectivity to vehicle 4 (e.g., via antenna 29). Each established network of networks 40 has a logical coupling to one or more remote nodes of transaction systems 50, authorized entities, and other vehicles 59. Remote nodes are nodes (i.e., any electronic device configured for electronic communication in a network environment and attached to a network) located externally to vehicle 4. Examples of remote nodes include end user devices, mobile devices, electronic devices in networked systems (e.g., server in a datacenter, end user device in a local area network (LAN), etc.), OBUs of other vehicles, and road-side user devices.

Elements of FIG. 1 may be coupled to one another through one or more interfaces (e.g., network interfaces 26) employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, communication system 10 may also include a configuration capable of accommodating legacy bus subsystems that may be employed to convey information across the myriad of machine devices (e.g., sensors 14a-c, controls 16a-c, actuator 13, infotainment system 15) in vehicle 4.

Embodiments of communication system 10 can enable a robust wireless interface selection in a vehicular environment. On-board units (OBUs) in vehicles may provide new applications, communication, and information retrieval in vehicles. To enable such features OBU 30 may be equipped with multiple wireless interfaces for communication with in-vehicle mobile devices, road-side devices (i.e., road-side user device or road-side infrastructure device such as a basestation, wireless access point or satellite), and OBUs in other vehicles. Because the various wireless interfaces could be under different management domains and have vastly different technical characteristics, OBU 30 may provide a policy driven wireless interface selection, wireless mode selection, and interface monitoring, in which the policies can include a plethora of input parameters (e.g., cost of interfaces, delay, power consumption, user preferences and criteria, location, time, application requirements, received signal strength indication (RSSI), signal-to-noise ratio (SNR), bit error rate (BER), etc.). Additionally, OBU 30 may also provide traffic processing and seamless mobility handoff between interfaces of OBUs and between the same and/or different wireless networks. Thus, various wireless interfaces may be selectively utilized in succession and/or concurrently to provide continuous and suitable connectivity between a vehicle and remote nodes, other vehicles, and road-side devices.

Embodiments of communication system 10 may also enable communication and access control of subsystems, machine devices, and data in a vehicular environment. Vehicles typically include different internal network subsystems, which can include bus subsystems, Ethernet subsystems, wireless subsystems, or any other network architecture capable of conveying electronic information across a myriad of machine devices. Some communication between the subsystems may be desirable; however, certain subsystems may require some type of segregation to protect associated machine devices. In addition to communication between subsystems, various applications of OBU 30 may also attempt to access various machine devices for reading data as well as sending data to control the behavior of the vehicle. One embodiment of communication system 10 provides a central hub, which may be implemented integrally with OBU 30 or separately from OBU 30, to interconnect the various internal network subsystems to provide policy-driven secure and appropriate segregation and access between the subsystems. Additionally, an embodiment of OBU 30 provides an information flow control layer to enable policy-driven control of communication between vehicular applications and machine devices.

Certain terminologies are used with regard to the various embodiments of the present disclosure. The term 'road-side' as used herein is intended to mean outside of a vehicle and may or may not be physically located by a road. In addition, 'user device' as used herein is intended to include mobile devices, personal computers, electronic devices, and any other device, component, element, or object operable by a user and capable of initiating voice, audio, video, media, or data exchanges within communication system 10. The term 'wireless infrastructure device' as used herein, encompasses both road-side infrastructure devices and OBUs in other vehicles. As used herein, the term 'machine device' is meant to encompass sensors, actuators, electronic control units (ECUs) or controls, instruments, embedded devices, media devices, infotainment systems, vehicle navigation systems, displays, other peripheral or auxiliary devices or components, etc. Machine devices may be physically distributed across the vehicle in a vehicle subsystem, consolidated in any way, provisioned in proprietary configurations, or otherwise configured based on particular networking, vehicle, and/or end user needs. Other terminologies are defined throughout the Specification.

For purposes of illustrating the operational aspects of communication system 10, it is important to first understand the activities and problems that may be present in electronic communication scenarios in a vehicular environment such as the one shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Many useful, but disparate, networks may exist in today's vehicles (e.g., automobiles, airplanes, trains, boats, etc.). External networks may be accessed from a vehicle by certain electronic devices when a communication link is available. An 'external network' as used herein is intended to encompass a network that is external to a vehicle, where the network is a collection of nodes interconnected by communicative channels that facilitate electronic communications therebetween. Mobile devices such as, for example, mobile phones, smart mobile phones/devices, e-book readers, tablets, laptops/net books, portable navigation systems, multimedia devices, other handheld devices, etc. may be used within a vehicle to wirelessly access an external network, for making a cellular phone call, accessing the Internet via a mobile network operator, and accessing the Internet via a WiFi connection to a road-side access point. A vehicle router in a vehicle may also be used to access a road-side infrastructure device within range of the vehicle. External network access from mobile devices and vehicle routers, however, is dependent upon the particular wireless interfaces being within a wireless range of corresponding mobile or wireless network infrastructures. If the particular corresponding wireless infrastructure devices are not within a wireless range, or if the vehicle carrying the mobile devices and vehicle routers moves outside of the wireless range, then external network communication can be lost.

Some form of wireless communication is needed to achieve external network connectivity from a vehicle. Wireless technologies are continually evolving to better enable electronic devices with appropriate wireless interfaces to access various networks and other electronic devices. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Although numerous wireless technologies exist, the mobile nature of vehicles obfuscates continuous wireless connectivity from a vehicle to an external network. Vehicles travel at various speeds and their travel can span extensive geographical distances. Disturbances (e.g., topographical changes, physical structures, weather, geographical distance from a network access point or cellular tower, etc.) may cause interference and reception difficulties for a particular wireless technology being used. Consequently, an electronic device, such as a mobile device, in a moving vehicle often vacillates between having wireless connectivity and losing wireless connectivity. Even if another wireless communication link is available when wireless connectivity to an external network is lost due to the movement of a vehicle, the other available wireless link will be inaccessible to the particular electronic device without an appropriate wireless interface and network configuration to latch onto the available wireless link. Moreover, switching to a new wireless interface may involve repeatedly breaking a current session and reestablishing another session on the new wireless interface. Such disruptions can be frustrating for the end user, thereby diminishing the end user's reliance on and use of network connectivity while traveling in the vehicle.

Some wireless communication links may be available, but not desirable for extended use in a mobile vehicle. For example, pricing contracts with mobile network operators typically provide cellular coverage through the particular operator for a certain fee based on defined criteria. Example criteria may include a maximum amount of allowed minutes at a set price and/or roaming charges. In a moving vehicle, roaming charges in particular may become very costly as the vehicle moves in and out of a network coverage area. Similarly, cellular service having a maximum amount of allowed minutes may not be a desirable option for wireless connectivity during long commutes or trips in a vehicle. Even if other less costly wireless links are available for use, such links will be inaccessible without the appropriate wireless interfaces and network configuration. Moreover, for electronic devices with multiple wireless interfaces, the process of keeping track of various factors to determine whether to switch wireless links, and interrupting a network session to switch wireless links is inconvenient and burdensome for typical end users. Thus, automatic and continuous wireless connectivity to external networks is needed, in which network interference is minimized and wireless access cost is optimized.

In addition to wireless network communications external to a vehicle, multiple internal network subsystems (e.g., bus subsystems, IP networks) may exist in the vehicle to provide communication pathways to various machine devices distributed throughout the vehicle. A 'subsystem' as used herein is intended to encompass a network within a vehicle, where the network is a collection of nodes interconnected by communicative channels that facilitate electronic communications therebetween, in which the nodes are integrated with or otherwise linked to the vehicle. The nodes in internal network subsystems can include machine devices such as, for example, sensors, actuators, electronic control units (ECUs), detectors, entertainment systems including speakers, a CD and/or DVD player, a radio, etc. In addition, an internal network subsystem may exist for IP machine devices such as certain vehicle navigation systems (e.g., GPS) and any other machine devices configured for IP communications.

Other internal vehicular networks may also exist within a vehicle, and possibly associated with simple content delivery. For example, mobile devices may be used within a vehicle to communicate with other electronic devices within the vehicle or with external networks of the vehicle (e.g., a mobile phone with 3G Internet connection). Hence, various levels of network usage, different purposes of network usage, and different agents (e.g., humans, machine devices, external devices, mobile devices) associated with the network usage may occur in a single vehicle. Network usage in each of the identified cases may have a different usage scope, different latency, different associated routing, different policy requirements, and the like.

Subsystems of vehicles typically include legacy bus subsystems (or subnets), each providing communication pathways to particular machine devices distributed throughout a vehicle. In a typical automobile, for example, more than 80 ECUs exchange data over and across these bus subsystems. Many of these subnets are segregated and thus, communication between the subnets is not feasible. Nevertheless, the number of ECUs and traffic exchanged between them is expected to continue to grow.

Examples of typical vehicular bus subsystems include a Controller Area Network (CAN), which uses a message based protocol, designed for and typically used by automotive applications. The CAN bus is a vehicle bus standard designed to allow microcontrollers, sensors, and other devices to communicate with each other via the CAN (e.g., without a host computer). CAN may be used for soft real-time control of devices such as the antilock braking system. Another bus subsystem can include Local Internet Network (LIN), which may be used to sense external conditions such as light, or to control small mechanisms such as door locking systems. Yet another bus subsystem could include Flexray, a dedicated network for hard real-time controllers, used for drive-by-wire and/or brake-by-wire applications in which information from the engine and/or the wheels is collected and transmitted to appropriate applications and/or data repositories. Media Oriented System Transport (MOST) can also be found in vehicles for transmitting audio, video, and voice on fiber optics. Some of these buses include vehicle-specific interconnects. Additionally, Ethernet may be used to interconnect machine devices in the vehicle.

A tension exists between isolation of the subnets for security purposes, and interconnection of the subnets for diagnostics, repairs, upgrades, data collection, and the like. Subnets are often physically and logically isolated in order to ensure the correct and secure operation of the vehicle. For instance, information from the Flexray bus (e.g., wheels and engine information) is not accessible over the MOST bus. Although such segregation may help to preserve security in certain cases, scattered functionalities across a vehicle and across different bus subsystems can increase costs, such as costs associated with diagnosing problems and maintaining the vehicle. Failures within a vehicle due to communication flows across the bus subsystems can be very complicated to diagnose when the vehicle includes many different subsystems with numerous different ECUs.

Some communication across the bus subsystems can be necessary for the proper operation of the vehicle or can be desirable for other reasons. For example, an anti-lock braking system (ABS) or stability control system may need to gather information from different parts of a vehicle (e.g., wheels, throttle, braking system, etc.) as input and to transmit control messages to the appropriate machine devices to perform an action based on the input. Similarly, an Electronic Stability Control system collects information from individual wheels, accelerometers, throttles, and steering controllers. These machine devices communicate with each other over the buses. Nevertheless, without proper control of data exchanges between bus subsystems, vehicle malfunctions and accidents can result. In particular, anomalies in message flows across the different bus subsystems can affect the vehicle itself and the ability of a driver to control the vehicle.

Gateways or supergateways can be used to facilitate data communication between the various bus subsystems. Typically, gateways deployed across two different bus subsystems or supergateways deployed across multiple subsystems are used. Although such gateways and supergateways may provide basic firewall functions to control cross communication, the limited computational power available on such devices imposes severe limitations to existing implementations. Additionally, these firewalling functions can be vulnerable to malware attacks and/or malfunctions due to the complex architecture of the vehicle. Upgrades or fixes to repair or prevent damage caused by malware attacks or malfunctions often result in expensive recalls and upgrade procedures. In addition, the gateway/supergateway architecture does not provide a unified message log system to help diagnose failures of a vehicle due to anomalies of message flow across subsystems.

With appropriate external network access (e.g., to Internet Protocol (IP) infrastructure), data from machine devices in a vehicle could be used to provide dynamic, real-time vehicle diagnostics from associated sensors, actuators, and controls to a manufacturer of the vehicle or to any other authorized entity. Thus, consistent and reliable external network access from the vehicle through a mobile network infrastructure (e.g., 3G, 4G, LTE, etc.), and/or through other wireless protocols (e.g., WiFi, WiMax, other radio protocols, etc.) is needed. Additionally, interconnection of the vehicular bus subsystems to the IP infrastructure can enable serviceability, safety, and better services to vehicular applications. However, such interconnection may also open up a new avenue for malware attacks on vehicular bus subsystems and applications. Accordingly, a unified, dynamic, policy driven interconnection mechanism is needed to enforce access control and segregation between vehicular bus subsystems, including vehicular Ethernet subsystems, in addition to access control between the bus subsystems and external networks.

An interconnection device that provides appropriate access control and segregation between vehicular bus subsystems may also be operably coupled to, or may be a part of, a vehicular computer, such as OBU 30, which could include multiple applications running on behalf of authorized entities (e.g., a vehicle manufacturer), a driver, one or more passengers, and even third parties. These applications may require access to various machine devices within the vehicle to accomplish their intended purposes. By way of example, a driver's application could be configured to collect gas consumption and mileage data in order to analyze driving habits. A manufacturer's application could be configured in another instance to collect data and parameters from various machine devices such as sensors in the vehicle and to upload the information to the cloud (e.g., the manufacturer's datacenter) for evaluation (e.g., statistical analysis).

Applications could also be configured to send data to the bus subsystems to control the behavior of the car. In one example, an identity profile application could send data on the LIN bus to setup the seat position according to driver preferences stored on the driver's identity profile. Identity profiles are described in co-pending U.S. patent application Ser. No. 13/014,605, entitled "System and Method for Enabling Secure Transactions Using Flexible Identity Management in a Vehicular Environment," filed on Jan. 26, 2011, to Addepalli et al., and also further described herein in this Specification. Unintentional or malicious errors in the flow of information between applications and machine devices could lead to vehicle malfunctions and/or accidents, potentially with catastrophic consequences. Moreover, a third party application requesting access to machine devices could present even greater risk, if the application is not developed by or under the control of the vehicle manufacturer.

Machine devices in today's automobiles are typically under the strict control of the automobile manufacturer. For example, today's automobiles incorporate many ECUs with installed software, and the suppliers of such ECUs have generally followed strict regulations from the automotive industry. Automobile manufacturers perform rigorous testing on each machine device before integrating it into a vehicle. As a result, only trusted ECUs within the manufacturer's domain are installed in vehicles, even if the ECU was built by a third party supplier. In addition, software on ECUs is static and updated under the manufacturer's control. As a result, access control techniques have generally been sufficient for securing data associated with various machine devices within the vehicle.

In a vehicle with an on-board computer such as OBU 30, however, some applications on the on-board computer may not be under the control of the vehicle manufacturer. In addition, dynamic updates to OBU 30 (e.g., installing or updating a third party application) can result in the vehicular environment being manipulated by multiple administrative domains, rather than the single domain of the manufacturer. In this environment, securing information release via access control may not suffice in every scenario. Information flow needs to be controlled both with respect to information flow between machine devices and applications and with respect to information propagation from one application to another after the information has been released. Such control is necessary for the operational safety of the vehicle, the protection of the machine devices, and the privacy of certain data collected by machine devices. Therefore, a unified, policy-based Information Flow Control between applications and machine devices is needed to control access to information from machine devices and to control the propagation of such information after it has been appropriately accessed.

A system for enabling wireless interface selection and for enabling communication and access control of subsystems, devices, and data in a vehicular environment, outlined by FIG. 1, can resolve many of these issues. In accordance with one example implementation of communication system 10, a method is provided for selecting a wireless interface to establish or maintain network connectivity between an OBU 30 and an external network, thereby creating a "connected vehicle." The method includes evaluating parameters associated with wireless connectivity, including delay, power consumption, user preferences, location, time, application requirements, RSSI, BER, SNR, etc. In addition, cost-optimization may also be performed to determine the most cost efficient connectivity, which may be selected subject to defined policies by a user. The method also provides for seamless mobility management such that migration of a session from one wireless interface to another is virtually transparent to the user. Thus, automatic and continuous wireless connectivity to external networks is achieved, in which network interference is minimized and wireless access cost can be optimized.

In another example implementation of the system, an interconnection device or central hub may be provided to interconnect internal network subsystems. A method is also provided for applying policy-based access control and segregation between the internal network subsystems, in addition to access control between the internal network subsystems and the other internal vehicular networks and external networks. In accordance with other example embodiments of communication system 10, a method is provided for applying Information Flow Control (IFC) to data from internal network subsystems and applications processing such data, based on predefined policies associated with the data and access levels of an entity processing the data.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Turning to the infrastructure of FIG. 1, end user 2 can be associated with a human agent (e.g., a driver or passenger). End user 2 may initiate communication in communication system 10 via some network, and such communication may be initiated through any suitable device, inclusive of an in-vehicle mobile device 18a or 18b, display 28, and a navigation system (not shown), which could be integrated with infotainment system 15. In one embodiment, additional displays may be provided for one or more passengers in vehicle 4. Mobile devices, such as in-vehicle mobile devices 18a-b, are inclusive of mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18a-b, and mobile devices external to vehicle 4, may communicate with OBU 30 of communication system 10 through any wireless or suitable wired communication link and may be configured as a personal area network (PAN) or a wireless personal area network (WPAN) or any other appropriate networking architecture or system that facilitates communications in a network environment. Wired and wireless communication links may be inclusive of any electronic link such as Bluetooth, wireless technologies (e.g., IEEE 802.11x), a USB cable, an HDMI cable, etc. Connection between mobile devices and OBU 30 may be configured based on particular needs and logistics. In one example, an external mobile device may be connected to OBU 30 through a USB cable or wireless network when, for example, the external mobile device is a diagnostic tool used by a mechanic for servicing vehicle 4.

Networks 40 represent external networks, which can be a series of points or nodes of interconnected communication paths for receiving and transmitting packets of information that propagate through communication system 10. Networks 40 offer communicative interfaces between any of the components of FIG. 1 and remote network nodes and other electronic devices of transaction systems 50, authorized entities 98, and other vehicles 59. Networks 40 could be any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11, 802.16, WiFi, WiMax, etc.), satellite, cellular technologies (e.g., 3G, 4G, etc.), etc., or any combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks (including both internal and external networks) described herein. Such network interfaces 26 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 26, may include physical ports (e.g., Ethernet, USB, HDMI, etc.), interfaces for wired and wireless internal subsystems, and the like. Similarly, each of the nodes and user equipment (e.g., mobile devices) of communication system 10 can also include suitable interfaces for receiving, transmitting, and/or otherwise communicating data or information in a network environment.

OBU 30, and other associated or integrated components such as central hub 70, can include one or more memory elements (e.g., memory element 24, other memory elements of central hub 70, etc.) for storing information to be used in achieving operations associated with the wireless interface selection, seamless mobility, access control, and/or information flow control, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory or storage options discussed herein should be construed as being encompassed within the broad term 'memory element' as used herein in this Specification.

In example embodiments, the operations for enabling wireless interface selection and for enabling communication and access control of subsystems, devices, and data in a vehicular environment, outlined herein, may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 24) can store data used for the operations described herein. This includes the memory elements being able to store software, logic, code, or processor instructions that are executed to carry out the activities described in this Specification.

Additionally, OBU 30 and associated or integrated components such as central hub 70 may include processing elements 21 (e.g., computing processor 22, routing processor 23, other processors of central hub 70, etc.) that can execute software or algorithms to perform activities to enable wireless interface selection, seamless mobility, and communication and access control of subsystems, devices, and data, and to route packets using suitable routing protocols. A processor can execute any type of instructions associated with the data to achieve the operations detailed herein in this Specification. In one example, the processors (as shown in various FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.'

Figure 18:
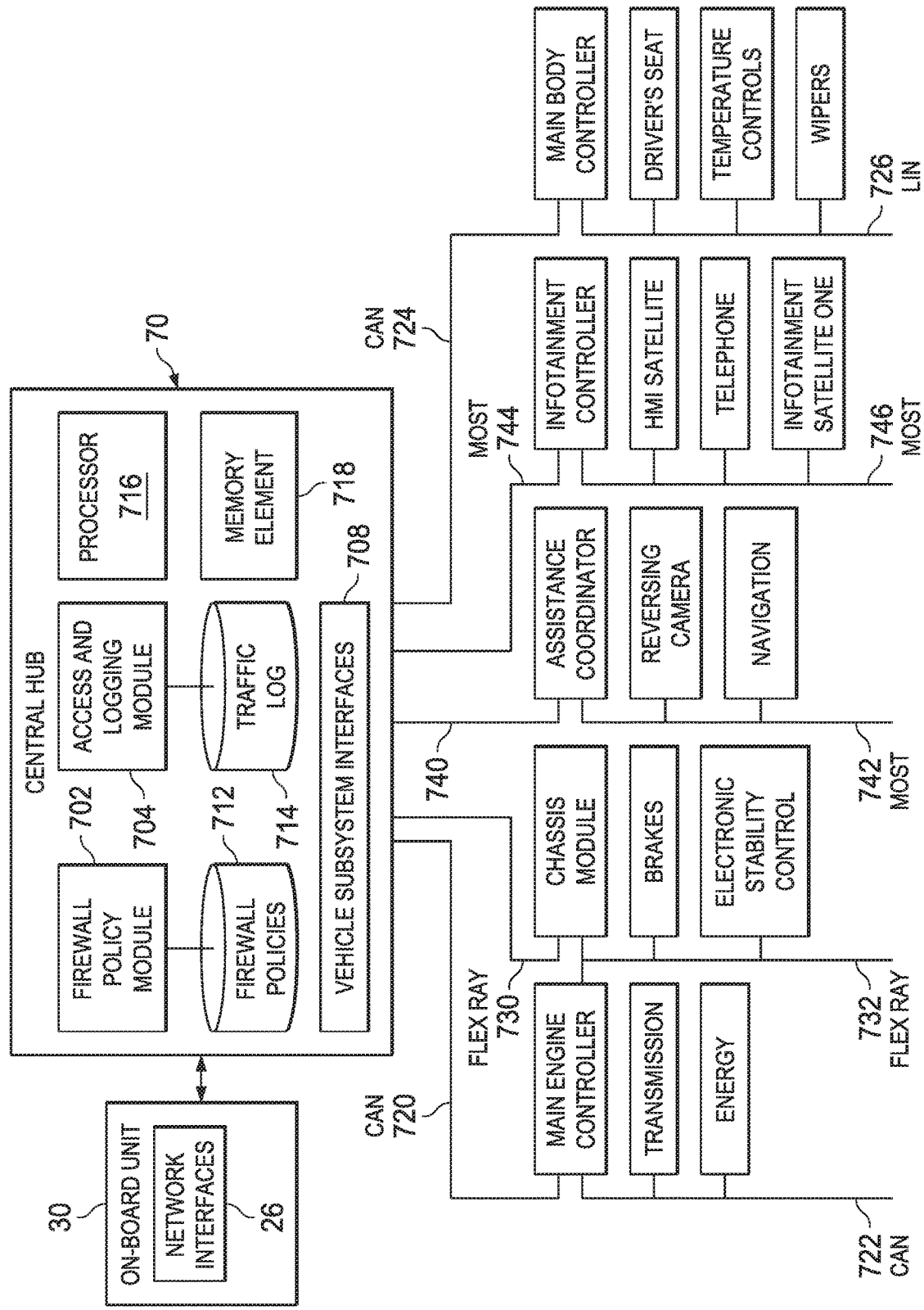
FIG. 18 is a simplified block diagram of one embodiment of an on-board unit (OBU), a central hub, and exemplary vehicular subsystems in accordance with the present disclosure.

Regarding a physical implementation of OBU 30 and its associated components such as central hub 70, any suitable permutation may be applied based on particular needs and requirements, including the design of the particular vehicle in which OBU 30 is implemented. In one embodiment, central hub 70 may be integrated with OBU 30 and share hardware resources such as processing elements 21 and memory element 24. Alternatively, central hub 70 may be implemented separately from OBU 30 with appropriate communication pathways to OBU 30. In this alternative implementation, central hub 70 may be provided with separate hardware resources including one or more processors and memory elements, as illustrated in FIG. 18.

In example implementations, various other components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., vehicle sensors, instruments, electronic control units (ECUs), embedded devices, actuators, displays, etc.) through central hub 70. Central hub 70 may be implemented integrally with OBU 30 or may be implemented separately, but appropriately configured for communication with OBU 30. One or more suitable communication interfaces (e.g., network interfaces 26 if central hub 70 is integrated with OBU 30, subsystem interfaces on central hub 70 if central hub 70 is implemented separately from OBU 30) for legacy bus subsystems of vehicle 4. Other suitable communication interfaces may also be provided for an Internet Protocol (IP) network, a user datagram protocol (UDP) network, or any other suitable protocol or communication architecture enabling network communication with machine devices in vehicle 4.

Typically, numerous ECUs, with different embedded software, may be found in a single automobile and may communicate via a CAN bus. Sensors 14a-b may represent, for example, wheel and headlight sensors, respectively. Controls 16a-b may be inclusive of any embedded system or ECU that controls one or more of the electrical subsystems in vehicle 4. Actuator 13 represents a vehicle setting device such as, for example, a seat positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communications in a LIN bus, in one example vehicle. Sensor 14c represents a type of sensor or device that may be configured for communications via flexray communications protocol (e.g., a radar collision sensor). Control 16c, representing one or more ECUs, may be suitably integrated for controlling the flexray network and sensors and other associated components.

In the particular example shown in FIG. 1, vehicle 4 includes capabilities associated with infotainment system 15 and vehicle diagnostics 19. A navigation system (not shown) may be provided in various embodiments including, for example, a portable navigation system or a fixed navigation system as part of infotainment system 15, each of which may be configured for wireless or wired communications to central hub 70. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, infotainment system components (e.g., speakers, radio, DVD, CD, etc.), vehicle cameras, and the like.

Figure 2:
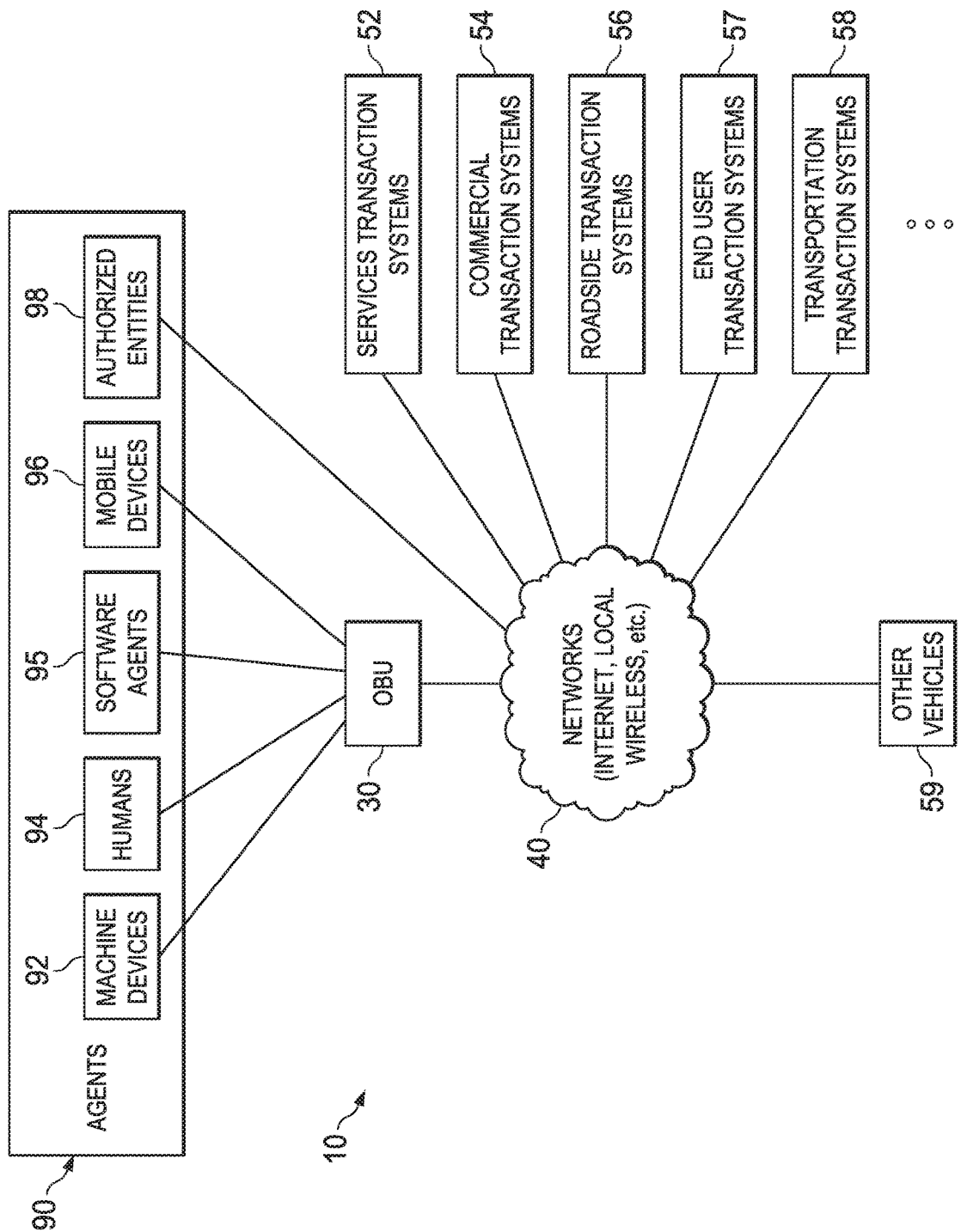
FIG. 2 is a simplified schematic diagram of the communication system in exemplary network environments associated with embodiments of the present disclosure.

Turning to FIG. 2, communication system 10 is illustrated with OBU 30 shown coupled to agents 90 and networks 40. As previously discussed herein, agents 90 can include machine devices 92, humans 94, and mobile devices 96. In addition, agents can also include software agents 95 and authorized entities 98. Software agents 95 can include any application or executable file comprising instructions that can be understood and processed on a computer, and provisioned in a memory element accessible to OBU 30 (e.g., memory element 24), and which may be initiated automatically in response to a particular set of criteria or conditions (e.g., every time network connectivity is detected on OBU 30, whenever OBU 30 is powered on and a particular time interval has passed, in response to another software agent, etc.).

Authorized entities 98 may include various entities having authorization to access a vehicle 4 such as, for example, a dealer of the vehicle, a manufacturer of the vehicle, OEMs associated with the vehicle, and public entities having an interest in the vehicle (e.g., State Departments of Transportation, local police departments, etc.). A network node of such authorized entities will typically be remotely located from OBU 30 and, therefore, accessible from OBU 30 through networks 40 such as the Internet or other WANs and any available communication link (e.g., 3G, 4G, WiFi, WiMax, etc.) providing network access from OBU 30 to the Internet or other WAN. In some scenarios, however, OBU 30 may be locally accessible to an authorized entity such that Internet access is unnecessary. For example, when vehicle 4 is being manufactured and is located at one of the manufacturer's facilities, OBU 30 may be capable of accessing the manufacturer's network through a LAN or WLAN. Similarly, when a vehicle 4 is taken to a dealer for maintenance, the OBU 30 may connect to the dealer network through a communication link that does not include the Internet or any other wide area network.

Networks 40 may also facilitate communication between certain agents 90 (e.g., machine devices 92, humans 94, software agents 95, mobile devices 96) and transaction systems 50. By way of example, transaction systems 50 may include services transaction systems 52, commercial transaction systems 54, road-side transaction systems 56, end user transaction systems 57, and transportation transaction systems 58 on network nodes or other electronic devices. Each of the transaction systems can be associated with many different types of entities and many different transaction scenarios. Services transaction systems 52 can encompass numerous entities providing services such as identity service providers, mobile wireless service providers, banks and other financial institutions, location-based services (LBS), travel agencies, vehicle rental and leasing agencies, Internet websites, etc. Commercial transaction systems 54 may include entities facilitating commercial transactions through the Internet (e.g., video and music download sites, online retailers, etc.), etc. Roadside transaction systems 56 may include various entities providing road-side services such as gas and electric charging stations, kiosks (both road-side and drive-through), etc. End user transaction systems 57 may include end user devices (e.g., mobile devices, laptops, personal computers, cellular telephones, etc.) for communication with OBU 30 through networks 40. Transportation transaction systems 58 may include entities or devices facilitating vehicle charging transactions related to toll payments, ferry charges, bridge toll payments, parking, Vehicle Miles Traveled (VMT), and any other transportation costs incurred as a result of moving vehicle 4 from one location to another. All of the transaction systems 50 (e.g., transaction systems 52, 54, 56, 57, 58) as categorized, are provided for purposes of illustration and ease of understanding, and it will be appreciated that certain entities may logically be included in multiple transaction systems (e.g., a bank could be described as both a services transaction system and a commercial transaction system) and that numerous types of transaction systems and entities other than those enumerated herein may also be possible.

Other commercial transactions may occur through OBU 30 by accessing other vehicles 59 (vehicle-to-vehicle commerce). An available network represented by networks 40, may provide a communicative pathway between vehicle 4 and other vehicles 59, where vehicle 4 includes OBU 30 and other vehicles 59 include a suitable communication device (e.g., mobile device, OBU or similar device). The communicative pathway between vehicle 4 and other vehicles 59 could be established as a single hop or multi-hop vehicle-to-vehicle network through WiFi, WiMax, or any other suitable wireless technologies allowing a sustained connection between vehicle 4 and other vehicles 59. Commercial transactions could occur between a mobile device in one vehicle (connected to an OBU) and an OBU in another vehicle, between mobile devices in separate vehicles with OBUs, or between OBUs of separate vehicles. Commercial transactions may also be conducted between OBU 30 and mobile devices 96 (vehicle-to-mobile device commerce), such as when a mobile device purchases content from OBU 30 of the same vehicle. Another type of commercial transaction can include in-vehicle commerce in which a user of a mobile device pays for the use of resources through OBU 30 (e.g., in the case of a passenger in a commercial vehicle such as a taxi cab) or when mobile devices within a vehicle use the network available through OBU 30 to conduct commercial transactions with each other. In addition to commercial transactions, these communicative pathways involving vehicles and mobile devices may also be established for any other suitable services or transactions, providing proper authentication and network credentials are obtained.

Applications installed on OBU 30 can be considered transaction applications and can include a plethora of user-level and system-level applications. With proper authentication to OBU 30 and authorization, numerous types of transactions using the transaction applications may be performed through OBU 30. Generally, types of transactions are inclusive of 1) accessing one or more wireless/mobile/cellular networks and using network bandwidth and services, 2) gaining access to various resources of the vehicle, 3) gaining access to applications in the vehicle, and 4) engaging in commercial activities (e.g., paying for receiving goods or services, or receiving payment for selling goods or services).

I. Wireless Interface Selection

Figure 3:
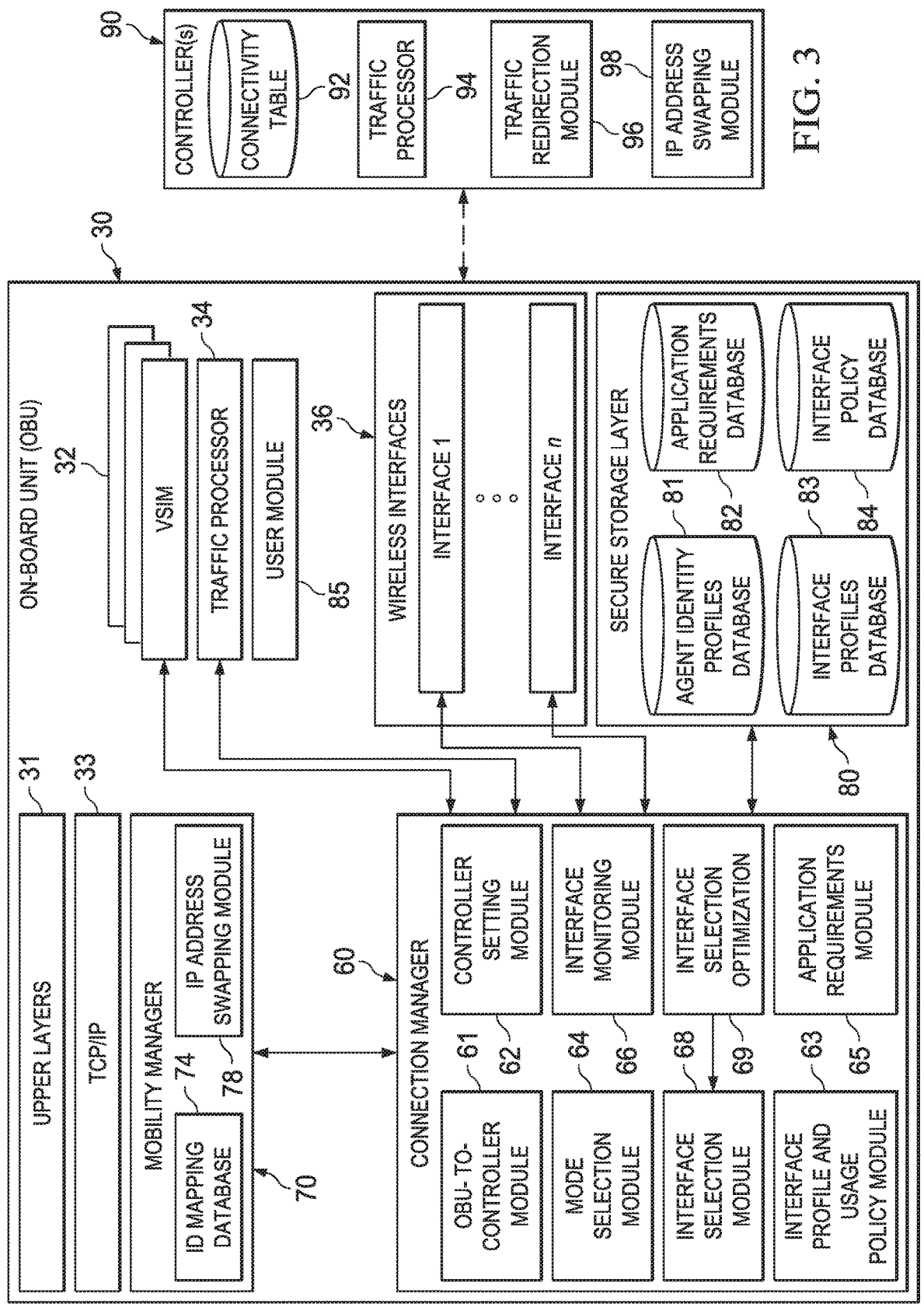
FIG. 3 is a simplified block diagram of an embodiment of an on-board unit (OBU) enabling wireless interface selection and mobility in the communication system.

Turning to FIG. 3, a block diagram illustrates an embodiment of the overall wireless interface selection architecture. OBU 30 includes upper layers 31, Transmission Control Protocol and Internet Protocol (TCP/IP) layers 33, and wireless interfaces 36, which may be part of network interfaces 26. A connection manager 60, a mobility manager 70, and a secure database/storage layer 80 provide the framework for achieving wireless interface selection and seamless mobility between wireless interfaces. In one embodiment, a traffic processor 34 and a user module 85 may also be configured in the framework. Multiple virtual subscriber identity modules (VSIMs) 32 may be provisioned in OBU 30 for providing cellular access via a mobile network operator. Additionally, controller(s) 90 represent one or more network nodes in the cloud (e.g., as part of a manufacturer datacenter, a mobile network operator cloud, etc.), which act as default gateways and which may perform some form of traffic processing (e.g., ID/location mapping, traffic shaping and processing, proxy, etc.) for traffic routed to and from OBU 30.

The wireless interface selection architecture of OBU 30, with multiple wireless interfaces 36, can support numerous features for selecting a preferred wireless interface and for seamless mobility management for different applications to enhance the quality of wireless communication and efficient resource utilizations. Supported features can include: 1) policy driven interface selection, 2) policy driven flow-binding and quality of service (QoS) support, 3) redundancy, load-balancing, and temporary disruption tolerance, 4) session control (i.e., pause and resume) during temporary disconnections, 5) pre-association with multiple wireless interfaces of the same technology, 6) policy driven interface selection granularity for different applications, 7) adaptive wireless interface mode switching, 8) independent interface selection for uplink and downlink traffic, 9) deterministic or stochastic interface selection, 10) support for multiple in network controllers and seamless handoff between the controllers, 11) support for user devices with and without mobility, 12) wireless connection to and seamless migration from one OBU to another OBU by in-vehicle and road-side user devices, 13) seamless mobility handoff between interfaces of OBUs and between the same or different wireless networks, 14) traffic shaping and other traffic processing (possibly dependent on the characteristics of the available wireless interfaces). Generally, connection manager 60 supports features 1 through 9, mobility manager 70 supports features 10 through 13, and traffic processor 34 supports feature 14.

A. User Module and Profiles. Requirements, and Policies

User module 85 of OBU 30 can capture agent identity profiles and interface usage policies. User module 85 could also be configured to capture interface profiles and application requirements. These profiles, policies, and requirements can be stored in a personal mobile device, in a controller (e.g., controller 90), in a storage medium in the cloud (e.g., an identity service provider, a datacenter, etc.), or in OBU 30. In one embodiment, secure storage layer 80 of OBU 30 includes an agent identity profiles database 81, an application requirements database 82, an interface profiles database 83, and an interface policy database 84, where such profiles, requirements, and policies may be locally stored. System default settings may exist for application requirements, interface profiles, and interface usage policies, which can be optionally overwritten, modified, or deleted by authorized users.

Profiles, requirements, and policies can be captured by user module 85 in several ways. A user interface (e.g., a keyboard, a monitor, a touch screen, audio, video, facial recognition, etc.), provided in any suitable device such as a personal mobile device or OBU 30, could be used to input information contained in secure storage layer 80. For example, this could be accomplished through an end user computer by connecting to some type of storage medium in the cloud (e.g., media hub, online account with an identity service provider, social network, etc.), and then downloading such information to OBU 30. Profiles, requirements, and policies could also be entered directly into OBU 30 through, for example, display 29. In another scenario, a physical storage medium (e.g., USB storage, RFID, smartphone, security USB key, etc.) could be used to download the information to OBU 30.

Agent identity profiles, which may be stored in agent identity profiles database 81, can include credentials and profile information for a particular agent, which can be stored as an identity profile for the agent. Credentials can contain information that uniquely identifies the agent, including an agent identity profile ID, and that may be used for authentication purposes. Examples of credentials may include one or more of name, address, phone number, driver's license number, social security number, business license number, IP address, user ID/password, biometrics, personal device identifier (e.g., authentication information corresponding to key fob, access card, credit card, mobile phone, etc.), security keys, and certificates (e.g., public key infrastructure (PKI) certificate, trusted third party (TTP) certificate, etc.). In one embodiment, an agent may have multiple identity profiles in agent identity profiles database 81. Thus, during system operation, the agent may choose a desired identity profile.

Profile information of an identity profile aggregates agent attributes, account information, preferences, and/or settings. Such profile information may include interface cost, wireless account information (e.g., VSIM information, WiFi account information, etc.), and/or agent preferences over the interfaces and/or applications, possibly based on the identity of the agent. Profile information can also include other information such as vehicle settings, dashboard preferences, web account information (e.g., multimedia, social networking, etc.), history, mobile device list (e.g., smartphones, mobile phones, tablets, laptops, etc.) including network configurations for mobile devices, network service provider membership account information, insurance information, credit card/payment account information, manufacturer web account information, network interface account information, GPS favorite locations, and phone contact list. The information included in a particular identity profile will be at least partially dependent upon the particular agent to which it corresponds. For example, an agent that does not require network access to any external networks would not contain wireless interface preferences and information in a corresponding identity profile. It will be apparent that the examples provided herein, of credentials and profile information, are not all-inclusive, and any other suitable information or data could be included as credentials or profile information.

Application requirements, which may be stored in application requirements database 82, can include requirements of an application to establish a network session between OBU 30 and a remote node. Note that an 'application' as used herein this Specification, can be inclusive of an executable file comprising instructions that can be understood and processed on a computer, and may further include library modules loaded during execution, object files, system files, hardware logic, software logic, or any other executable modules. An 'application process' as used herein is intended to encompass an instance of an application that is executing.

In one embodiment, application requirements may be serviced on a best effort basis. In addition, a quality of service (QoS) optimization based on application categories (e.g., video, voice, file transfer, etc.) may also be applied. For each application category, a default set of service requirements (e.g., minimum throughput, maximum jitter, maximum delay, etc.) may be specified by an authorized user or network element designer. Example application requirements can include application ID, application category ID, minimum throughput, maximum jitter, maximum delay, minimum link persistency, maximum cost/bit transferred, minimum security level, restrictions on data processing, and privacy settings. In one embodiment, an authorized user may create, update, or delete any application requirement at any time.

Interface profiles, which may be stored in interface profiles database 83, include information corresponding to physical wireless interfaces of OBU 30. In one embodiment, interface profiles stored in interface profiles database 83 can be created, updated, or deleted by authorized users at any time. Each interface profile may include a unique interface profile ID (e.g., MAC address, VSIM/SIM information) to distinguish one wireless interface from another wireless interface. Multiple interface profiles may be created for a single physical interface (e.g., 3G card) where each of the interface profiles is associated with a different VSIM or other interface entity. Interface profile information may include: hardware ID that identifies the interface hardware, interface profile ID, corresponding agent identity profile ID, supported interface modes, cost (e.g., free, cost/month below a certain number of bytes of data transfer, tiered pricing based on volume of data transfer, cost based on type of application, cost/month for number of minutes used and cost/minute beyond threshold, etc.), performance (e.g., throughput, throughput vs. distance, delay, jitter, persistency, etc.), and security (e.g., encryption level VPN, etc.).

Interface usage policies, which may be stored in interface policy database 84, can be defined for each wireless interface. An interface usage policy for a particular wireless interface can include various criteria for selecting the particular wireless interface for a network session. Interface usage policies may include some or all of the following information and criteria: 1) interface usage policy ID, 2) one or more corresponding interface profile IDs, 3) one or more corresponding agent identity profile IDs, 4) internal vs. external setting, 5) virtual interface setting, 6) interface mode setting, 7) application to interface binding, 8) agent identity to interface binding, and 9) interface selection policies, which can be application specific, including interface selection granularity, bi-directional interface selection, bandwidth allocation/priority setting, and deterministic vs. probabilistic interface selection.

An interface usage policy ID is a unique identifier for the particular interface usage policy. Each interface usage policy may include one or more corresponding interface profile IDs and one or more corresponding agent identity profile IDs. Multiple interface profile IDs may be included in a particular interface usage policy if the same criteria of the particular interface usage policy apply to the multiple identified interfaces. Multiple agent identity profile IDs may also be included in a particular interface usage policy if the same criteria are applicable for a network session associated with any of the multiple identified agent profile IDs.

Internal vs. external setting criteria of an interface usage policy indicates whether an interface is designated for communication with in-vehicle devices only or for communication with devices external to the vehicle only. In one embodiment, a default setting (or lack of internal vs. external designation) indicates that the interface is capable of supporting both internal and external communications.

The virtual interface setting indicates whether virtual interfaces can be created for the one or more physical interfaces identified by the corresponding one or more interface profile IDs. A physical interface corresponds to the actual interface hardware, and a virtual interface is a software entity that can capture and potentially modify packets from physical interfaces, thereby allowing a physical interface to simultaneously associate with, transmit packets to, and receive packets from multiple road-side infrastructure devices of the same technology (e.g., WiFi access points) and of different technologies (WiFi access points and 3G basestations). Each physical interface can have multiple virtual interfaces, if allowed by the interface usage policy. If the virtual interface setting indicates that one or more virtual interfaces can be created, then a maximum number of allowable virtual interfaces may also be indicated. In one embodiment, the virtual interface setting is a binary indicator of yes (virtual interfaces can be created) or no (virtual interfaces cannot be created).

Interface mode setting is an indication of the one or more interface modes in which a wireless interface can operate. Interface operation modes include 1) hub mode for communicating with in-vehicle devices and road-side user devices within a wireless coverage area (e.g., WiFi access point in vehicle), 2) road-side infrastructure mode for communicating with road-side infrastructure device (e.g., a basestation, an access point, a satellite), and 3) peer mode for communicating with other on-board units and devices having an interface in peer mode. Some interfaces may be constrained to operate in a single mode at all times (e.g., 3G cellular interface may only operate in the road-side infrastructure mode), some interfaces may adaptively switch modes over time (e.g., WiFi interface may operate in either road-side infrastructure mode or hub mode), and some interfaces may be configured to operate in a subset of modes or in all modes simultaneously.

Interface modes may be selected by authorized users. Some interfaces may have a preconfigured or default mode set, for example, by an interface manufacturer, vehicle dealer, or other authorized agent. In one embodiment, however, any authorized user can select one or more modes for interfaces at any time. Selecting interface modes can be done via a mode selection screen during network configuration or at any other time. Additionally, each authorized user may select modes for an interface that differ from modes selected by other authorized users for the same interface.

In one embodiment, a primary mode and one or more opportunistic modes may be specified when multiple modes are selected for an interface. In this scenario, the primary mode is used unless predetermined conditions are present (e.g., a connection cannot be made in the primary mode, the connection quality in the primary mode does not meet a predefined threshold quality metric, etc.). Also, having no primary or opportunistic specifications can, in one embodiment, indicate that the interface is operable in all user selected modes. If more than one opportunistic mode is specified, then they can be selected opportunistically in a pre-specified order or selected randomly if there is no pre-specified order. An authorized user can enable adaptive mode selection. Example interface modes are depicted below for Interfaces 1 through n, with an "X" indicating a preconfigured allowable mode and a "XX" indicating a user-selected allowable mode:

|  | Hub | Road-side Infrastructure | Peer |
| --- | --- | --- | --- |
| Interface 1 | XX (default) |  |  |
| Interface 2 |  | XX (primary) | XX (opportunistic) |
| Interface 3 | XX | X |  |
| Interface n |  | X (default) | XX |

In one embodiment, interface usage policies stored in interface usage policies database 84 can be created, updated, or deleted by authorized users at any time. In addition, multiple interface usage policies may be specified for an interface profile. For example, a human agent may choose policy 1 when he or she logs into OBU 30 for work purposes, and may choose policy 2 when he or she logs into OBU 30 for personal uses. In another example, policy 1 may be chosen for an interface operating in mode A and policy 2 may be chosen for the same interface operating in mode B. Additionally, an interface usage policy may apply to multiple interface profiles.

Interface selection policies can include criteria for particular applications and/or agents. Application-to-interface binding criteria of the interface usage policy can be used to specify policies for flow-binding (i.e., specify a particular interface for a particular application and, in some cases, for a particular agent identity). Agent identity to interface binding criteria can define agent preferences and policies. Users who are human agents or who control other agents (i.e., authorized entities, mobile devices, machine devices, software agents), may have preferences for particular interfaces based on cost, performance characteristics, security level, and the like. Thus, such preferences can be defined and associated with the agent's identity. For example, a user (e.g., a human agent) may prefer to use an open WiFi link for personal web browsing if the WiFi link is free, but may prefer to use a more secure 3G link for work purposes (e.g., transferring work documents, work file downloads, etc.). Thus, users may specify their preferences for interfaces in relation to interface cost, application requirements (QoS), and other metrics. In one embodiment, if preferences and policies are not specified or otherwise unavailable, the system can use default policies for interface selection.

Interface selection policies can include one or more criteria such as interface selection granularity. Interface selection granularity can define a range of granularities (e.g., communication sessions, packets, bytes, bits), at which interface selection can be performed. Session-level interface selection occurs at the beginning of a session. In session-level interface selection, all packets belonging to the same session are transmitted or received on a selected interface or selected group of interfaces, unless the selected interface or any of the selected group of interfaces is no longer available for communication. In this scenario, a new interface or group of interfaces is selected for the remaining packets in the session. If a group of interfaces is selected for a session, however, a finer grain interface selection process may be needed to further determine data flow on each of the interfaces within the group. In packet-level interface selection, interface selection can be independently carried out for each packet. For bit-level or byte-level interface selection, advanced coding techniques such as network coding may be applied at network nodes, such that coded bit streams may be carried on different interfaces. Finally, interface selection granularity can be different for different applications and sessions.

Bidirectional interface selection criteria in the interface usage policy allow a user to specify the selection of different interfaces for a network session depending on the directional flow of traffic in the session. In particular, a first interface can be selected for uplink traffic (i.e., from OBU 30 to an external network) and a second interface can be selected for downlink traffic (i.e., from the external network to OBU 30). In one example, in the uplink direction, video request packets may be sent via a 3G link on OBU 30 to a video server in the Internet. In the downlink direction, the requested video itself may be sent to OBU 30 via a WiFi link on OBU 30. Such selections may be desirable to minimize the cost of network traffic (e.g., video packets).

Bandwidth allocation and/or priority settings may be specified by a user in an interface usage policy. In one example, a priority list of interfaces for specific applications could be specified, which could also include particular bandwidth allocations. The following illustrates some examples of priority list and allocation list implementations:

1) A session would always be sent out via WiFi:
 Application_ID
 Priority List=WiFi
 Allocation List=None
2) A session would use bandwidth-based allocation:
 Application_ID
 Priority List=None
 Allocation List=
  3G1=3G1_AvailableBW/(3G1_Available_BW+ 3G2_Available_BW)*100%,
  3G2=3G2_AvailableBW/(3G1_Available_BW+ 3G2_Available_BW)*100%

3) A session would always use WiFi.
  If WiFi is not available then split bandwidth 50:50 between 3G1 and 3G2:
  Application_ID
  Priority List=WiFi
  Allocation list=(3G1=50%, 3G2=50%)
4) A session would use WiFi.
  If WiFi were not available, then the session would use 3G1.
  Application_ID
  Priority List=WiFi, 3G1
  Allocation list=None Interface selection criteria in an interface usage policy can also include an indication as to whether a selection decision should be deterministic or stochastic/probabilistic. If a selection decision is deterministic, then a definitive result is achieved based on known parameters. For example, a deterministic decision could be that a particular bit, byte, packet, or session will be sent through interface 1 instead of interface 2. If a selection decision is probabilistic, then one or more decisions with a determined probability as to their occurrence can be made based upon assumptions made for certain parameters. For example, a probabilistic decision could be that a particular bit, byte, packet, or session will be sent through interface 1 with probability of 0.7 and interface 2 with probability 0.3.

Redundancy and load balancing preferences may be included in interface usage policies, may be included in default settings, or may be preset as an overriding policy by an authorized entity such as a manufacturer or a service provider. Multiple wireless interfaces do not necessarily translate to a system that is automatically able to utilize them simultaneously or to a system with redundancy and load balancing capabilities. Typically, only one of the interfaces is utilized at any time for communication. With communication system 10, however, any or all interfaces of an OBU may be utilized simultaneously. Thus, network throughput may be increased as sessions and packets can be simultaneously transmitted and received on multiple interfaces of an OBU. Interface selection, as provided herein, allows traffic to be balanced across different interfaces and when any of the interfaces fail or get disconnected, traffic can be migrated seamlessly onto remaining interfaces. Thus, redundancy, fault tolerance, and seamless mobility can be achieved. In addition, session persistence during temporary disruptions can also be realized as long as at least one of the interfaces of the OBU is connected.

B. Traffic Processor

Traffic shaping and other traffic processing can be performed by traffic processor 34 of OBU 30. In one embodiment, this may be performed prior to interface selection and may depend on characteristics of the available wireless interfaces. Because an OBU can operate as a routing hub for in-vehicle devices and other OBUs and devices, the OBU that is routing network traffic can perform data fusion, data mining, traffic shaping, coding, location tagging, deep packet inspection, quality of service (QoS) support, and other forms of data processing on the network traffic to be routed. Some of these processing functions can be agnostic and dependent on the type of interfaces available. In addition, similar traffic processing can be performed on controller(s) 90.

C. Connection Manager

Connection manager 60 of OBU 30 transparently enables one or more wireless network sessions between OBU 30 and one or more external networks, by selecting one or more wireless interfaces from a plurality of wireless interfaces using various wireless protocols. Interface usage policies, application requirements, interface mode, and other parameters may be evaluated to determine which wireless interface to select. In one embodiment, connection manager 60 includes an OBU-to-controller module 61, a controller setting module 62, an interface profile and usage policy module 63, a mode selection module 64, an application requirements module 65, an interface monitoring module 66, an interface selection module 68, and an interface selection optimization module 69. Once an interface has been selected, the interface selection is provided to mobility manager 70 and any IP address changes are communicated to the one or more controllers 90. In addition, connection manager 60 can be an integral unit for L2 and L3 handoffs, and therefore, can be the site of handoff optimizations.

Interface profile and policy module 63 of connection manager 60 provides lookup and creation for interface profiles and interface usage policies. Interface profiles and/or interface usage policies can be created and stored locally or remotely. Whenever an interface is activated, interface profile and usage policy module 63 determines whether an interface profile and interface usage policies are stored locally on OBU 30 or remotely. Any interface profiles and interface usage policies stored remotely can be downloaded to local cache. Otherwise, interface profiles and interface usage policies may be created by an authorized user for any interfaces without corresponding local or remote interface profiles and interface usage policies. In one embodiment, if no interface profile or interface usage policy is created for an interface, then system default settings that have already been specified may be used.

Application requirements module 65 of connection manager provides lookup, creation, and subsequent traffic processing whenever a session list change occurs. Application requirements can be created and stored locally or remotely. Whenever a new session is initiated, application requirements module 65 determines whether application requirements associated with the new session are stored locally on OBU 30 or remotely. Any application requirements stored remotely can be downloaded to local cache. Otherwise, new application requirements can be created by any authorized user for any applications without corresponding local or remote application requirements. In one embodiment, if no application requirements are created, then default settings may be used. Additionally, traffic processing may be performed by traffic processor 34 if network conditions change, if an existing session is terminated or suspended, or once application requirements corresponding to a new session have been identified, created, or downloaded.

Interface monitoring may be continuously maintained via interface monitoring module 66 of connection manager 60. Virtual interfaces can be created if allowed in accordance with an applicable interface usage policy. Each virtual interface associates and authenticates with the corresponding road-side infrastructure through the physical interface and attains a network address (e.g., an IP address). If virtual interfaces are not allowed by policy, then a newly activated physical interface associates and authenticates to the corresponding road-side infrastructure and attains a network address. A list of physical and virtual interfaces is maintained by OBU and updated by interface monitoring module 66 when a new physical or virtual interface makes a successful connection or an existing interface is disconnected. Additionally, interface statistics may be collected periodically for physical and virtual interfaces using several methods (e.g., periodic packet probes, small file transfer, using data traffic to assess link quality, transmit/receive buffer size, timer, etc.).

When OBU 30 is activated, active wireless interfaces are identified and configured. Each active interface that is preconfigured for network connection will attempt to associate and connect with a road-side infrastructure device or other OBUs. In one embodiment, OBU 30 is preconfigured with an IP address of one or more controllers 90 as default gateways, and each interface of OBU 30 is preconfigured with a mode. When multiple road-side infrastructure devices are available, the interface may associate and connect with one of the road-side infrastructure devices or associate with multiple road-side infrastructure devices by creating multiple virtual interfaces for one physical interface. Virtual interfaces are software modules that can intercept, modify, and pass packets to higher and lower network layers. Virtual interfaces can be achieved using various implementation alternatives such as Click Router, Netfilter, kernel modules, and the like. If interface modes are not preconfigured, however, then those interfaces that can take on more than one mode may be assigned a mode according to user policy.

Once an interface is connected to another device, it tests the connection by sending probe packets to one of the designated controllers. These packets may also be used to determine the quality of the connection. In one embodiment, OBU 30 may send probe packets to some or all of the controllers 90 and use the measured path quality to determine the best controller.

Supporting virtual interfaces helps to maintain seamless session continuity. Some physical interfaces (e.g., WiFi card) can associate and form a communication link with a single access point (AP) of the same technology (e.g., a WiFi AP and not 3G basestation). If the physical interface associates and connects with a different AP, its IP address will change and, therefore, this mobility/hand off event typically breaks communication sessions unless the network is configured to maintain seamless session continuity or to disallow IP address change. Other physical interfaces (e.g., wideband cognitive radio) can associate and form a communication link with one of several different technologies at any time (e.g., GSM, CDMA, etc.). However, a mobility/ hand off event typically breaks communication sessions without some means of maintaining seamless session continuity. As will be further described herein, virtual interfaces created by interface monitoring module 66 enables interface switching between different connections of a single physical interface and, therefore, the mobility/hand off occurs on the same physical interface. Consequently, seamless session continuity may be realized in this scenario.

Mode selection module 64 can perform adaptive mode selection between hub mode, peer mode and road-side infrastructure mode, in accordance with interface usage policy. When not conflicting with an interface usage policy, mode selection can adapt to network conditions (e.g., interference, presence of road-side access point, presence of nearby OBUs, etc.). An authorized user can configure interface mode setting of interface usage policy to allow opportunistic selection of other modes for selected interfaces. In addition, this can also be preconfigured as a default setting. In one example, a WiFi interface may first operate in primary road-side infrastructure mode, but then switch to opportunistic peer mode when it cannot detect a road-side WiFi access point or when it experiences high and persistent interference. In one scenario, the WiFi interface may periodically switch back to road-side infrastructure mode to try to connect to a road-side access point. Alternatively, a map could be provided that includes geographically relevant WiFi access points to enable the WiFi interface to switch back to primary road-side infrastructure mode when the vehicle enters a wireless access range of a road-side WiFi access point.

In another example of adaptive mode selection, a WiFi interface may first operate in primary peer mode but then switch to opportunistic road-side infrastructure mode when it cannot detect other OBUs in direct radio range. While in opportunistic road-side infrastructure mode, the WiFi interface may switch back to primary peer mode when there are other OBUs within direct radio range. In one embodiment, the presence of other OBUs may be obtained from a geo-location server or servers located in the Internet, which contain the geographical coordinate locations of all OBUs.

Interface selection module 68 of connection manager 60 determines the appropriate associations for each interface and determines the particular arrangement of data flow over the associated connections, which can be a two-step process or a joint process. Interface selection is generally triggered by events such as a new device joining the network, a new session beginning, existing devices leaving the network, an existing session ending, link quality degrading, and network connections disconnecting. Interface selection may be policy driven utilizing, for example, interface policies defined in interface policy database 84. The policies may be used together with statistics from the various interfaces and possible future link performance predictions to determine the appropriate road-side infrastructure (and thus, the appropriate OBU interface) through which to route packets. Interface selection may also be aided by network entities such as user devices, OBUs and controllers. An interface may be selected for a particular session independently of all existing traffic (Incremental Interface Selection) or may be selected by considering existing sessions and possibly moving existing traffic to different links to achieve a globally optimal interface selection (Global Optimization).

In one embodiment, interface selection module 68 is configured to select one or more wireless interfaces for a particular network session via prescribed rules and procedures in accordance with interface usage policy. For example, in one implementation, there may be a priority list of interfaces for specific applications, a specification of interface selection granularity, and/or a specification of deterministic vs. probabilistic interface selection. In another example, a specified rule may be based on measured link quality or other link attributes as they are relevant to the performance of specific applications.

External interface selection is the interface selection process of an interface that is in road-side infrastructure and/or peer mode and under a coverage area of one or more road-side infrastructure devices, other OBUs, and/or devices in ad hoc modes. These road-side infrastructure devices, other OBUs, and/or devices may be the same or different wireless technologies and management domains.

In one embodiment, interface selection optimization module 69 is configured as external interface selection within a general cost optimization framework. Cost optimization can incorporate any number of user defined costs (e.g., real financial costs of utilizing a link, opportunity cost of not using a link, and performance degradation costs) and attempts to strike the best tradeoff between these cost parameters. An adjustable weighting factor may be used on each cost parameter and the user or system architect can fine tune the performance of the system to achieve the desired cost tradeoff balance. In addition, cost optimization may utilize some or all of the following input parameters:

received signal strength indication (RSSI), signal-to-noise ratio (SNR), bit error rate (BER), delay, packet sent, location, time, type of application, power consumption, application constraints/requirements, user profile information, map, map of road-side infrastructure devices, and any other available information useful in determining interface.

Parameters for one embodiment of cost optimization may be defined as:

$\vec{\phi}$ =link and path characteristic parameter vector—Each of these parameters represents one link or path attribute (e.g., wireless link capacity, path delay, etc.). Under Global Optimization, these parameters can take on measured values that represent total capabilities of the link (e.g., link capacity). Under Incremental Interface Selection, these parameters can take on measured residual values that represent remaining capabilities of the link (e.g., residual link capacity unused by existing traffic on a link). Let there be k parameters, where k is a positive integer.

$\vec{x}$ =interface index vector for n interfaces—The interfaces are arbitrarily assigned indices $x_1, x_2, \ldots, x_n$ $\omega_{x_i}^j$ =fraction of total traffic of session j on interface $x_i$, where $\Sigma_{i=1}^n \omega_{x_i}^j = 1$ (i.e., the traffic is split across different interfaces according to the fraction allocation on each interface)—The fraction may be discretized for session-level stripping (taking on integer values 1 or 0) or continuous for packet-level stripping (taking on any value between 0 and 1).

$T^j$ =total amount of traffic of session j $f_i(\vec{\phi}, \vec{\omega}, \vec{T})$ =expected cost function, where i∈[1,m] for m distinct cost entities—Each function represents the expected cost of entity i of interest. An entity could be financial cost of a link, opportunity cost of not using a link, and performance degradation costs.

$\lambda_i$ =cost function weight, where i∈[1,m] for each of the m cost entities—The users can express different weight preferences or the weights could be specified by system designers to achieve desired results.

Cost optimization can be performed periodically or can be triggered by network events such as a new session starting, an existing session ending, an existing interface becoming unavailable, a new interface becoming available, etc. The cost optimization minimizes the weighted sum of all of the expected cost factors by varying the fraction of traffic of each session allocation over the available interfaces. This is represented mathematically by:

$$\min_{\vec{\omega}} \sum_{i=1}^m \lambda_i f_i(\vec{\phi}, \vec{\omega}, \vec{T})$$

Depending on the actual cost functions, canonical convex optimization techniques or non-convex optimization techniques (optimal and heuristic) may be employed. Such techniques can include, for example, approximately linearizing the cost function, simulated annealing, genetic algorithms, etc.

In some embodiments, a frequency of interface switching or interface flapping over time may be incorporated in the optimization utilizing a dynamic programming formulation. Instead of performing optimization at a specific time, in one embodiment of dynamic programming, parameters are taken at multiple time instances and the total weighted cost of interface selection in that time window is calculated. The parameters for this embodiment may be defined as:

g(•)=expected switching cost function
V=cost function weight $\vec{\vec{\phi}}(t)$, $\vec{\vec{\omega}}(t)$, $\vec{\vec{T}}(t)$ =time-indexed parameters in a sliding time window range, [a,b] Parameter values of all quantities that occurred in the past are all known whereas future quantities need to be predicted based on past values and/or on prior knowledge about location of road-side infrastructure and possibly their quality.

The time-indexed optimization minimizes the weighted sum of all of the expected cost factors in a specified time window as well as an explicit cost of interface switching by varying the fraction of traffic of each session allocation over the available interfaces at each of the time instances in the time window. This is represented mathematically by:

$$\min_{\vec{\vec{\omega}}(t)} \left( \sum_{i=1}^m \lambda_i(t) f_i(\vec{\vec{\phi}}(t), \vec{\vec{\omega}}(t), \vec{\vec{T}}(t)) \right) + vg(\vec{\vec{\phi}}(t), \vec{\vec{\omega}}(t), \vec{\vec{T}}(t))$$

In one example implementation, cost entities could be defined as a function of a single link or path parameter (e.g., received signal strength indicator (RSSI)). Thus, the interface selection optimization minimizes a weighted sum of cost functions over the chosen parameter (e.g., RSSI). Consider an example scenario of interface selection for a single file transfer session where the file transfer starts on a 3G link. After some time period, a WiFi link becomes available and then disappears after another time period. The question to be decided is whether the current session (file download) should be switched to WiFi during the period of WiFi coverage overlapping 3G coverage. The parameters for this example scenario may be defined as:

$\vec{\phi}$ =WiFi RSSI
$T(\phi, v)$=expected duration that the transmission remains on 3G even through WiFi is simultaneously available
$P(\phi)$=expected packet loss rate 0-100% on WiFi
$R_{3G}$=3G data rate
$T_{total}$=total duration of 3G and WiFi overlap
$Q_{wifi}(\phi)$=expected number of packets transmitted on WiFi=$R_{wifi}$ (assumed to be constant)*$(T_{total}-T(\phi,v))$
$\delta$=unit cost per bit sent on 3G link
$\lambda_1, \lambda_2, \lambda_3$=cost weighting factors A total expected cost may be calculated as follows: Total expected cost (TEC)=packet loss+monetary cost+lost opportunity cost. This may be represented mathematically as: TEC=$\lambda_1 P(\phi)+\lambda_2 R_{3G}\delta T(\phi,v)-\lambda_3 Q_{wifi}(\phi)$ Using the functional forms of the cost entities, the cost function can be minimized by finding the optimal $\phi$ at which the file transfer should be switched to the WiFi link during the period of wireless coverage overlap. The functions can be substituted with representative functional forms:

$$w^2 + d^2 = l^2, \phi \propto \frac{1}{l^2}, \text{ and } w = \sqrt{l^2 - d^2} \propto \sqrt{\frac{x_4}{\phi} - d^2},$$

resulting in the following mathematical equation:

$$C = x_1 P(\phi) + x_2 R_{3G}\delta T(\phi, v) - x_3 Q_{wifi}(\phi)$$

$$= x_1 e^{-\phi} + x_2 \frac{R_{3G}\delta}{v}\left(\sqrt{L^2 - d^2} - \sqrt{x_4 \phi^{-1} - d^2}\right) - x_3 \frac{R_{wifi}}{v}$$

$$\left(2\sqrt{L^2 - d^2} - 2\left(\sqrt{L^2 - d^2} - \sqrt{x_4 \phi^{-1} - d^2}\right)\right)$$

-continued $$= x_1 e^{-\phi} + x_2 \frac{R_{3G}\delta}{v}\left(\sqrt{L^2 - d^2} - \sqrt{x_4\phi^{-1} - d^2}\right) - x_3 \frac{R_{wifi}}{v} 2\sqrt{x_4\phi^{-1} - d^2}$$

$$= x_1 e^{-\phi} + x_2 \frac{R_{3G}\delta}{v} \sqrt{L^2 - d^2} - \left(x_2 \frac{R_{3G}\delta}{v} + x_3 \frac{R_{wifi}}{v}\right)\sqrt{x_4\phi^{-1} - d^2}$$

Plotting the equation indicates that at higher vehicle velocity, it is less beneficial to switch to WiFi, but at a higher WiFi rate, it is more beneficial to switch to WiFi. Other factors such as 3G rate, distance to the WiFi access point, and the like can also affect the optimal operating point.

The formulation of cost optimization can incorporate both user defined and performance driven cost factors. The formulation also supports different interface selection granularities, incremental interface selection, global optimization, one-time optimization, and optimization over a sliding time window. In addition, interface selection optimization module 69 may be implemented as a deterministic or stochastic user-centric cost optimization procedure in which cost is defined as opportunity cost of not meeting performance and policy requirements, which will be further described herein with reference to FIGS. 15A and 15B.

D. Mobility Manager and Controllers

Mobility manager 70 works with connection manager 60 to maintain seamless mobility handoff. Specifically, the features supported by mobility manager 70 include 1) support for multiple controllers and seamless hand off between controllers, 2) support for user devices with mobility and without, 3) seamless mobility hand off between interfaces of OBUs and between same/different wireless networks, and 4) connection to and seamless migration from one OBU to another by in-vehicle and road-side user devices. If geolocation, maps, and other prior information about the operating environment are available, mobility manager 70 can utilize this information to improve the interface selection algorithm. Advanced features may include the ability to generate a map of road-side infrastructure device locations based on historical connection information from one's own data and/or from other vehicles (e.g., in the form of crowdsourcing).

Mobility manager 70 supports seamless mobility for user devices both with and without mobility. User devices (in-vehicle or road-side) and other in-vehicle devices may or may not have support for mobility and those devices that have mobility support may or may not connect to the OBU. If a device with mobility support is connected to the OBU, however, the OBU's mobility implementation cannot be in conflict with that of the device. On the other hand, devices without mobility support can connect to the OBU to achieve seamless mobility. Although some mobility protocols may be implemented to support some level of seamless mobility during mobility events (e.g., Mobile IP, which is an Internet Engineering Task Force IETF standard communications protocol), the embodiments disclosed herein include numerous features (e.g., multiple associations and seamless mobility across both access and network interfaces), not supported by other protocols.

In one embodiment, mobility manager 70 may include an IP address swapping module 78 and an ID mapping database 74, for supporting a mobility protocol. The IP address swapping module 78 hides underlying mobility events from user devices. ID mapping database 74 may be updated to reflect currently active physical and virtual interfaces of OBU 30. In one embodiment, mobility manager 70 coordinates with one or more network controllers 90 to enable seamless mobility and other outlined features. Each OBU can associate and exchange traffic with one or more network controllers 90. Furthermore, as an OBU moves, it may associate with different network controllers 90 over time.

Controllers 90 may include a traffic processor 94, a traffic redirection module 96, an IP address swapping module 98, and possibly an interface selection optimization module (not shown). These modules can be configured to enable traffic processing functions such as ID/location mapping, traffic shaping and processing, proxy, etc. In one embodiment, the controllers can discover and communicate with other controllers either in a centralized or a distributed manner. Authentication may also be implemented to secure the controllers and to allow only authorized access.

To ensure seamless mobility during access and network mobility handoff, controllers 90 may each maintain a connectivity table 92 and coordinate traffic forwarding during handoff events. In one embodiment, mobility between OBUs and controllers may be handled by IP address swapping to hide underlying mobility events. IP address swapping module 98 can hide underlying mobility events of OBU 30 from remote nodes to which OBU 30 is connected. An OBU communicating with a controller may provide IP address changes (e.g., IP address change from one physical or virtual interface on the OBU to another physical or virtual interface on the OBU) to update the connectivity table and enable the controller to modify packets with the appropriate IP address for routing traffic to the OBU.

Outgoing network traffic flows from OBU 30 can include packets generated by road-side or in-vehicle devices, or by the OBU itself. Each of these entities has at least one identifier (e.g., Internet Protocol (IP) address), with each identifier corresponding to a different physical interface. These identifiers can be either public or private. IP addresses may include a source IP address (SIP) corresponding to a physical interface, an OBU IP address (OIP) corresponding to a physical interface on the OBU, a virtual interface IP address (VIP) corresponding to a virtual interface associated with a physical interface, a controller IP address (CIP) corresponding to a physical interface of a controller, and a destination IP address (DIP) corresponding to an IP address of a corresponding destination node. Additionally, each session may be identified by a unique session ID or port number (SID). In one embodiment, if port numbers are used as SIDs, then TCP or UDP tunneling may be used between OBU 30 and controller 90 to direct traffic to appropriate ports. Thus, TCP/UDP tunneling may be used if the port number on OBU 30 and controller 90 are different.

In one embodiment, for each session, identifier (ID) mapping database 74 can include IP addresses and session ID mapping including current physical and virtual interfaces. All possible associations of IP addresses for the session may be included (e.g., source IP address, IP addresses of physical and virtual interfaces on OBU, IP address of controller, IP address of corresponding destination node). Mobility manager 70 collects all interface mapping information and updates ID mapping database 74, which can be communicated to controller 90 via a communication protocol. The set of controllers 90 may either be chosen by authorized agents or dynamically selected based on network conditions, vehicle locations, communication delay between vehicle and controllers, or other parameters.

The following table illustrates an example ID mapping database for communication between an in-vehicle device (or road-side user device) and a corresponding destination node via a controller:

| SID 1 | SIP 1 | OIP 1 | VIP 1 | CIP 1 | DIP 1 |
| SID 2 | SIP 1 | OIP 2 | — | CIP 1 | DIP 1 |
| SID 3 | SIP 1 | OIP 2 | — | CIP 1 | DIP 1 |

The example ID mapping database indicates the in-vehicle device has one physical interface and 3 different sessions (SID 1, SID 2, and SID 3) have been initiated. At OBU 30, session 1 (SID 1) goes through physical interface 1 (OIP 1) and virtual interface 1 (VIP 1). Sessions 2 and 3 (SID 2, SID 3) go through physical interface 2 (OIP 2). All packets are forwarded to the corresponding node (DIP 1) via a controller (CIP 1).

As vehicle 4 with OBU 30 moves, IP addresses on OBU 30 may change. In the following table, an updated example ID mapping database is shown:

| SID 1 | SIP 1 | OIP 1 | VIP 1b | CIP 1 | DIP 1 |
| SID 2 | SIP 1 | OIP 2b | — | CIP 1 | DIP 1 |
| SID 3 | SIP 1 | OIP 2b | — | CIP 1 | DIP 1 |

In the updated example ID mapping database, VIP 1 and OIP 2 were updated to VIP 1b and OIP 2b, respectively. Thus, session 1 was migrated to another virtual interface (VIP 1b) on the same physical interface (OIP 1) of the OBU. Sessions 2 and 3 were migrated to another physical interface (OIP 2b) of the OBU.

Figure 4:
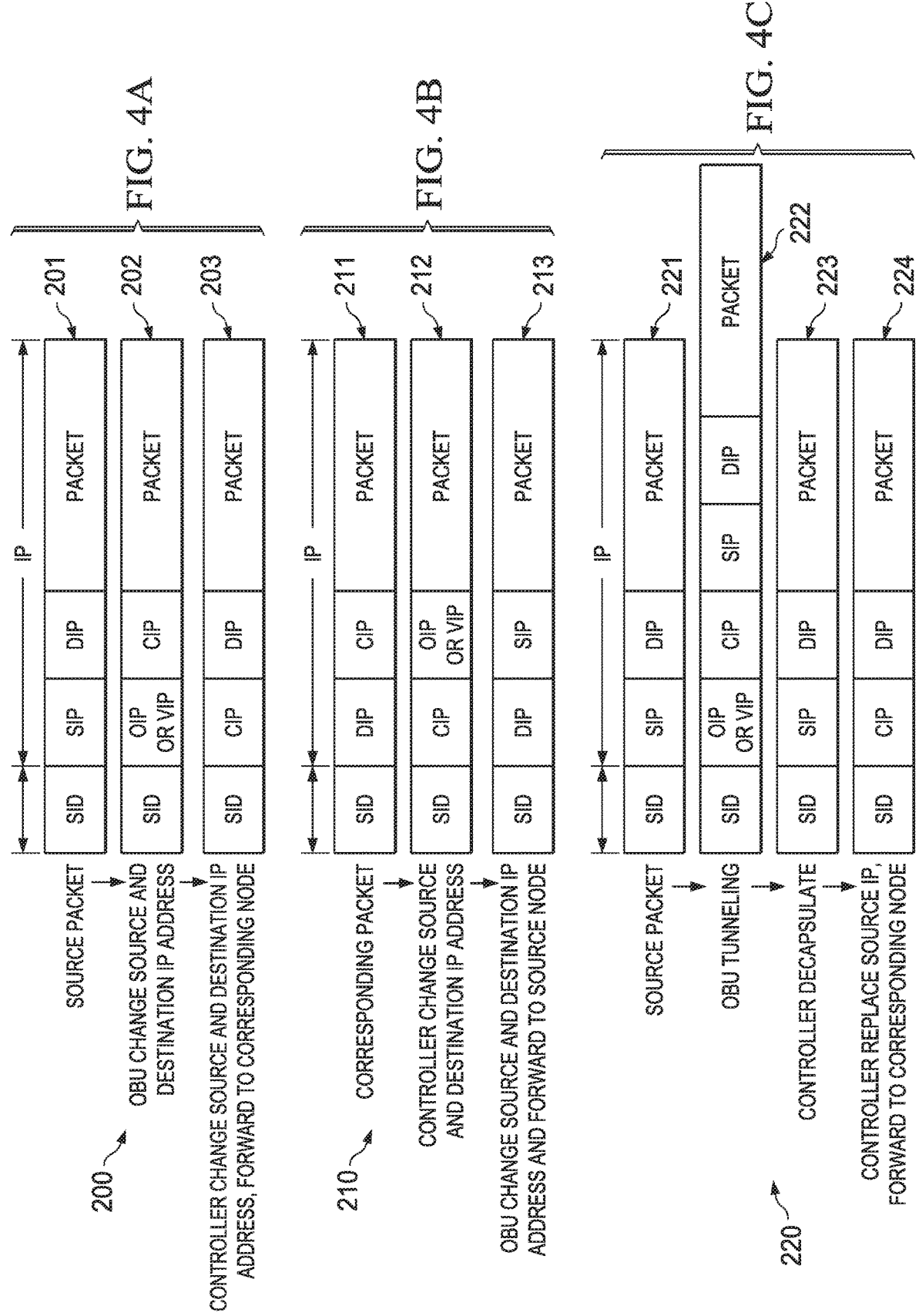
FIGS. 4A, 4B, and 4C are simplified representations of a network packet as it propagates through the communication system and external network in accordance with embodiments of the present disclosure.

FIGS. 4A, 4B, and 4C illustrate embodiments of mobility protocols that can be used to maintain seamless session continuity (i.e., moving between the same or different wireless access types does not break a session) from a moving vehicle. Thus, for example, if a file is being downloaded, the session migration will not affect the file download and it will continue in the new wireless connection. This can be accomplished by hiding or masking the IP address changes that occur due to mobility of the vehicle and resulting migration of sessions to other wireless access points from a source node generating the traffic flow (e.g., in-vehicle device, road-side user device, OBU itself) and from the destination node receiving the traffic flow (e.g., remote nodes such as a mobile device, a server, an end user computer, a datacenter, etc.) from a controller in a distributed network (e.g., the Internet). The IP address changes are hidden by OBU 30 and controller 90 sitting between the source and destination nodes. In one embodiment, ID mapping database 74 is communicated and synchronized between OBU 30 and controller 90 via a control communication protocol.

FIG. 4A illustrates an IP packet progression from a source node (e.g., in-vehicle device or road-side user device) to a destination node (e.g., electronic device, server, datacenter, etc.) with an OBU and a controller modifying and routing the IP packet between the source and the destination nodes. Packets could also be generated by the OBU itself if the OBU is the source node, in which case the source packet at 201 may not need to be created. Packets in FIGS. 4A, 4B, and 4C are simplified and shown without full headers for ease of illustration. An IP packet with IP addresses and the actual packet or data payloads is first created by a source at 201. The IP packet includes the source IP address (SIP) as the sender and destination IP address (DIP) as the receiver. When OBU 30 receives it, OBU 30 replaces the SIP with its own interface address as the sender at 202. If the OBU has a virtual IP address, then the VIP is used, otherwise a physical interface IP address is used. The OBU also replaces the DIP with the controller IP address (CIP) as the receiver. To each hop in the network (e.g., routers, switches, gateways, etc.), the IP packet will appear to be from OBU and will be forwarded to controller 90. When controller 90 receives the IP packet at 203, it will replace the sender address in the IP packet (OIP or VIP) with its own address (CIP) and it will replace the receiver address in the IP packet (CIP) with the original destination address (DIP).

FIG. 4B illustrates an IP packet progression of a response from the destination node to the source node of FIG. 4A. An IP packet is generated with the DIP as the sender IP address and the CIP as the receiver IP address at 211. The CIP is used as the receiver address because the OBU IP address and the source IP address have been hidden from the original destination node. When controller 90 receives the IP packet at 212, it will replace the sender address (DIP) in the IP packet with its own address (CIP) and it will replace the receiver address (CIP) in the IP packet with OBU IP address (OIP or VIP). When OBU 30 receives the IP packet at 213, OBU 30 replaces the sender IP address with the actual sender address (DIP) and replaces the receiver address with the source IP address (SIP). Thus, any IP address changes between the source and the destination are captured in IP mapping database 74, which is exchanged between OBU 30 and controller 90. In this embodiment, IP addresses are modified both at the OBU 30 and at the controller 90 before being routed to either the source or the destination. Accordingly, IP addresses associated with OBU 30, which can change due to the mobility of vehicle 4, are hidden from corresponding destination nodes to enable seamless migration by dynamically replacing an outdated OBU address with an updated OBU address. The updated OBU address is communicated to controller 90 by OBU 30 whenever an IP address change occurs and connectivity table 92 is updated accordingly.

FIG. 4C illustrates an IP packet progression from the source to the destination using another implementation to communicate IP address changes to controller 90. The IP packet is generated at 221 with the source IP address (SIP) as the sender and destination IP address (DIP) as the receiver. When OBU 30 receives it, OBU 30 replaces the SIP with its own interface address as the sender at 222. If the OBU has a virtual IP address, then the VIP is used, otherwise a physical interface IP address is used. The OBU also replaces the DIP with the controller IP address (CIP) as the receiver. Additionally, the IP interface mapping is tunneled within the IP packet, including the SIP and the DIP. Thus, controller 90 receives the tunneled mapping information to update connectivity table 92. When controller 90 receives the IP packet at 223, it decapsulates the IP packet and obtains the original IP packet generated by the source. Controller can then replace the sender address (SIP) in the IP packet with its own address (CIP) and forward the packet to the original destination (DIP). Return packets for this implementation could be the same as shown and described with reference to FIG. 4B.

An alternative embodiment that enables mobility support masks underlying mobility events from end devices (source and destination nodes) and an IP layer of an OBU by implementing a virtual interface layer between network and MAC layers on the OBU. The IP layer of the OBU is assigned a fixed IP address and any change in the IP address associated with physical interfaces during mobility can be handled by the virtual interface layer. Layers of a network stack of an OBU for mobility management in this embodiment include: Transmission Control Protocol (TCP), Stream Control Transmission Protocol (SCTP), Internet Protocol (IP), Virtual Interface, and Physical Interfaces (e.g., 802.11, 3G, etc.). Layers of a network stack of a controller for mobility management in this embodiment include: TCP, SCTP, IP, Physical Interfaces.

In this alternative embodiment, a device driver of a physical interface of OBU 30 is periodically scanned to determine possible road-side infrastructures to which the interface can connect. A virtual interface may be created for each viable road-side infrastructure device. Each virtual interface associates and authenticates with the corresponding road-side infrastructure through the real interface and attains an IP address. Statistics for each virtual interface may be gathered periodically. These statistics, together with user-specified policies on interface selection and possible future link performance predictions, can be used to determine the appropriate one or more road-side infrastructures through which to route packets.

When an OBU has a packet to send from a source node to a destination node, the IP layer uses the OBU's fixed address as a source address. The packet is then passed to the virtual interface layer which replaces the source address with the IP address of the virtual interface (VIP), corresponding to a physical interface. The packet is then tunneled to a controller that replaces the source address (VIP) with the controller's IP address.

When packets are sent from the destination node back to the source node, packets will arrive at the controller with the receiver IP address equal to the controller's IP address. The controller replaces the receiver address with that of the selected virtual interface. When the OBU receives the packet, the packet is passed to the virtual interface layer, which replaces the receiver address with the OBU's fixed address.

The controller maintains address and session mappings so that return traffic from the destination node to the source node can be routed to the right OBU. In one embodiment, multiple virtual interface IP addresses can be managed and signaling between the OBU and controller is to encapsulate all packets between the OBU and controller in SCTP. SCTP includes inherent multi-homing and address management capabilities. The translation between TCP and SCTP can be done by a SCTP2TCP proxy.

E. Mobility Scenarios

Turning to FIGS. 5-10, interface associations, interface modes, load balancing, and multi-hop links are illustrated. In FIGS. 5 through 10 exemplary network environments and network connectivity links between various network elements or nodes are illustrated. Each of FIGS. 5-10 includes one or more on-board units (OBUs) 130*a*, 130*b*, 130*c*, and 130*d* shown in vehicles 104*a*, 104*b*, 104*c*, and 104*d*, respectively. OBUs 130*a*, 130*b*, 130*c*, and 130*d* may be configured in the same manner as described with reference to OBU 30 of FIGS. 1-3, and may include the same components, modules, and elements as OBU 30. Similarly, controllers 145*a* and 145*b* may be configured in the same manner as described with reference to controller(s) 90 of FIG. 3, and may include the same components, modules, and elements as controller(s) 90. In-vehicle devices 118*a*, 118*b*, and 118*c* and road-side user device 110 are shown in some of FIGS. 5-10 connected to various OBUs. Internet 100 is illustrated with controllers 145*a* and 145*b*, road-side infrastructure device 140*a*, 140*b*, and 140*c* of one technology (e.g., 3G basestation), road-side infrastructure devices 142 and 146 of other technologies (e.g., 4G basestation and WiMax road-side unit, respectively), and a gateway 144, which enable network connectivity between the OBUs and corresponding remote nodes 120 and 122. In addition, various solid and dashed lines are drawn between various components (e.g., OBUs, road-side user device, road-side infrastructure devices, controllers, corresponding remote nodes, gateways, etc.) and such lines represent network traffic flow of data packets between the components in a direction indicated by a corresponding arrow or arrows of the particular line.

Figure 5:
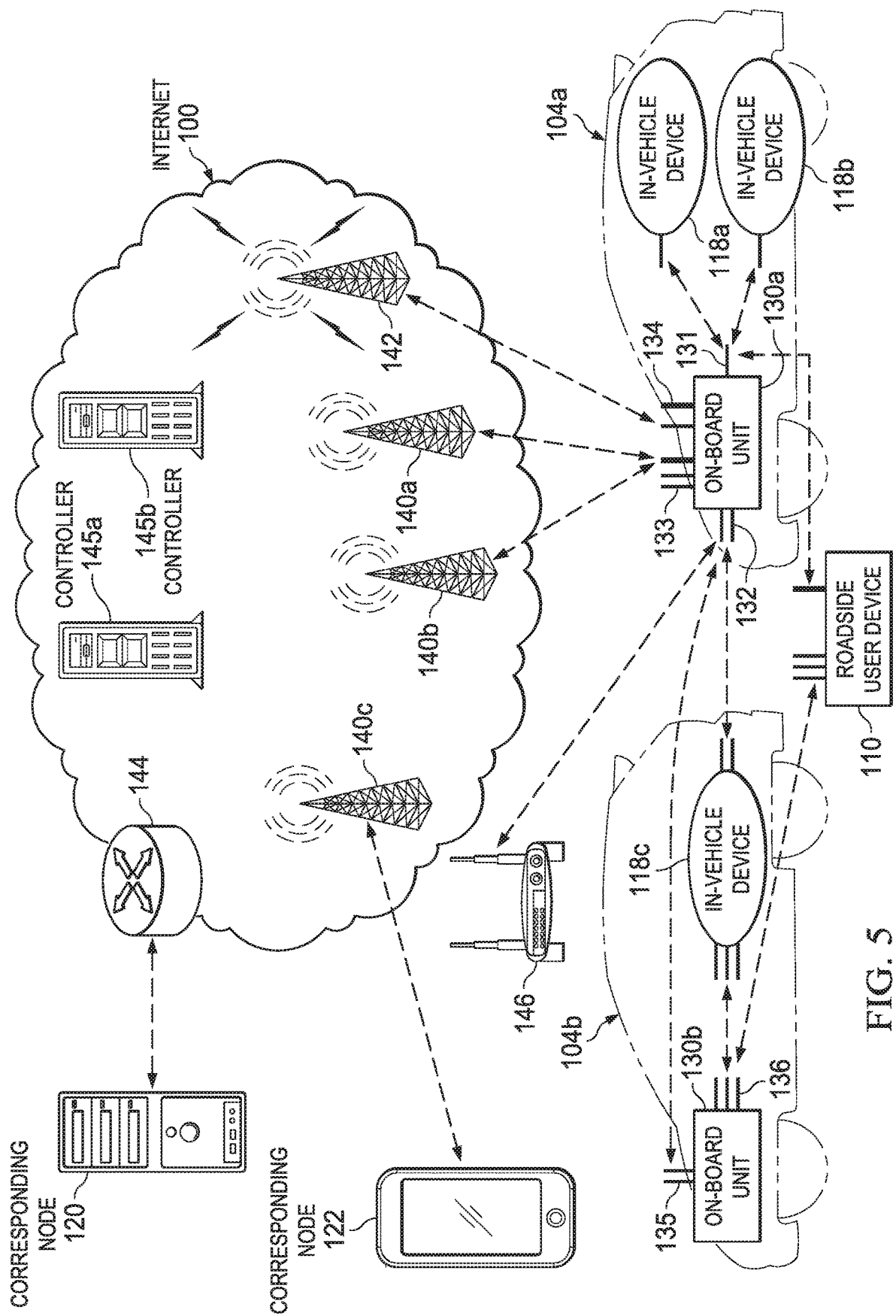
FIG. 5 is a simplified schematic diagram of an exemplary vehicular network environment illustrating various access and network interface associations in accordance with embodiments of the present disclosure.

FIG. 5 illustrates the overall connected vehicle architecture components, data flow, and features by providing example OBUs with various access and network interface associations and various network connectivity. Both OBUs 130*a* and 130*b* have interfaces in hub mode and peer mode, and OBU 130*a* also has interfaces in road-side infrastructure mode for communication with different types of wireless infrastructure devices. Controllers 145*a* and 145*b* and two corresponding nodes 120 and 122 are all connected to the Internet 100. Although it will be apparent that numerous network connectivity possibilities and mobility scenarios are possible, including more complex and sophisticated arrangements, FIG. 5 provides an example network environment as a frame of reference from which the various features of communication system 10 can be further described and understood.

Network interface association and access interface association, as used herein, include discovery, authentication if necessary, and IP address assignment if any. Access interface association is a process in which an in-vehicle device or a road-side user device, within a wireless coverage area of multiple hub-mode interfaces, selects and associates with one or more of the interfaces. The hub mode interfaces may belong to a single OBU or to different OBUs. Furthermore, they may have the same wireless technology or different technologies, and they may belong to a single management domain or to different management domains.

Access interface association is illustrated in FIG. 5. In-vehicle device 118*a* of vehicle 104*a* has a hub mode interface associated exclusively with a hub mode interface 131 of OBU 130*a*. In-vehicle device 118*b* also has a hub mode interface associated exclusively with hub mode interface 131 of OBU 130*a*. In-vehicle device 118*c* of vehicle 104*b* has two interfaces. A first interface of in-vehicle device 118*c* is associated exclusively with a hub mode interface 136 of OBU 130*b* and a second interface of in-vehicle device 118*c* is associated exclusively with an interface 132 (having multiple interface modes) of the other OBU 130*a*. Although each of the hub mode interfaces of in-vehicle devices 118*a*, 118*b*, and 118*c* is associated exclusively with a hub mode interface on one of OBUs 130*a* and 130*b*, each of the interfaces of in-vehicle devices 118*a*, 118*b*, and 118*c* could be associated with multiple hub mode interfaces on the same or different OBUs. Road-side user device 110 has two interfaces in which a first interface is associated with interface 136 of OBU 130*b*, and a second interface is associated with interface 131 of OBU 130*a*.

FIG. 5 also illustrates some network interface association scenarios. While an OBU interface is in road-side infrastructure mode or in peer mode, the OBU interface may be under the coverage area, respectively, of any number of road-side infrastructure devices or any number of other OBUs and/or other devices in peer mode. Network interface association is the process of selecting and associating with one or more of these interfaces. When an OBU interface is under a coverage area, the interface is considered available for network connectivity. The road-side infrastructure devices and the other OBUs and devices may be the same or different wireless technologies and management domains.

In FIG. 5, both OBU 130*a* and OBU 130*b* have an interface in peer mode where a peer mode interface 135 of OBU 130*b* is associated exclusively with interface 132 of OBU 130*a*. Interface 132 of OBU 130*a* is also associated with road-side infrastructure device 146 and in-vehicle device 118c. Road-side infrastructure device 146 could also be connected to one or more other OBUs and/or to the Internet 100, for example. OBU 130a includes two additional interfaces in road-side infrastructure mode. One road-side infrastructure mode interface 133 is associated with road-side infrastructure devices 140a and 140b. Another road-side infrastructure mode interface 134 of OBU 130a is associated exclusively with road-side infrastructure device 142. Additionally, the representative corresponding nodes 120 and 122, with which OBUs 130a and 130b may communicate, are shown connected to Internet 100 via gateway 144 and roadside infrastructure device 140c, respectively.

The interfaces shown on OBUs 130a and 130b, road-side user device 110, and in-vehicle devices 118a, 118b, and 118c are shown for example purposes, and these OBUs and devices may each be alternatively configured with more or less interfaces based on particular component configurations and/or needs. In addition, the road-side infrastructure devices 140a, 140b, 140c, and 142 are also exemplary and show possible scenarios of wireless coverage. However, any number of more or less (including none) road-side infrastructure devices may have a wireless coverage area inclusive of a particular OBU interface at any given time and location.

Access and network interface associations can be further divided into two subcategories: 1) Single association (1:1)—one wireless interface associated exclusively with one wireless interface, and 2) Multiple associations (1:n)—one wireless interface associated with multiple (n) wireless interfaces. Different interface association possibilities are described in the table below for an arbitrary interface $I_0$. In one embodiment, for multiple associations (i.e., 1:n), transmissions from $I_0$ to $I_1, \ldots, I_n$ can be unicast, multicast, or broadcast. In addition, a list of corresponding wireless interfaces with which $I_0$ can associate may change over time, thereby necessitating association list updates.

FIG. 6 from in-vehicle device 118a to corresponding node 122 and from corresponding node 122 back to in-vehicle device 118a. FIG. 6 also illustrates traffic flows between in-vehicle device 118a and corresponding node 122, migrated from one interface of OBU 130a to another interface of OBU 130a, which could occur as vehicle 104a travels to a different wireless coverage area. In one example, in-vehicle device 118a and corresponding node 122 could each be mobile phones and the network communication could be a cellular call from in-vehicle device 118a via OBU 130a.

Communication system 10 enables seamless mobility when migrating traffic flow from one interface of an OBU to another interface of the OBU. In the scenario illustrated in FIG. 6, each of the OBU interfaces 131, 132, 133, and 134 has a unique network address (e.g., Internet Protocol (IP) address). In-vehicle device 118a initially sends packets to OBU 130a via interface 131. OBU 130a modifies the packet by substituting a source IP address of the packet with an IP address of its outgoing interface (e.g., interface 133). In this illustrated scenario, OBU 130a has two tunnels (e.g., UDP or TCP tunnels) established with controller 145a and sends the modified packet to controller 145a in the first tunnel through road-side infrastructure device 140a and the Internet 100. Controller 145a extracts the packet and may modify the packet by substituting the source IP address with its own IP address. Controller 145a then forwards the modified packet to corresponding node 122 via road-side infrastructure device 140c and the Internet 100.

For the reverse traffic flow, corresponding node 122 sends a packet back to controller 145a (in this example via road-side infrastructure device 140c and the Internet 100). Controller 145a recognizes that the session is associated with in-vehicle device 118a (e.g., by reference to connectivity table 92) and modifies the packet by replacing the destination IP address with the IP address of the selected return interface 134 on OBU 130a. Controller 145a then

| Access Interface Selection Hub mode | Network Interface Selection | |
|---|---|---|
| | Road-side infrastructure mode | Peer mode |
| 1:1 A wireless interface ($I_0$) on an in-vehicle or road-side user device is associated with one wireless interface ($I_1$ in hub mode) on an on-board unit. While $I_0$ is only associated with $I_1$, $I_1$ can have other wireless devices associated with it. | A wireless interface ($I_0$ in road-side infrastructure mode) on an on-board unit is associated with one wireless interface on a road-side infrastructure ($I_1$). While $I_0$ is only associated with $I_1$, $I_1$ can have other wireless devices associated with it. | A wireless interface ($I_0$ in peer mode) on an on-board unit is associated with one wireless interface on another on-board unit or device ($I_1$). $I_1$ is associated only to $I_0$. This is direct peer-to-peer connection between two interfaces. |
| 1:n A wireless interface ($I_0$) on an in-vehicle or road-side user device is associated with n wireless interfaces ($I_1, \ldots, I_n$ in hub modes) on an on-board unit or on multiple on-board units. Interfaces $I_1, \ldots, I_n$ can have other wireless devices associated with them. | A wireless interface ($I_0$ in road-side infrastructure mode) on an on-board unit is associated with n wireless interfaces ($I_1, \ldots, I_n$) on a road-side infrastructure or on multiple road-side infrastructures. Interfaces $I_1, \ldots, I_n$ can have other wireless devices associated with them. | A wireless interface ($I_0$ in peer mode) on an on-board unit is associated with n wireless interfaces ($I_1, \ldots, I_n$) on another on-board unit/device or on multiple other on-board units/devices. Interfaces $I_1, \ldots, I_n$ can have other wireless devices associated with them. This allows the formation of a multiply connected peer network. |

Turning to FIG. 6, an example scenario is depicted in which in-vehicle device 118a initiates network communication to corresponding node 122. Traffic flows are shown in sends the modified packet to OBU 130a in a second tunnel established between controller 145a and interface 134 of OBU 130a through the Internet 100 and road-side infrastructure device 142. After the packet is received on interface 134, OBU 130a modifies the packet by replacing the destination IP address with the address of in-vehicle device 118a. OBU 130a then forwards the packet to in-vehicle device 118a through interface 131. Consequently, OBU 130a and corresponding node 122 cannot detect address changes of each other due to mobility.

To achieve session migration from one interface to another, OBU 130a communicates to controller 145a the IP address mapping between in-vehicle device 118a and the interface it uses for a particular session or packet. In the example illustrated in FIG. 6, as vehicle 104a moves, OBU 130a loses connection with road-side infrastructure devices 140a and 142, which carry outgoing and return traffic, respectively, for in-vehicle device 118a. OBU 130a may select a new road-side infrastructure device 140b and traffic flow can be migrated to the new interface. Because the active interface 133 may have acquired a new IP address, controller 145a is notified of any new IP address mapping and subsequently forwards traffic via this interface 133 with its new IP address.

Figure 7A:
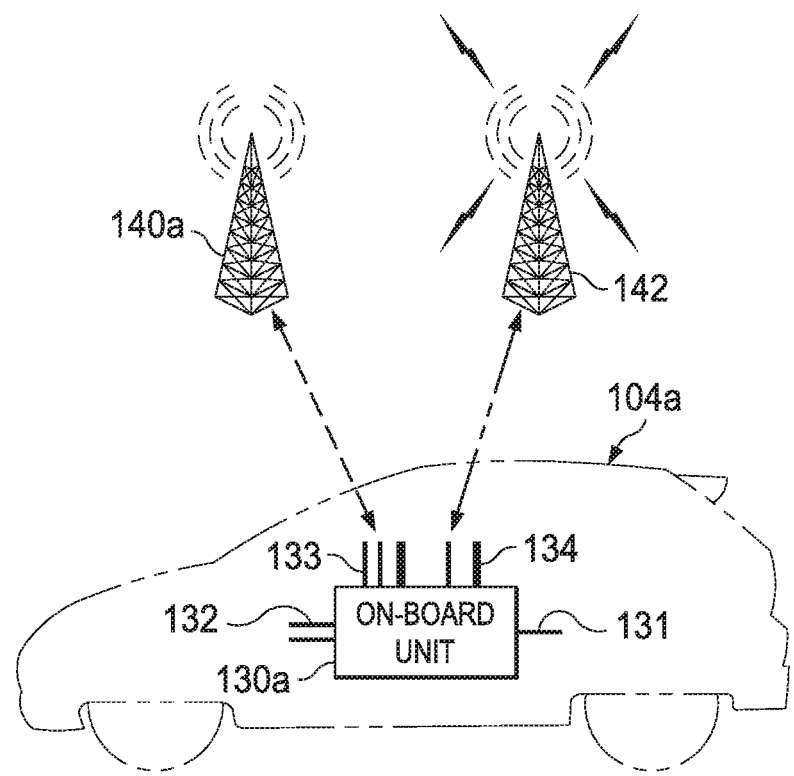
FIGS. 7A and 7B are simplified schematic diagrams of an exemplary vehicular network environment illustrating vertical and horizontal handoffs of network traffic, respectively, associated with embodiments of the present disclosure.
Figure 7B:
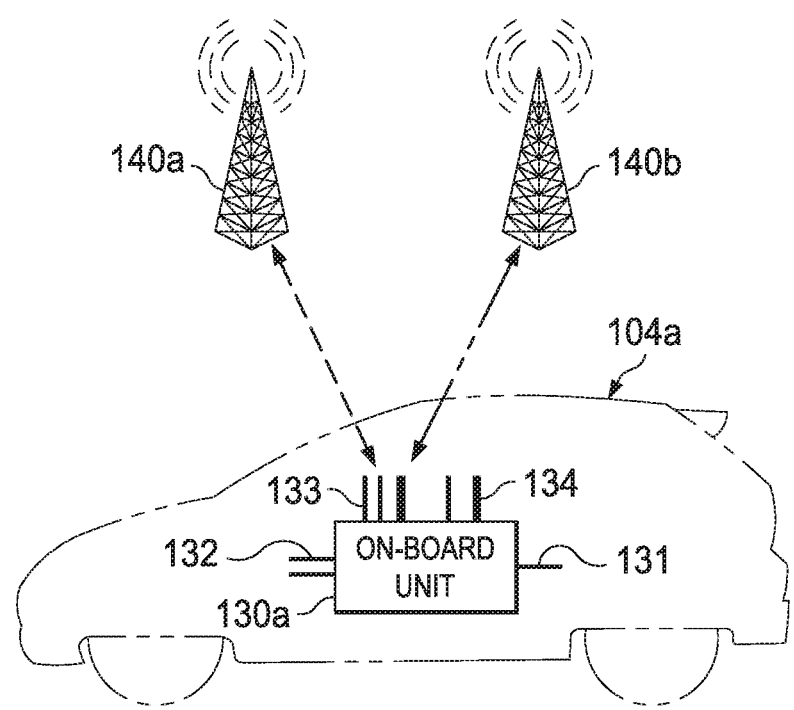

Turning to FIGS. 7A and 7B, two handoff scenarios are depicted. In FIG. 7A, a vertical handoff occurs between two road-side infrastructure devices 140a and 142, of different technology types. Two interfaces 133 and 134 are involved in this process. In FIG. 7B, a horizontal handoff occurs between two road-side infrastructure devices 140a and 140b having the same technology type. Only one interface 133 of OBU 130a is involved in this process.

In both horizontal and vertical handoffs, if OBU 130a is within a coverage area of both interfaces 133 and 134 for some period of time, OBU 130a can try to associate with the new interface first and then migrate traffic to the new interface (i.e., a soft handoff). Alternatively, the old interface is disconnected and after some time, the new interface is connected (i.e., a hard handoff). During the temporary period of disconnection, since an in-vehicle device and a corresponding node do not know the original link is disconnected, they will assume that a connection is still available. Thus, any session between them will not disconnect immediately. For TCP traffic, a time out interval may be set by a user to determine how long a session will remain active. If the new interface is connected before the time out, then the session will resume on the new interface.

Figure 8:
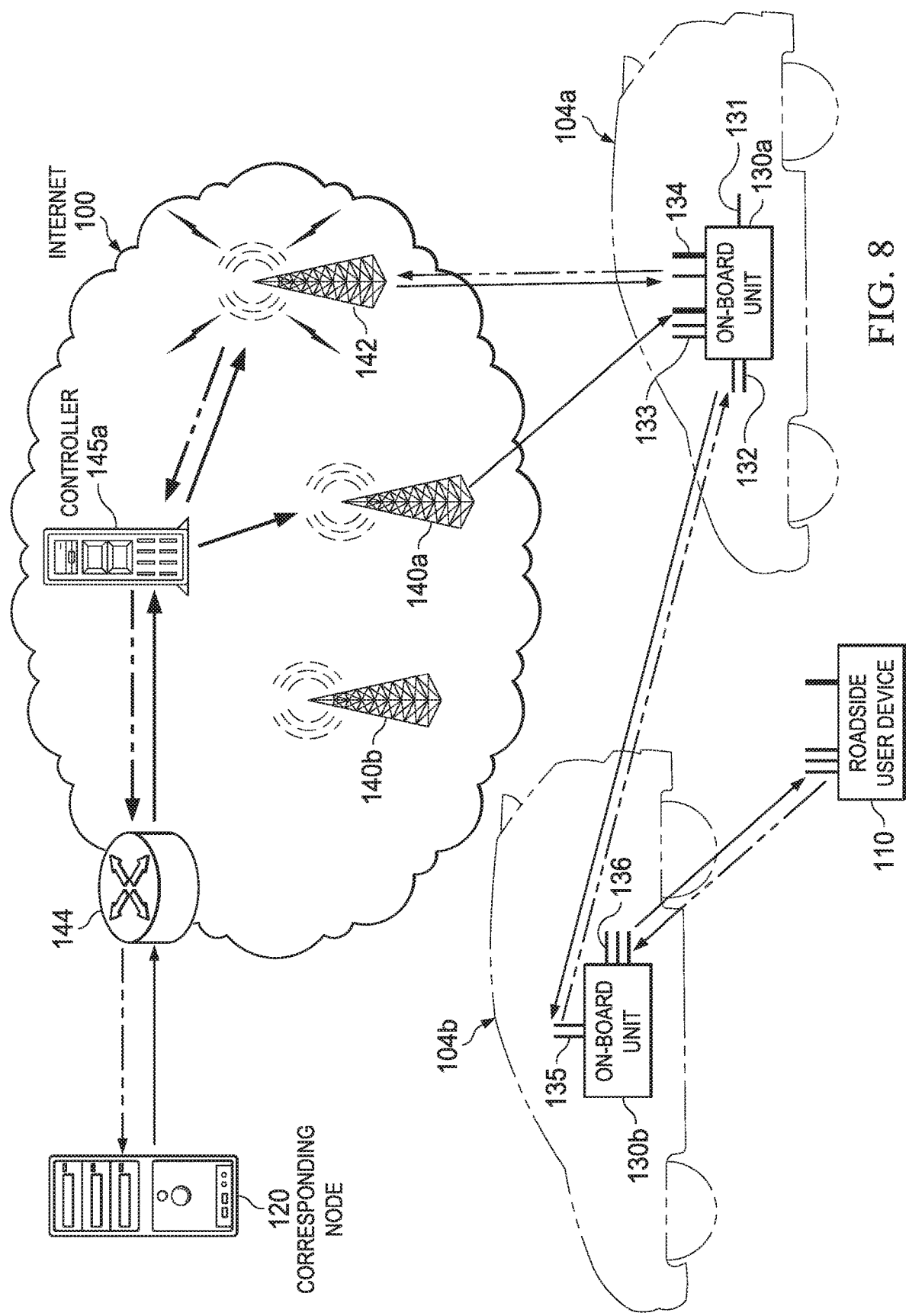
FIG. 8 is a simplified schematic diagram of an exemplary vehicular network environment illustrating load balancing associated with embodiments of the present disclosure.

Turning to FIG. 8, FIG. 8 depicts another example scenario in which hybrid mobility and load balancing are illustrated. Road-side user device 110 initiates network connectivity in order to communicate with corresponding node 120. In one example, road-side user device 110 may initiate such communication in order to download a file from corresponding node 120. Road-side user device 110 sends request packets to OBU 130b in hub mode via interface 136, and OBU 130b forwards the request packets (with modified IP address information) from interface 135 to OBU 130a via interface 132 in peer mode. OBU 130a selects an interface for outgoing traffic, such as interface 134, modifies a source IP address of the packets with the IP address of selected interface 134, and tunnels the packets to controller 145a via road-side infrastructure device 142. Controller 145a extracts the packet and substitutes the source IP address with its own IP address and forwards the packets to corresponding node 120 via gateway 144.

The requested file from corresponding node 120 is sent to controller 145a, which performs load balancing for the traffic flow. Controller 145a may split data in the traffic flow onto two paths, which are tunneled to different interfaces of OBU 130a. Specific packet allocation percentage may be determined by interface selection module 68 of connection manager 60 of OBU 130a. As shown in FIG. 8, controller 145a may forward one set of packets to interface 134 via road-side infrastructure device 142 and another set of packets to interface 133 via road-side infrastructure device 140a. Once OBU 130a receives the packets, they are arranged back into sequence, the destination IP address is replaced with the address of road-side user device 110 and the packets are forwarded from interface 132 to road-side user device 110 via OBU 130b.

As vehicle 104b with OBU 130b moves away from vehicle 104a with OBU 130a, road-side user device 110 may lose connectivity with corresponding node 120. If OBU 130a moves into range before OBU 130b moves away, however, then road-side user device 110 may associate with OBU 130a and session continuity can be maintained.

In another scenario of events, hybrid mobility may be introduced. Assume that an entirely new OBU A moves into range and road-side user device 110 associates with the new OBU A. In this case, road-side user device 110 may obtain a new IP address and the original session will terminate if no additional measure is taken by the OBUs and controllers. Hybrid mobility schemes, however, can maintain ongoing seamless mobility. In one implementation, Mobile IP protocol can be used to tunnel traffic between OBU 130a and the new OBU A. In this way, OBU 130a acts as a home agent and the new OBU A acts as a foreign agent. In another implementation, controller 145a notifies the new OBU A of the IP address of road-side user device 110 and suppresses the assignment of a new IP address to road-side user device 110. Thus, road-side user device 110 simply sends remaining traffic to the new OBU A, which takes over the job of traffic routing from OBU 130a.

Figure 9:
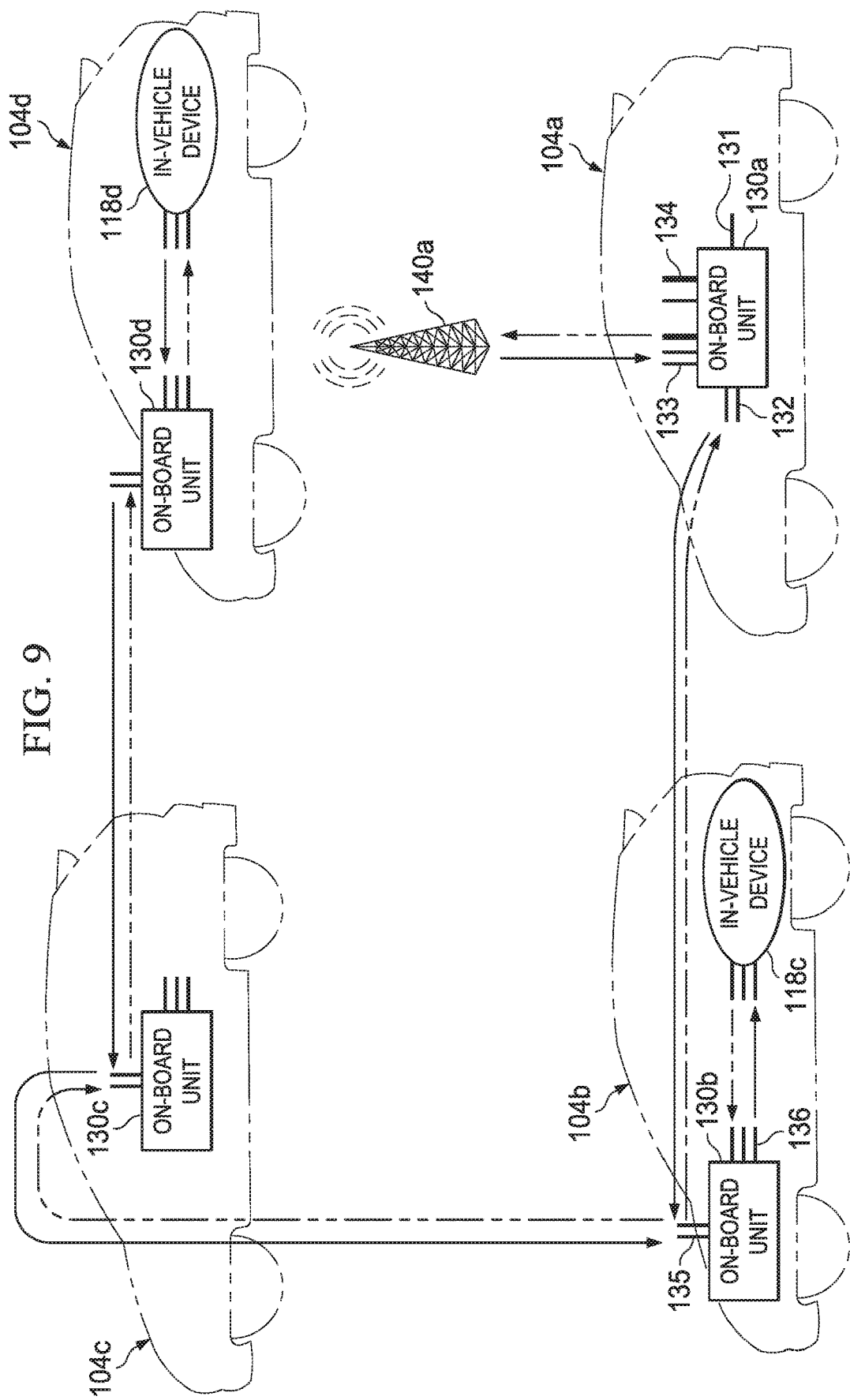
FIG. 9 is a simplified schematic diagram of an exemplary vehicular network environment illustrating multi-hop routing associated with embodiments of the present disclosure.

With reference to FIG. 9, FIG. 9 illustrates an example scenario of multi-hop routing through road-side infrastructure or peer-to-peer modes. Traffic from in-vehicle devices can go through multiple OBUs connected in peer-to-peer mode before reaching an OBU for access to network infrastructure. In-vehicle devices and/or road-side user devices can also communicate with one another via multi-hop routing between OBUs connected in peer-to-peer mode. In the example of FIG. 9, multi-hop routing is used to connect in-vehicle device 118c of vehicle 104b to road-side infrastructure device 140a. Packets may be sent from in-vehicle device 118c to OBU 130b via interface 136, OBU 130b may forward the packets from interface 136 to interface 132 of OBU 130a, and OBU 130a may select an interface (e.g., interface 133) for exchanging packets with road-side infrastructure device 140a. Also shown in FIG. 9 is in-vehicle device 118c communicating with in-vehicle device 118d of vehicle 104d using multi-hop routing. Packets may travel between devices 118c and 118d via OBU 130b, OBU 130c, and OBU 130d. Ad hoc routing protocols may be configured to achieve this multi-hop routing in vehicular networks.

Figure 10:
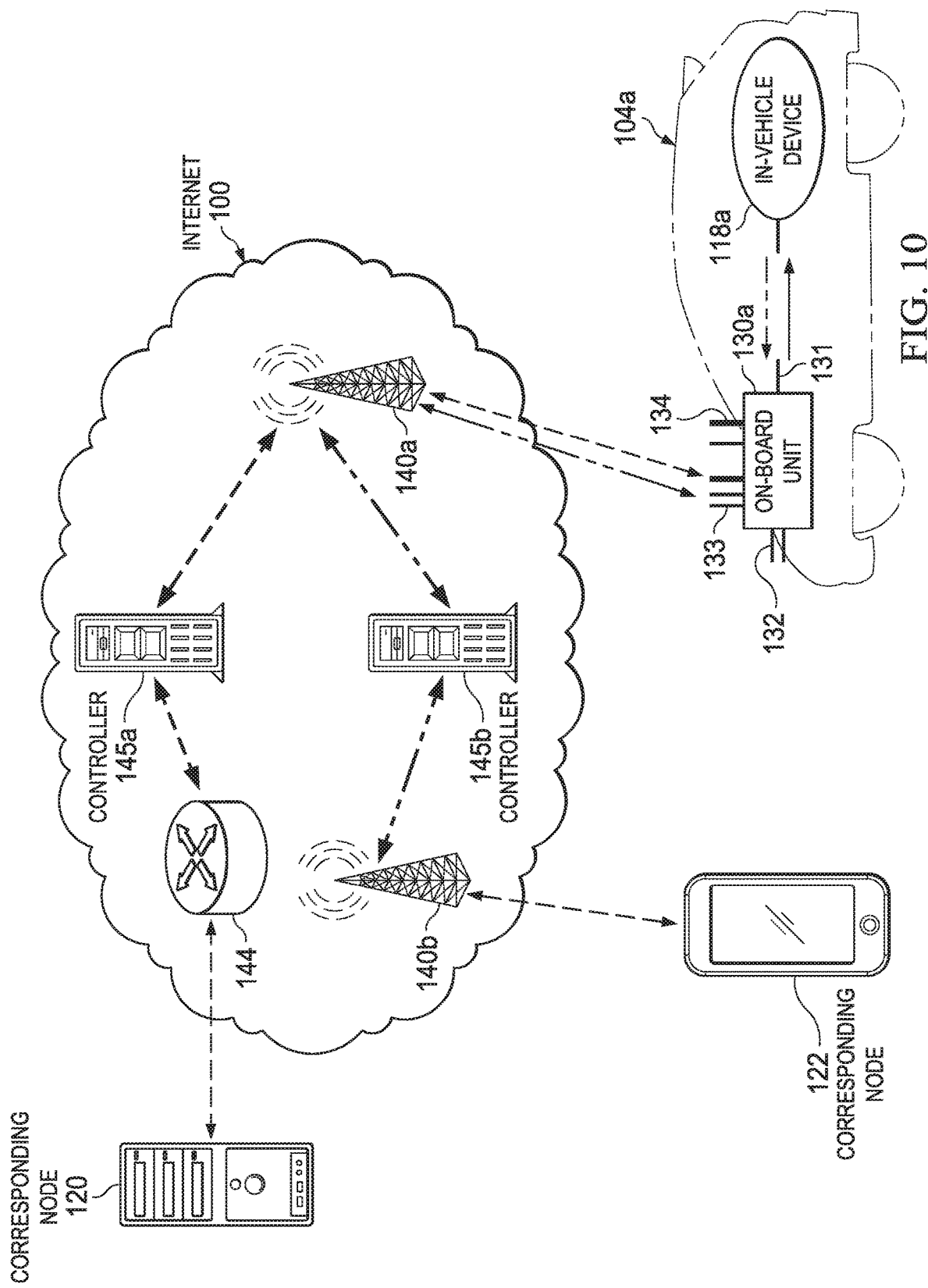
FIG. 10 is a simplified schematic diagram of an exemplary vehicular network environment illustrating multi-hop routing through controllers associated with embodiments of the present disclosure.

FIG. 10 is a scenario illustrating a network of distributed controllers of a communication system 10. Because millions of network-enabled vehicles may exist in the future, traffic demand is likely to far exceed processing capabilities of a single controller. Thus, a network of distributed controllers may be provided to provide sufficient capacity relative to the anticipated demand.

An OBU, upon initialization, associates with at least one controller. If the OBU associates with a group of controllers, it may select the best controller (e.g., to minimize round trip delay, to minimize congestion, etc.) and use the other controllers as backup. Alternatively, the OBU may tunnel traffic to multiple controllers in a time division fashion for improved load balancing and/or redundancy.

It may be desirable for an OBU to migrate traffic from one controller to another. For example, if the routing path through the existing controller is unacceptably long, traffic flow may be switched to another controller that can reduce round trip delay. For example, round trip delay could be reduced by selecting a controller that is geographically the nearest or by selecting a controller that is less loaded. New sessions arriving on the OBU can be tunneled to the new controller. Existing sessions either continue to be tunneled via the old controller or be disconnected and restarted via a tunnel to the new controller. In the example of FIG. 10, in-vehicle device 118a communicates with corresponding node 122 via controller 145b, which is an old session. After some time, OBU selects controller 145a as the new controller. In-vehicle device 118a can communicate with corresponding node 120 via controller 145a, which is a new session, while the old session established between in-vehicle device 118a and corresponding node 122 continues to be tunneled through controller 145b.

F. Processing Flows

Figure 11:
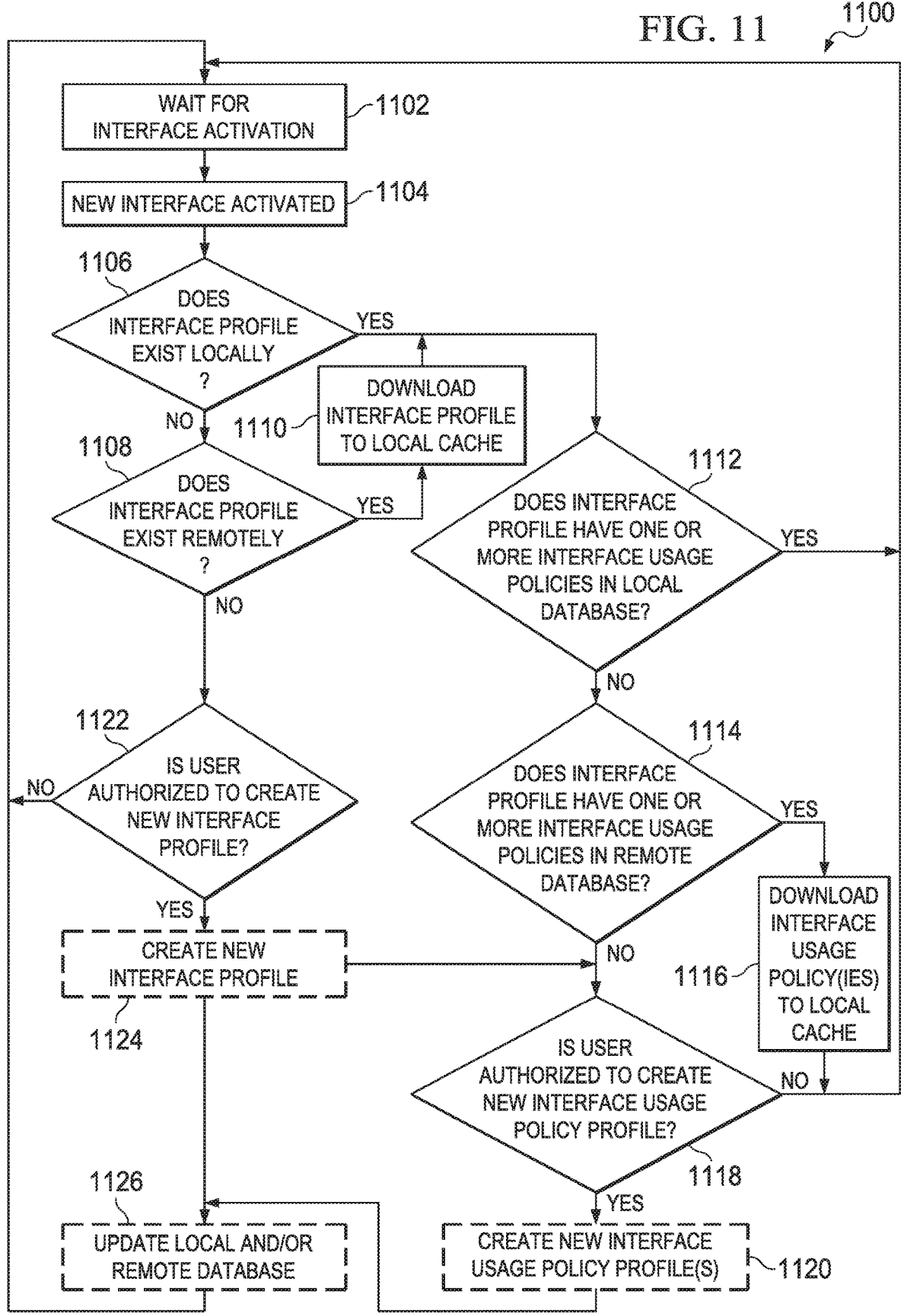
FIGS. 11-17 are simplified flowcharts associated with possible activities associated with the OBU of FIG. 3 in the communication system of the present disclosure.

Turning to FIGS. 11-17, simplified flowcharts illustrate various activities and processes associated with communication system 10. FIG. 11 illustrates a flow corresponding to interface profile and usage policy module 86 for identifying or creating, if authorized, an interface profile and/or an interface usage policy. In one embodiment, interface profile and usage policy flow 1100 begins at 1102 whenever interface activation is detected. After the interface is activated at 1104, a determination is made as to whether an interface profile exists locally (e.g., in interface profiles database 83) for the activated interface. If an interface profile does not exist locally, then a determination is made at 1108 as to whether an interface profile exists remotely. If an interface profile is not stored locally or remotely, then a determination is made at 1122 as to whether the user is authorized to create a new interface profile. If the user is not authorized to create a new interface profile, then the flow moves to 1102 to wait for another interface activation. In this scenario, a default interface profile may be used for the activated interface. If the user is authorized to create a new interface profile, however, then the user can create a new interface profile at 1124 and a local memory element (e.g., interface profiles database 83) and/or a remote memory element is updated at 1126.

With reference again to step 1108, if an interface profile is determined to exist remotely, then the interface profile can be downloaded to local cache at 1110. If the interface profile is downloaded to local cache at 1110, of if the interface profile exists locally as determined at 1106, then interface usage policies corresponding to the identified interface profile, are identified or created, if authorized. A determination is made at 1112 as to whether the interface profile has one or more interface usage policies in a local memory element (e.g., interface policy database 84). If one or more interface usage policies exist locally, then flow moves to 1102 to wait for another interface activation. If, however, no interface usage policies exist locally, then a determination is made at 1114 as to whether one or more interface usage policies exist in a remote memory element.

If an interface profile is not stored locally or remotely, then a determination is made at 1118 as to whether the user is authorized to create a new interface usage policy corresponding to the identified interface profile. If the user is not authorized to create a new interface usage policy, then the flow moves to 1102 to wait for another interface activation and no user created interface usage policy is identified. In this scenario, a default interface usage policy may be accessed for the interface profile. If the user is authorized to create a new interface profile, however, then the user can create one or more new interface usage policies at 1120 and a local memory element (e.g., interface policy database 84) and/or remote memory element is updated at 1126. With reference again to step 1114, if an interface usage policy is determined to exist remotely, then the interface usage policy can be downloaded to local cache at 1116. If the interface usage policy is downloaded to local cache at 1116, or if the interface usage policy exists locally as determined at 1112, then the flow moves to 1102 to wait for another interface activation.

Figure 12:
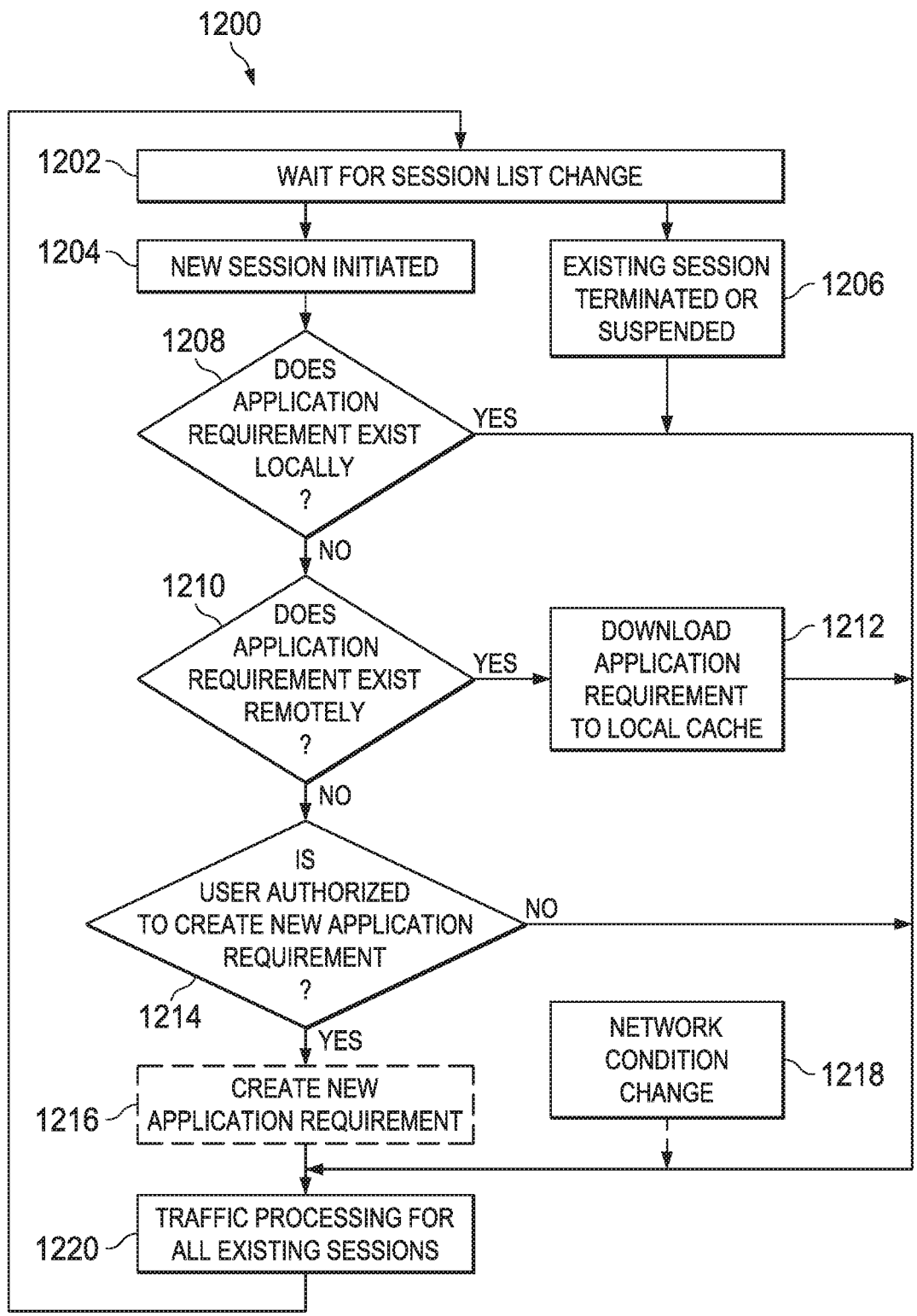

Turning to FIG. 12, FIG. 12 illustrates a flow corresponding to application requirements module 65 for identifying or creating, if authorized, application requirements and for performing traffic processing for all existing sessions. In one embodiment, application requirements flow 1200 begins at 1202 whenever a session list of an OBU changes. For example, whenever a session is initiated (e.g., web browsing, file downloads, etc.) a new session ID will be added to the session list. If an existing session is terminated or suspended at step 1206, the flow moves to 1220 where traffic processing is performed on all existing sessions. Traffic processing corresponds to traffic processor 34, and may include coding or data fusion. Traffic processing may be functionally separated from updating and/or creating application requirements, but may be configured to initiate whenever a change occurs in the session list or when network conditions change as indicated at 1218. Thus, if network performance deteriorates or other conditions change more than a predetermined tolerance threshold, then traffic processing may occur for all existing sessions at 1220 and flow then returns to 1202 to wait for another session list change.

If a new session is initiated at 1204, then a determination is made at 1208 as to whether application requirements exist locally (e.g., in application requirements database 82) for an application corresponding to the initiated session. If application requirements exist locally, then traffic processing is performed at 1220 for all existing sessions and flow returns to 1202 to wait for another session list change. However, if application requirements do not exist locally as determined at 1208, then a determination is made at 1210 as to whether application requirements exist remotely. If application requirements exist remotely, then the application requirements for the initiated session can be downloaded to local cache at 1212. Traffic processing may then be performed at 1220 for all existing sessions and flow returns to 1202 to wait for another session list change.

If application requirements are not stored locally or remotely, then a determination is made at 1214 as to whether the user is authorized to create new application requirements. If the user is not authorized to create new application requirements, then traffic processing is performed at 1220 for all existing sessions and flow moves to 1202 to wait for another session list change. If the user is authorized to create new application requirements, however, then the flow moves to 1216 where the user can create new application requirements. Once new application requirements have been created, traffic processing may be performed at 1220 and flow returns to 1202 to wait for another session list change.

Figure 13:
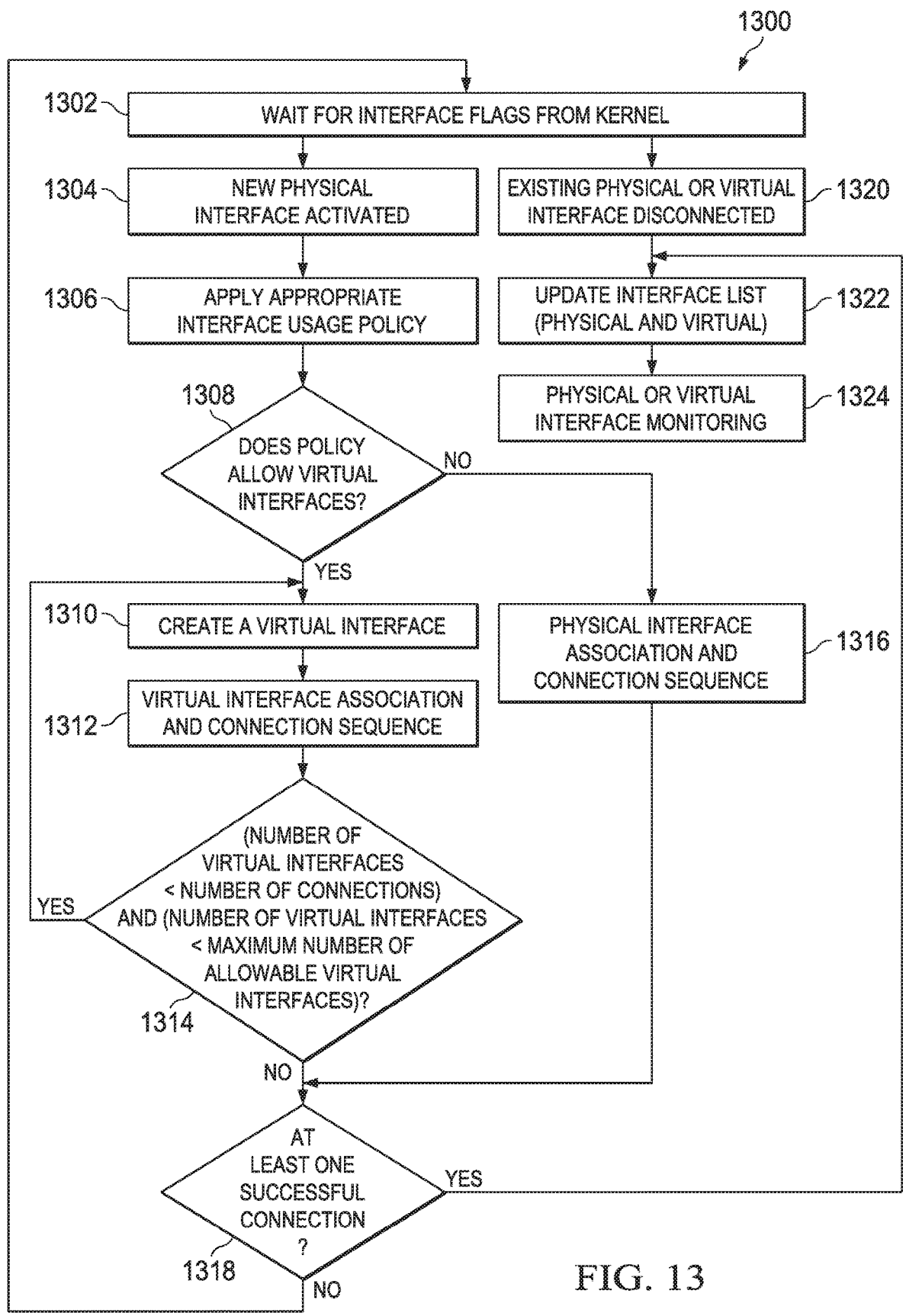

FIG. 13 illustrates a simplified flowchart of an interface monitoring flow 1300, which corresponds to interface monitoring module 66 of connection manager 60. In one embodiment, interface monitoring flow 1300 begins at 1302, waiting for interface flags from the kernel. If an interface flag from the kernel indicates an existing physical or virtual interface has been disconnected at 1320, then the interface list (with both physical and virtual interfaces) is updated at 1322. Interface monitoring of both physical and virtual interfaces continues, as indicated at 1324.

If an interface flag from the kernel indicates a new physical interface has been activated at 1304 (e.g., WiFi interface is in a coverage area of another vehicle or a WiFi access point, a 3G interface is within a coverage area of a basestation), the appropriate interface usage policy is applied at 1306. The appropriate interface usage policy can be identified by a combination of the interface profile ID and a corresponding agent ID and/or application ID. The interface usage policy is evaluated at 1308 to determine whether the policy allows virtual interfaces. If the interface usage policy allows virtual interfaces, then a virtual interface is created at 1310. Virtual interface association and connection sequence is performed at 1312 to activate the newly created virtual interface. A determination is made at 1314 as to whether a number of existing virtual interfaces is less than a number of connections and if a number of existing virtual interfaces is less than a maximum number of allowable interfaces. If a maximum allowable number of virtual interfaces has not been created and if the number of virtual interfaces is less than the number of available connections, then another virtual interface may be created at 1310. This loop continues until a number of virtual interfaces is greater than or equal to the number of connections or until the number of virtual interfaces equals or exceeds the maximum number of allowable virtual interfaces.

If it is determined that the interface usage policy does not allow virtual interfaces at 1308, the physical interface association and connection sequence is performed at 1316 to activate the new physical interface. After the physical interface association and connection sequence occurs at 1316, or after virtual interfaces have been created for all available connections and/or a maximum number of virtual interfaces has been created as determined at 1314, then it is determined at 1318 whether at least one successful physical or virtual interface connection has been made. If a successful connection has been made, then the interface list for physical and virtual interfaces is updated at 1322 and interface monitoring continues at 1324. If a successful connection has not been made as determined at 1318, then flow passes back to 1302 to wait for interface flags.

Figure 14:
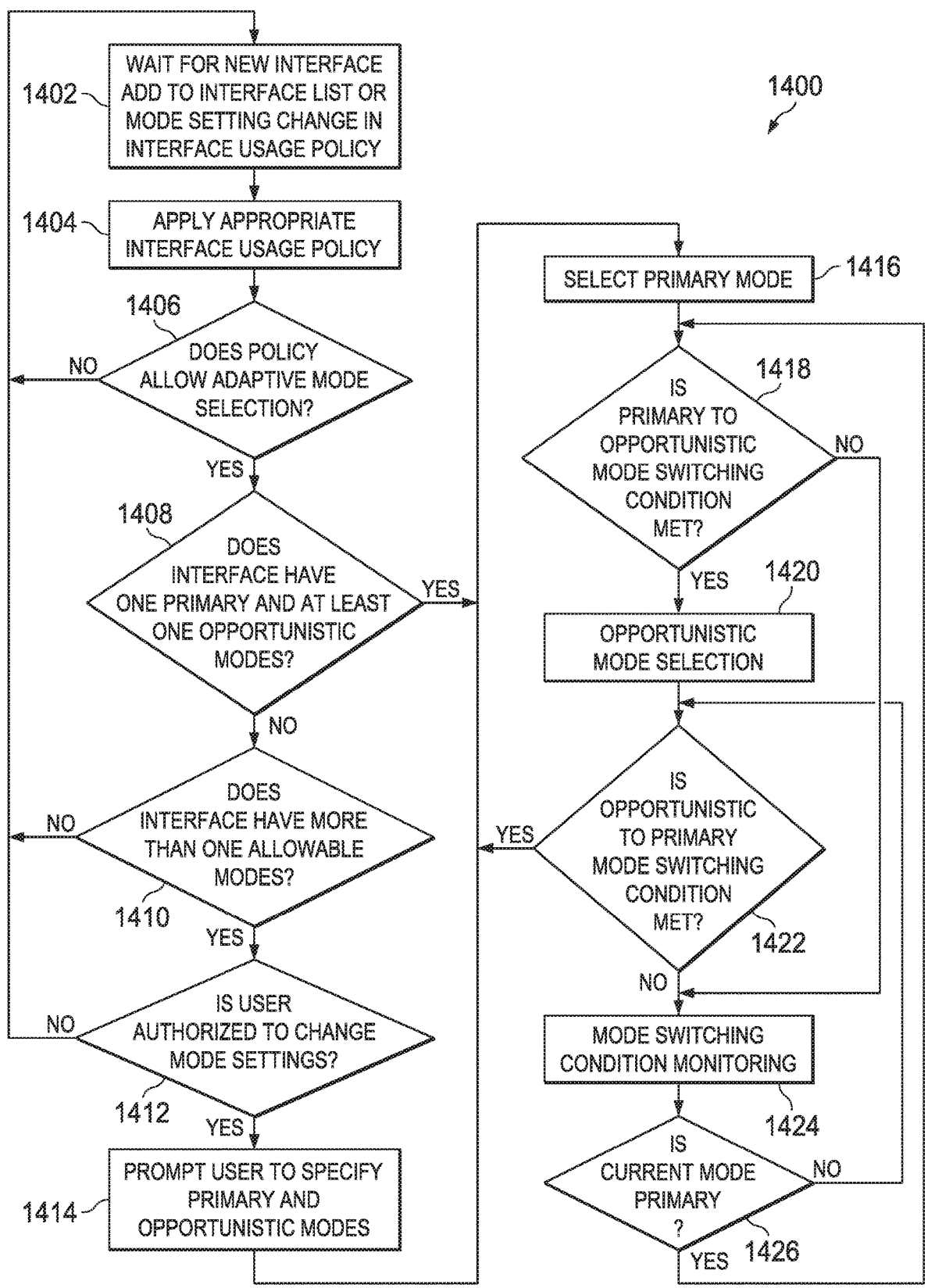

Turning to FIG. 14, FIG. 14 illustrates a simplified flowchart of a mode selection flow 1400 corresponding to mode selection module 64 of connection manager 60. Flow 1400 begins at 1402, waiting for a new interface added to the interface list or a mode setting change in interface usage policy. A new interface can be added to the interface list during interface monitoring flow 1300 when association and connection sequence is successful for an activated physical interface or for newly created virtual interfaces. Mode setting may be changed when an authorized user creates or updates a corresponding interface usage policy during, for example, interface profile and usage policy flow 1100. Once a new interface or a mode setting change is detected, appropriate interface usage policy is applied at 1404. The appropriate interface usage policy can be identified by a combination of the interface profile ID and a corresponding agent ID and/or application ID. A determination is made at 1406 as to whether the interface usage policy allows adaptive mode selection. If adaptive mode selection is not allowed, the flow passes back to 1402 to wait for a new interface or a mode setting change in interface usage policy.

If adaptive mode selection is allowed by the applicable interface usage policy, then a determination is made at 1408 as to whether one primary and at least one opportunistic mode are specified in the policy. If not, then a determination is made at 1410 as to whether the interface itself has more than one allowable mode, which can be determined from a corresponding interface profile ID. If the interface does not have more than one allowable mode, then flow passes back to 1402, because the default mode of the interface cannot be changed. If the interface does have more than one allowable mode, however, then a determination is made at 1412 as to whether the user is allowed to change mode settings. If the user is not allowed to change mode settings, then flow passes back to 1402 to wait for a new interface or a mode setting change in interface usage policy, and the user is not permitted to change modes for the interface. If the user is allowed to change mode settings, however, then the user can be prompted to specify primary and opportunistic modes at 1414. The user may be prompted through, for example, display 28 of OBU 30, or through an end user device connected to OBU 30.

If the user specifies primary and possibly opportunistic modes at 1414, or if the interface usage policy indicates that the interface has at least one primary and one opportunistic mode, as determined at 1408, then a primary mode is selected at 1416. A determination is then made at 1418 as to whether a primary-to-opportunistic mode switching condition has been met. If the primary-to-opportunistic switching condition has been met, then opportunistic mode selection occurs at 1420. A determination is then made at 1422 as to whether an opportunistic-to-primary mode switching condition has been met. If the opportunistic-to-primary mode switching condition has been met, then the primary mode is again selected at 1416 and flow 1400 continues at 1418.

If either a primary-to-opportunistic or an opportunistic-to-primary mode switching condition is not met, however, then mode switching conditions will be monitored for any changes at 1424. If any changes are detected, then a determination is made at 1426 as to whether the current mode is primary. If the current mode is primary, the flow moves to 1418 to evaluate the primary-to-opportunistic mode switching conditions. However, if the current mode is opportunistic, then flow moves to 1422 to evaluate the opportunistic-to-primary mode switching conditions. Flow 1400 continues to monitor mode switching conditions and to switch modes when appropriate mode switching conditions are met.

Figure 15A:
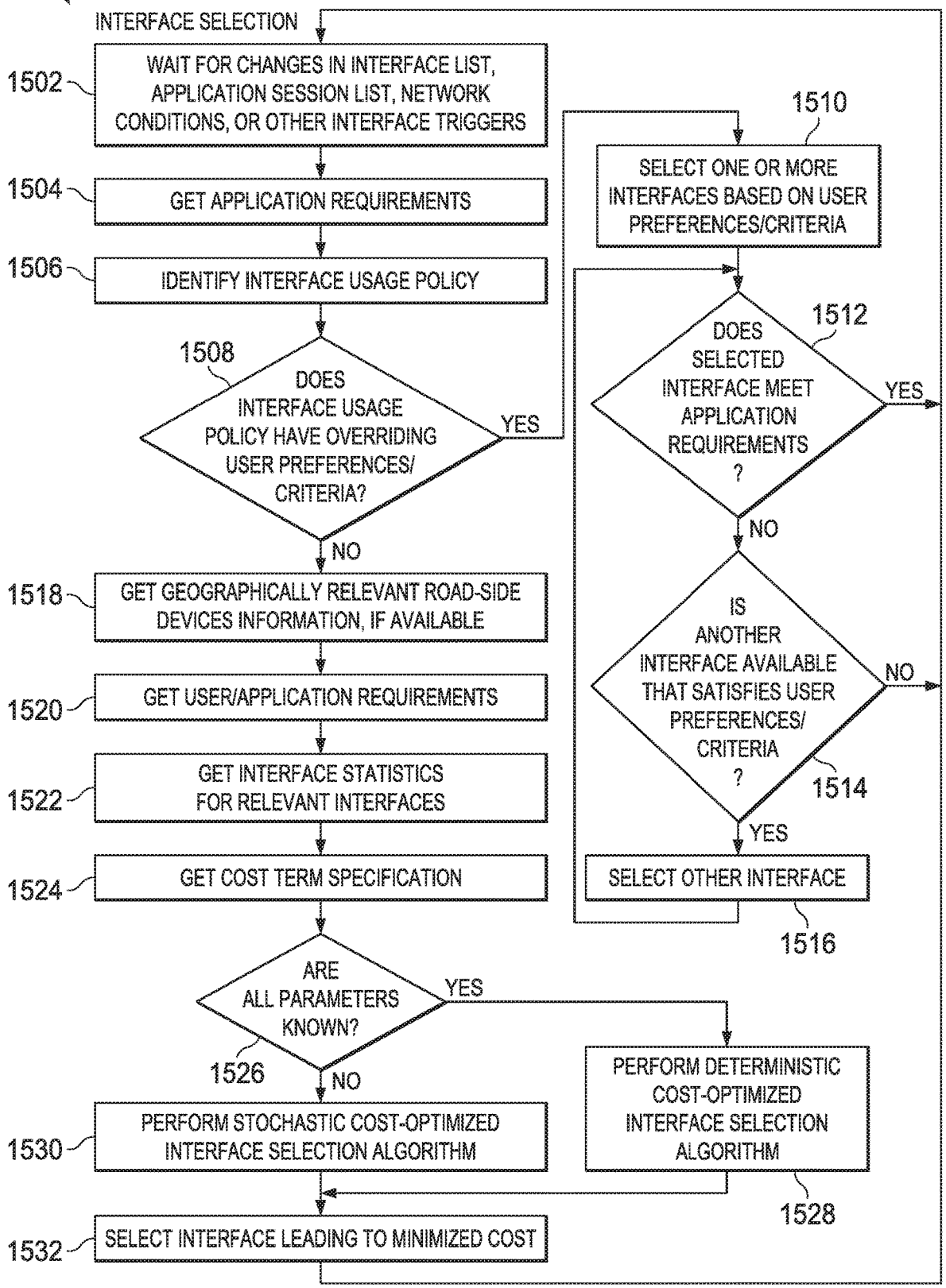
Figure 15B:
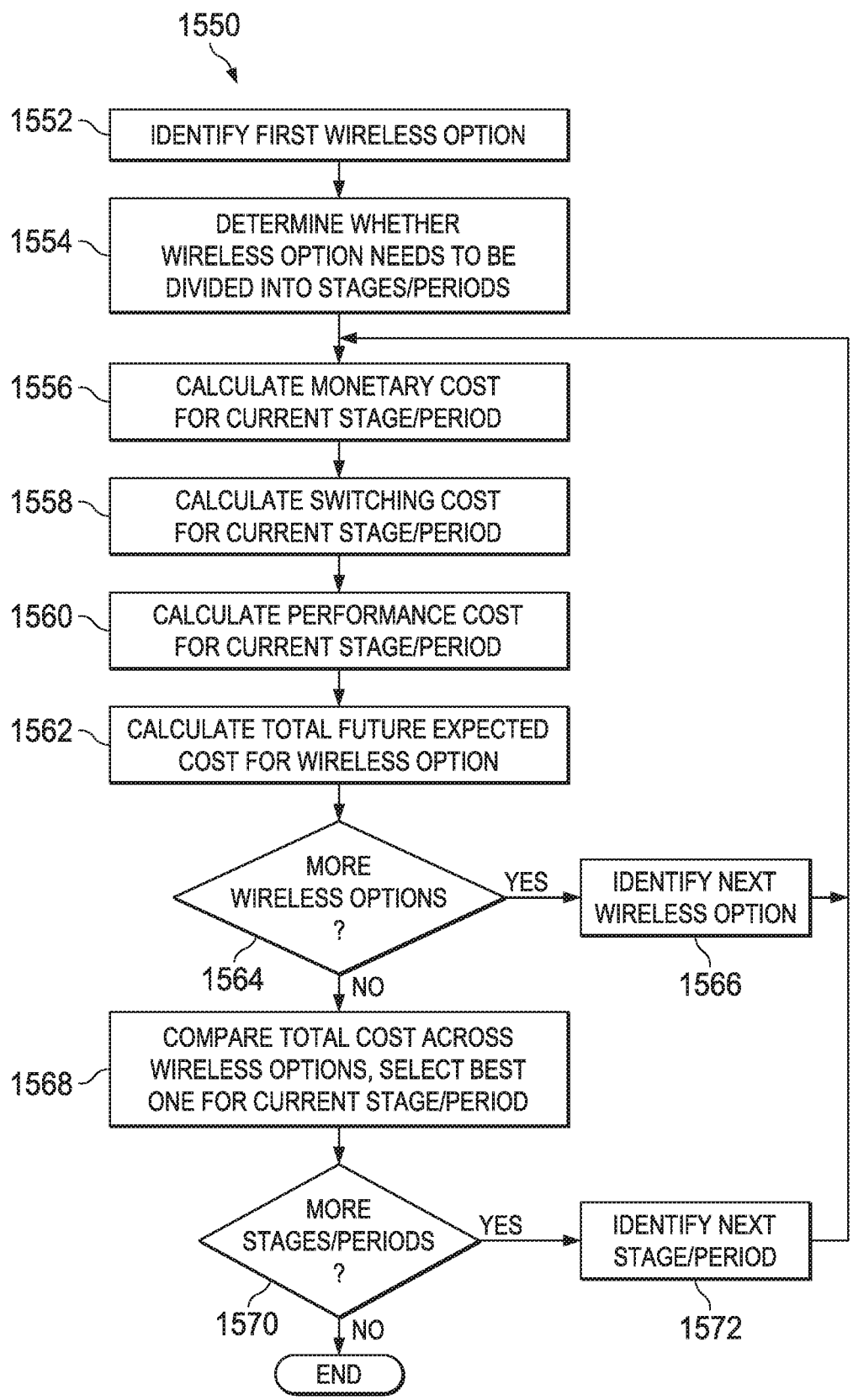

FIGS. 15A and 15B illustrate simplified flowcharts of an interface selection flow 1500 and an associated interface selection optimization flow 1550, corresponding respectively to interface selection module 68 and interface selection optimization module 69 of connection manager 60. Flow 1500 begins at 1502, waiting for a trigger (e.g., changes in interface list, changes in application session list, changes in network conditions, or other interface triggers). A trigger is associated with an application having an application ID and with an agent (e.g., a human agent, an authorized entity, a software agent) having an agent ID. The application associated with the trigger is an application that has been initiated and/or that is associated with an existing session. The application ID of the application may be used to identify application requirements (e.g., in application requirements database 82 or local cache) for the application at 1504. The agent ID and the application ID may be used to identify an appropriate interface usage policy at 1506. If an appropriate interface usage policy does not exist, then default settings may be used.

A determination is made at 1508 as to whether the interface usage policy includes overriding user preferences/criteria. For example, if a user specified a preference that a particular interface always be used for a particular application or set of applications, then this preference could override other interface selection determinations (e.g., cost-optimization interface selection). Thus, if the interface usage policy has overriding user preferences/criteria, then one or more interfaces are selected at 1510 in accordance with those overriding user preferences/criteria. Additionally, an interface will not be selected unless network connectivity is currently available through the interface.

A determination can then be made at 1512 as to whether the selected interface meets application requirements (e.g., minimum throughput, maximum jitter, maximum delay, minimum link persistency, etc.). If the selected interface meets the application requirements, then the flow returns to 1502 to wait for another trigger (which could be associated with the same session or a different session). If the selected interface does not meet the application requirements, then in one embodiment, a best efforts approach may be taken to select another interface to satisfy the application requirements and the overriding user preferences. A determination is made at 1514 as to whether another interface, with available network connectivity, satisfies the user preferences/criteria. If another interface is available and satisfies the user preferences/criteria, then it is selected at 1516 and flow returns to 1512 to evaluate whether the new selected interface meets the application requirements. This processing may continue until an available interface is found that satisfies the overriding user preferences/criteria and the application requirements. However, if such a combination does not exist, then in one embodiment an interface satisfying the overriding user preferences/criteria, but not the application requirements, may be selected.

With reference again to the determination at 1508, if the interface usage policy does not have overriding user preferences/criteria, then various information is obtained in order to perform interface selection optimization. First, geographically relevant, road-side devices information is obtained at 1518, if available. For example, for a particular travel route (e.g., a user's commuting route between City A and City B), information may be available that includes all road-side infrastructure devices between City A and City B, the range of coverage area of each of the road-side infrastructure devices between City A and City B, and the quality or performance of the wireless coverage of the road-side infrastructure devices. This geographical information, if known, can be used for interface selection optimization.

User preferences/criteria and application requirements may be identified at 1520. This information can be obtained from identified application requirements and interface usage policy and may include, for example, file size, video playout deadline, user preferences, etc. Interface characteristics may be obtained at 1522 from statistics periodically collected for the interface. Such characteristics may include data rate, packet loss ratio, path delay, and the like. Cost term specification may be obtained at 1524 and may include weighting values for parameters used in the interface selection optimization algorithm. For example, monetary cost, switching cost, and performance cost may be evaluated and the user can specify how much weight to give to each parameter when calculating a cost optimal interface.

After the various parameters are obtained for a particular interface and application or set of applications, then the parameters may be used in various embodiments to determine the most optimal interface to select for the particular application and user. A determination is made at 1526 as to whether all parameters are known. If all parameters are known, then a deterministic, cost-optimized interface selection algorithm may be performed at 1528. If not all parameters are known, however, then a stochastic, cost-optimized interface selection algorithm may be performed at 1530. A deterministic approach may be used when no unknown variables exist and a number and characteristics of future wireless road-side infrastructure encounters is known. A stochastic approach may be used when not all parameters are known and, for example, statistical assumptions are made regarding parameters such as when WiFi or 3G coverage will be encountered and how long such coverage will last. Once the deterministic or stochastic cost-optimized selection algorithm has been performed, the interface leading to a minimized total cost (which may be based on weighted parameters specified by the user) is selected at 1532. Flow returns to 1502 to wait for new interface triggers.

FIG. 15B illustrates a simplified, general flow 1550 that represents the basic functions performed in example embodiments of both a deterministic and a stochastic cost-optimized interface selection algorithm. Flow 1550 represents one embodiment utilizing monetary, switching, and performance cost functions. However, as previously discussed herein, any combination of cost entities, including other cost entities not indicated in flow 1550, could be incorporated into the cost-optimized interface selection algorithm based on particular needs and implementations.

In the example flow 1550, a first wireless option for a particular travel route may be identified at 1552. A wireless option can be a sequence of one or more segments of wireless connectivity possibilities from a first location to a second location. At 1554, a determination is made regarding whether the wireless option needs to be broken into stages/periods. The wireless option may be broken into stages/periods using dynamic programming in order to reduce the complexity of the algorithm processing if the number of possible wireless options is too large.

For illustration purposes, consider the travel route between City A and City B. Assume there are 3 segments of wireless coverage along the A-B travel route, with 3G across all three segments and WiFi only available in the first and third segments. Representing each of the wireless segments as a binary factor (e.g., 0 represents connectivity through WiFi and 1 represents connectivity through 3G) results in $2^3$ different sequences of wireless connectivity segments between City A and City B (e.g., 111 represents a wireless option with connectivity through 3G in all three segments, 000 represents a wireless option with WiFi connectivity in segments 1 and 3 and no connectivity in segment 2, 010 represents a wireless option with WiFi connectivity in segments 1 and 3 and 3G connectivity in segment 2, etc.). While it may be manageable to evaluate 8 different wireless options and select the one resulting in the minimum cost, additional segments of coverage may quickly become too complex to efficiently process and evaluate. Thus, dynamic programming allows the wireless options to be divided into stages or periods (e.g., a time-based optimization). At each stage/period only the particular stage/period is evaluated, thereby reducing the complexity of the analysis. Thus, if a number of wireless options (or number of segments within a wireless option) is determined to be larger than a predefined threshold, then dynamic programming may be used to break each of the wireless options into stages/periods. However, if the wireless options do not exceed a predefined threshold then the stage/period can be the undivided or complete wireless option (i.e., a full search).

After the determination is made regarding dividing the wireless options, a current stage/period for each of the wireless options is evaluated to compute a total future expected cost. First, a monetary cost for the current stage/period of the current wireless option is calculated at 1556. The monetary cost could be exactly how much the cost would be to use the current wireless option during the current stage/period. For example, 3G may have an actual data rate associated with a VSIM, whereas WiFi may have zero cost.

A switching cost is calculated at 1558 for the current stage/period of the current wireless option for switching from each wireless connectivity segment in the current stage/period to a successive wireless connectivity segment in the current stage/period of the current wireless option. Each time a switch is made between wireless interfaces (e.g., 3G to WiFi, WiFi to 3G, etc.) information and packets may be lost. For example, if a session (or packets) is switched from 3G to WiFi, a number of packets lost may depend on the received signal strength indicator (RSSI) of the WiFi connection. The lower the RSSI, the greater the number of packets that may be lost during the switch. Conversely, the higher the RSSI, the fewer the number of packets that may be lost due to the switch.

A performance cost is calculated at 1560 for the current stage/period of the current wireless option. Performance cost correlates to an opportunity cost for not using an available link. For example, if both WiFi and 3G are available and WiFi is the stronger link, then an opportunity cost is incurred for continuing to use the 3G interface, which may have slower data rates for both transmitting and receiving packets.

After the monetary, switching, and performance costs are calculated, a total future expected cost for the current stage/period of the current wireless option is calculated at 1562. Weighting factors specified by the associated user for each of the cost parameters may be used to give more or less weight, as desired by the user, to a particular parameter, relative to the other parameters.

After the total future expected cost for the current wireless option is calculated, a determination is made at 1564 as to whether more wireless options need to be evaluated for the current stage/period. If more wireless options need to be evaluated, then a next wireless option is identified at 1566 and flow returns to 1556 to begin calculating the cost parameters for the current stage/period of the newly identified wireless option.

Once all of the wireless options for the current stage/period have been evaluated and a total future expected cost for each has been calculated, the total costs across all of the wireless options for the current stage/period are compared at 1568. In one embodiment, the wireless option having the lowest total future expected cost (i.e., the minimum total cost) is selected. A determination is then made as to whether more stages/periods of the wireless options need to be evaluated, and if so, then a next stage/period is identified at 1572. Flow returns to 1556 to begin calculating the cost parameters for the newly identified current stage/period of the wireless options. However, if no more stages/periods need to be evaluated, as determined at 1570, then flow 1550 ends as the optimal cost option for the wireless options in each of the one or more stages/periods has been selected at 1568.

The processing of FIGS. 15A and 15B represent simplified and generalized flows for interface selection. Several criteria previously discussed herein may also be incorporated in flows 1500 and 1550. For example, interface selection may be performed on a range of granularities including sessions, packets, bytes, or bits. Thus, the selected interface may be used for a particular granularity specified in a corresponding interface usage policy, defined by default settings, or otherwise determined based on results of interface selection. In another example, an interface usage policy may include bidirectional interface selection preferences or criteria for particular interfaces and/or applications or sets of applications. Thus, flows 1500 and 1550 may be performed for each traffic flow direction if bidirectional interface selection is indicated. Additionally, although the interface selection optimization was described with reference to one embodiment using monetary cost, switching cost, and performance cost, any suitable cost terms and combination of cost terms could be used to select an optimal interface.

FIG. 15B represents an example flow for both deterministic and stochastic cost-optimized interface selection. In the deterministic approach, all parameters are known, but in the stochastic approach, statistical assumptions are made. Example scenarios help illustrate the distinctions between deterministic and stochastic interface selection. For both cases, assume that along a certain defined route, 3G coverage is continuous (persistent) and that WiFi coverage is alternately available and not available (sporadic) at different time intervals as a vehicle moves along the route.

Common System and State Variables May be Defined as Follows for Both Cases:
n: transition index [0, 1, 2, 3, . . . , N]
v: vehicle velocity
D(n): distance traversed in nth period
T(n): duration of nth period: T(n)=D(n)/v
L(0): Total file size
$W_{on}$(n): binary, indicating the presence of WiFi for the nth period;
  1 if WiFi is on, 0 otherwise
$I_{3g}$(n): binary, indicating whether 3G or WiFi is chosen for the nth period;
  1 if transmit on 3G, 0 otherwise
$R_{3g}$(n): 3G data rate for nth period
$R_{wifi}$(n): WiFi data rate for nth period
$R_o$: constant rate factor to ensure finite value of performance cost,
  where $0 < R_o < 1$
Cost Terms for Both Cases:
$\lambda_C$: monetary cost weight
$\lambda_P$: performance cost weight
$\lambda_S$: switching cost weight
C: Monetary cost
P: Performance cost: inverse of data rate
S: cost of switching between interfaces
α3 g: unit monetary cost per data size (e.g., per bit) over the 3G
αwifi: unit monetary cost per data size (e.g., per bit) over the WiFi Deterministic Cost-Optimization Example Case If the number and characteristics of future WiFi encounters are known, then a deterministic cost-optimized interface selection algorithm is configured to determine whether the session (or packets or bytes or bits) should be switched to WiFi during periods of WiFi and 3G coverage overlap based on the known parameters. Assumptions for this case include: a session cannot be simultaneously carried on both links (i.e., session stripping, not packet stripping), 3G data rate is constant, and 3G cost is linearly related to data rate.

Dynamic programming (DP) is assumed as the interface selection is based on complete knowledge of past, current, and future state variables.

Relevant factors in this example case include: WiFi has zero cost and 3G has a defined cost, WiFi has a higher effective throughput that is a function of RSSI, and switching incurs a cost in terms of packet loss (e.g., number of packets lost depends on RSSI of WiFi). Thus, switching to WiFi at a higher RSSI results in fewer packets lost, but also fewer bits being sent on the high rate link and therefore, higher monetary cost. Switching at zero RSSI can result in higher packets lost, but lower monetary cost, and therefore, switching always occurs. Switching at the highest RSSI means fewer packets lost, but high monetary cost, and therefore, switching does not occur. System and state variables for the deterministic case include:

L(n): number of bits at the beginning of nth period;

$$L(0) - \sum_{j=0}^{n-1}(Q_{wifi}(j) + Q_{3g}(j))$$

$Q_{3G}(n)$: bits transmitted on 3G; $I_{3g}(n)\min(R_{3g}(n)T(n),L(n))$ $Q_{wifi}(n)$: bits transmitted on WiFi; $W_{on}(n)(1-I_{3g}((n))\min(R_{wifi}(n)T(n),L(n))$ Total expected cost=switching cost+monetary cost+performance cost $$\text{DP Optimization Objective: } \min_{\{I_{3g}(n)\}_{n=0}^{N}} (\lambda_C C + \lambda_S S + \lambda_P P)$$

$$\text{Monetary cost} = C = \sum_{n=0}^{N}(\alpha_{3g}Q_{3g}(n) + \alpha_{wifi}Q_{wifi}(n))$$

$$\text{Switching cost} = S = \sum_{n=0}^{N}(I_{3g}(n) - I_{3g}(n-1))^2$$

Performance cost =

$$P = \sum_{n=0}^{N} \frac{T(n)\min(1, L(n))}{I_{3g}(n)R_{3g}(n) + W_{on}(n)(1 - I_{3g}(n))R_{wifi}(n) + R_o}$$

For dynamic programming (DP), an artificial terminal state T is first defined so that a forward DP algorithm can be applied. This is necessary because the state value is not known until previous decisions have been made. The following are defined:

State=file size at the beginning of each period

S(n)=State Space

Number of bits sent in nth period:

If $I_{3g}(n)=0$ $Q_{3G}(n)$=bits transmitted on 3G=0

$Q_{wifi}(n)$=bits transmitted on WiFi=$W_{on}(n)\min(R_{wifi}(n)T(n),L(n))$

If $I_{3g}(n)=1$ $Q_{3G}(n)$=bits transmitted on 3G=$\min(R_{3g}(n)T(n),L(n))$ $Q_{wifi}(n)$=bits transmitted on WiFi=0

State Space:

$S(0) = \{L(0)\}$ $$S(1) = \begin{cases} L(0) - W_{on}(0)\min(R_{wifi}(0)T(0), L(0)), \\ L(0) - \min(R_{3g}(0)T(0), L(0)) \end{cases}$$

$S(2) =$ $$\begin{cases} L(0) - W_{on}(0)\min(R_{wifi}(0)T(0), L(0)) - W_{on}(1)\min(R_{wifi}(1)T(1), L(1)), \\ L(0) - W_{on}(0)\min(R_{wifi}(0)T(0), L(0)) - \min(R_{3g}(1)T(1), L(1)), \\ L(0) - \min(R_{3g}(0)T(0), L(0)) - W_{on}(1)\min(R_{wifi}(1)T(1), L(1)), \\ L(0) - \min(R_{3g}(0)T(0), L(0)) - \min(R_{3g}(1)T(1), L(1)) \end{cases}$$

and so on . . . .

Compute cost of state transition: $\mu_{ij}(n)$

From state $i \in S(n)$ to state $j \in S(n+1)$, sum the following costs:

Monetary cost=$C=\alpha_{3g}Q_{3g}(n)+\alpha_{wifi}Q_{wifi}(n)$

Switching cost=$S=(I_{3g}(n)-I_{3g}(n-1))^2$, for $n>0$ $$\text{Performance cost} = P = \frac{T(n)\min(1, L(n))}{I_{3g}(n)R_{3g}(n) + W_{on}(n)(1 - I_{3g}(n))R_{wifi}(n) + R_o}$$

Compute Cost at Each State:

$J_i(0)=0, i \in S(0)$ $J_j(n+1)=J_i(n)+\mu_{ij}(n), i \in S(n)$ to state $j \in S(n+1)$, $n=0,1,\ldots,N-1$ The optimal cost is:

$J^*=\min\{J_i(N)\}, i \in S(N)$

Stochastic Cost-Optimization Example Case

If the number and characteristics of future WiFi encounters are not all known, then a stochastic cost-optimized interface selection algorithm is configured to select between 3G and WiFi to achieve the lowest overall combined cost factoring in performance, monetary, and switching terms. In this example case, assumptions can include 3G and WiFi taking on random (uniform distribution) values, the rate of 3G stays constant for the entire duration, the rate of WiFi varies in each encounter, and the duration of WiFi and non-WiFi periods follow random (exponential distribution) values. In addition, in this example case 3G and WiFi monetary costs are linearly related to data transmitted. Stochastic dynamic programming (SDP) is assumed with interface selection based on observed past and current state variables, taking into consideration statistical knowledge of future state variables.

System and state variables for the stochastic case include:

L(n): remaining file size at the end of the nth period $Q_{3G}(n)$: amount of data transmitted on 3G during the nth period $Q_{3G}(n)=I_{3g}(n)R_{3g}(n)T(n)$ $Q_{wifi}(n)$ amount of data transmitted on WiFi during the nth period $Q_{wifi}(n)=W_{on}(n)(1-I_{3g}(n))R_{wifi}(n)T(n)$ Choice of Parameter Values Tn/Won(n)=1∈ξ(25): random value following normal distribution, average duration is 25 seconds Tn/Won(n)=0∈ξ(75): random value following normal distribution, average duration is 75 seconds R3 g(n)∈U[0.2; 2.0]: rate ranges between 0.2 and 2.0 Mbps Rwifi(n)∈U[0:4; 4:0]: rate ranges between 0.4 and 4.0 Mbps State Transitions: $Won(n+1)+1-Won(n)$ SDP Optimization Objective: $\min_{\{I_{3g}(n)\}_{n=0}^{N}} E\{\lambda_C C + \lambda_P P + \lambda_S S\}$ Monetary cost = $C = \sum_{n=0}^{N}(\alpha_{3g}Q_{3g}(n) + \alpha_{wifi}Q_{wifi}on(n))$ Switching cost = $S = \sum_{n=0}^{N}(I_{3g}(n) - I_{3g}(n-1))^2$ Performance cost =

$$P = \sum_{n=0}^{N}\frac{T(n)\min(1, L(n))}{I_{3g}(n)R_{3g}(n) + W_{on}(n)(1-I_{3g}(n))R_{wifi}(n) + R_o}$$

An SDP optimal policy is to minimize the overall expected cost-to-go EJ(n). For the nth period, given past decisions of $I_{3g}(n-1)$ and current observations of Won(n), $R_{3g}(n)$, $R_{wifi}(n)$, and T(n), $I_{3g}(n)$ is chosen to minimize EJ(n) (note that EJ(0) corresponds to the original optimization objective), whereby:

$J(n) =$ $\lambda_C \sum_{n'=n}^{N} \alpha_{3g}I_{3g}(n')R_{3g}(n')T(n') + \alpha_{wifi}W_{on}(n')(1-I_{3g}(n'))R_{wifi}(n')T(n') +$ $\lambda_P \sum_{n'=n}^{N} \frac{T(n')}{I_{3g}(n')R_{3g}(n) + (1-I_{3g}(n'))W_{on}(n')R_{wifi}(n') + R_o} +$ $\lambda_S \sum_{n'=n+1}^{N}(I_{3g}(n') - I_{3g}(n'-1))^2.$ In addition, a minimum expected cost for J(n) is defined as:

$V(n) \triangleq V(n, I_{3g}(n-1), W_{on}(n), R_{3g}(n), R_{wifi}(n), T(n))$, whereby:

$V(n) = \min_{\{I_{3g}(n')\}_{n'=n}^{N}} EJ(n)$ $= \min_{I_{3g}(n)} [\lambda_C \alpha_{3g} I_{3g}(n) R_{3g}(n) T(n) + \lambda_C \alpha_{wifi} W_{on}(n)(1 - I_{3g}(n))R_{wifi}(n)T(n) +$ $\frac{\lambda_P T(n)}{I_{3g}(n)R_{3g}(n) + (1-I_{3g}(n))W_{on}(n)R_{wifi}(n) + R_o} +$ $\lambda_S(I_{3g}(n) - I_{3g}(n-1))^2 + E\{J(n+1)|_{I_{3g}(n)}\}].$ and further:

$EJ(n+1)|_{I_{3g}(n)} = \int_{r_3} p_{R_{3g}}(r_{3g}) \int_{r_{wifi}} p_{R_{wifi}}(r_{wifi}) \int p_T(\tau) V(n+1, I_{3g}(n), W_{on}(n+1), r_{3g}, r_{wifi}, \tau)$ Thus, the optimal solution can be obtained using stochastic dynamic programming. The number of states considered is on the order of $O(N_{3G}N_{wifi}N_T)$, where $N_{3G}$, $N_{wifi}$, and $N_T$ are the number of discrete states for each random variable $R_{3G}$, $R_{wifi}$, and T, respectively.

Figure 16:
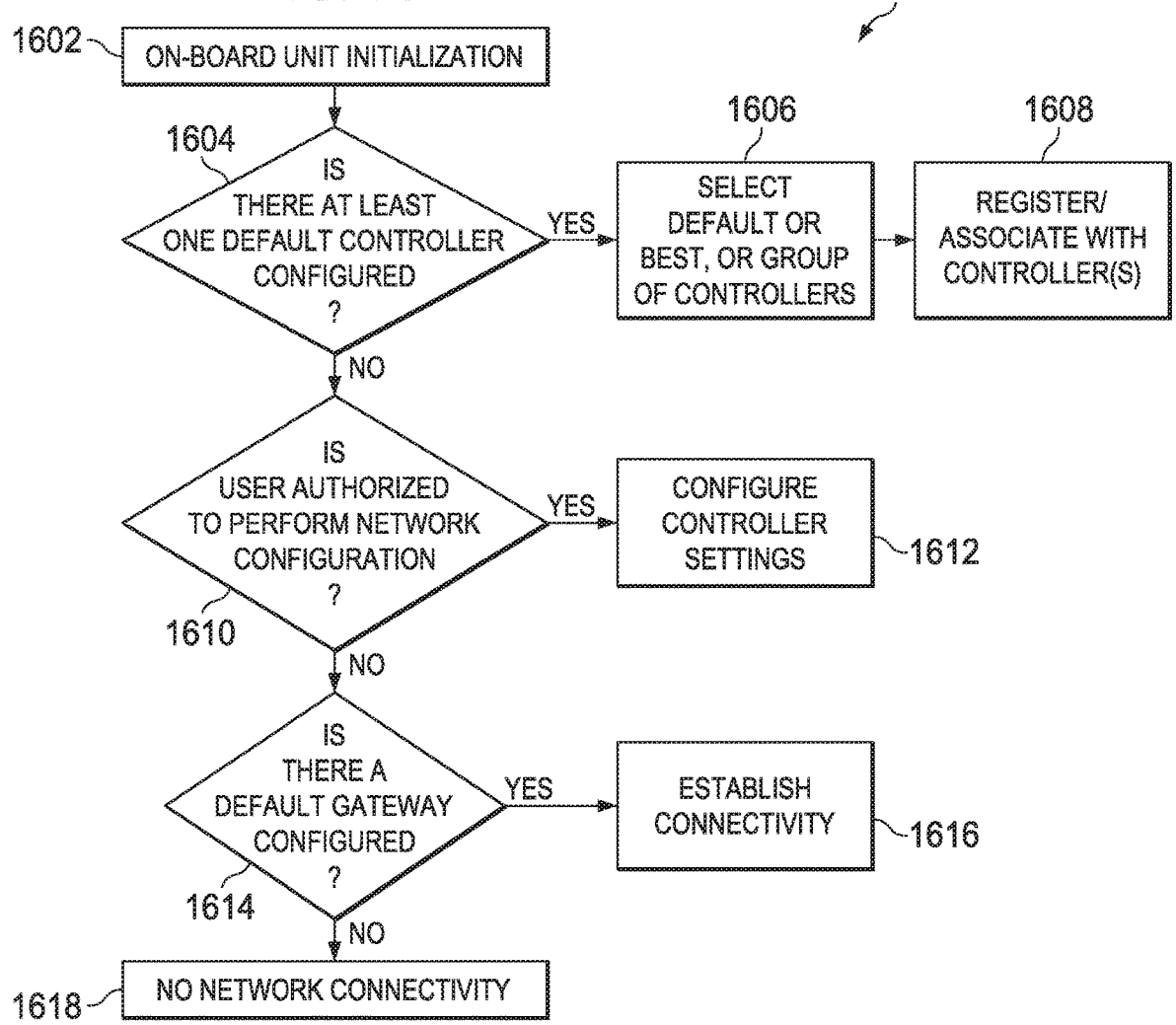
Figure 17:
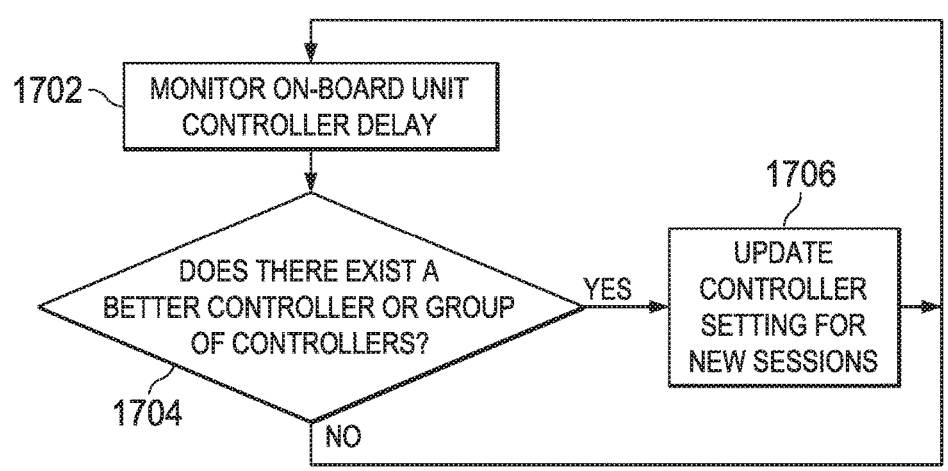

Turning to FIGS. 16 and 17, simplified flowcharts illustrate connection, association, and setting updates associated with controllers 90 (and controllers 145a and 145b in FIGS. 5-10). FIG. 16 illustrates an OBU-to-controller connectivity and association flow 1600, which corresponds to OBU-to-controller module 61. Flow begins at 1602 when an OBU, such as OBU 30, is initialized (e.g., power comes on). A determination is made at 1604 as to whether at least one configured default controller is identified. If a default controller is configured and identified, then either the default controller is selected, a group of controllers is selected, or a best or optimal controller or group of controllers is selected at 1606. Each of the selected controllers is registered and associated with OBU 30 at 1608.

If it is determined at 1604 that no default controller is configured, then a determination is made at 1610 as to whether a user is authorized to perform network configuration. If the user is authorized to perform network configuration, then the user may configure controller settings at 1612. If the user is not authorized to perform network configuration, however, then a determination is made at 1614 as to whether a default gateway is configured. If a default gateway is configured then connectivity is established with the gateway at 1616. If a default gateway is not identified at 1614, however, then no network connectivity is established between OBU 30 and a controller.

FIG. 17 illustrates a controller setting update flow 1700, which corresponds to controller setting module 62. Controller setting update flow 1700 allows an OBU to change controllers if the established controller or group of controllers does not offer the best performance available and another controller or group of controllers is available to the OBU. OBU controller delay is monitored at 1702. An evaluation is performed at 1704 to determine whether a better controller or group of controllers is available. If there are no better controllers or groups of controllers available, then flow returns to 1702 where controller delay continues to be monitored. If a better controller or group of controllers is identified at 1704, however, then the controller setting is updated at 1706 for new sessions so that the existing controller or group of controllers is not used. Flow then returns to 1702 to continue monitoring controller delay.

II. Communication and Access Control of Subsystems. Devices, and Data

Figure 19:
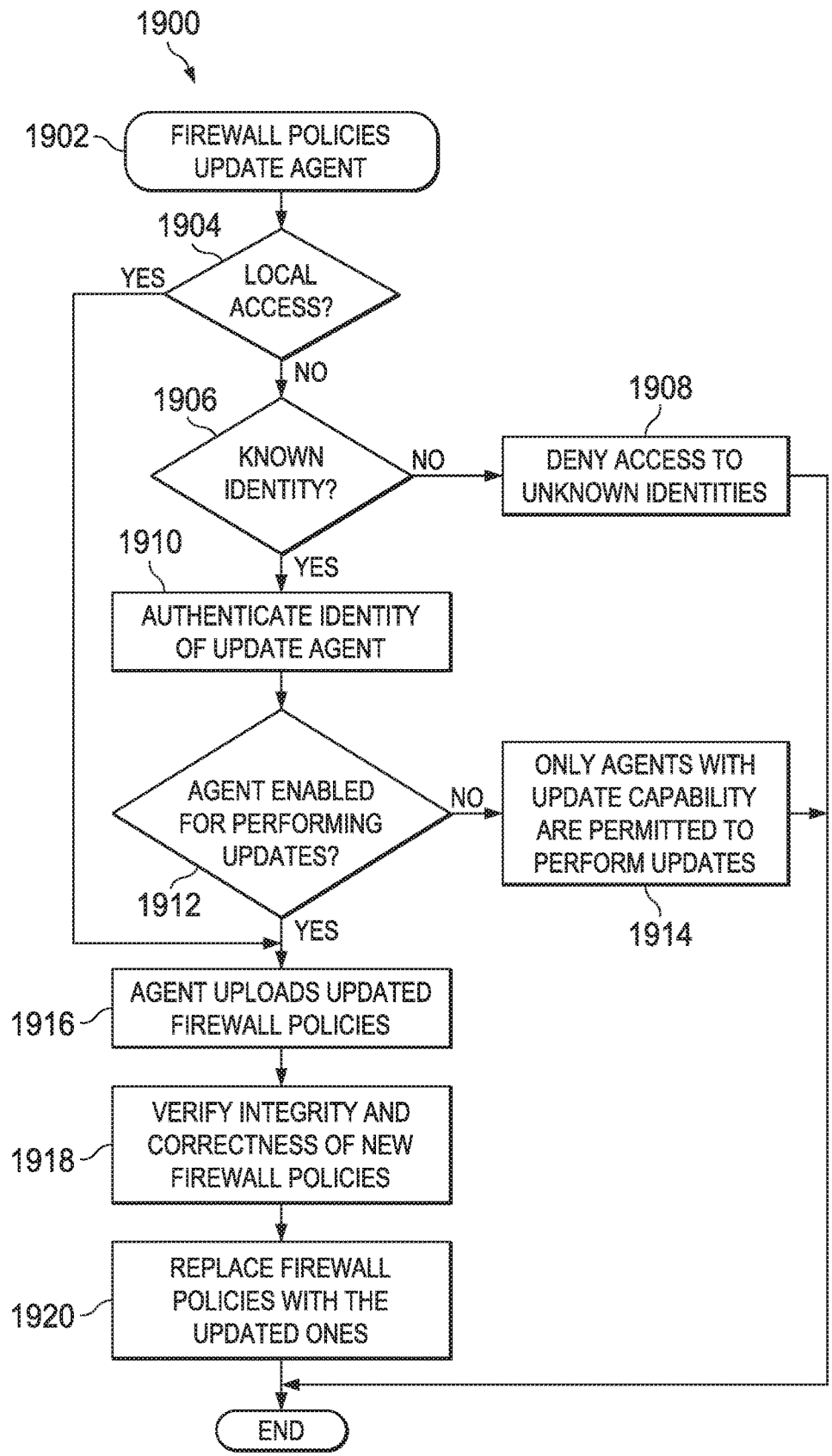
FIGS. 19-20 are simplified flowcharts associated with possible activities associated with the central hub of FIG. 18 in the communication system of the present disclosure.
Figure 20:
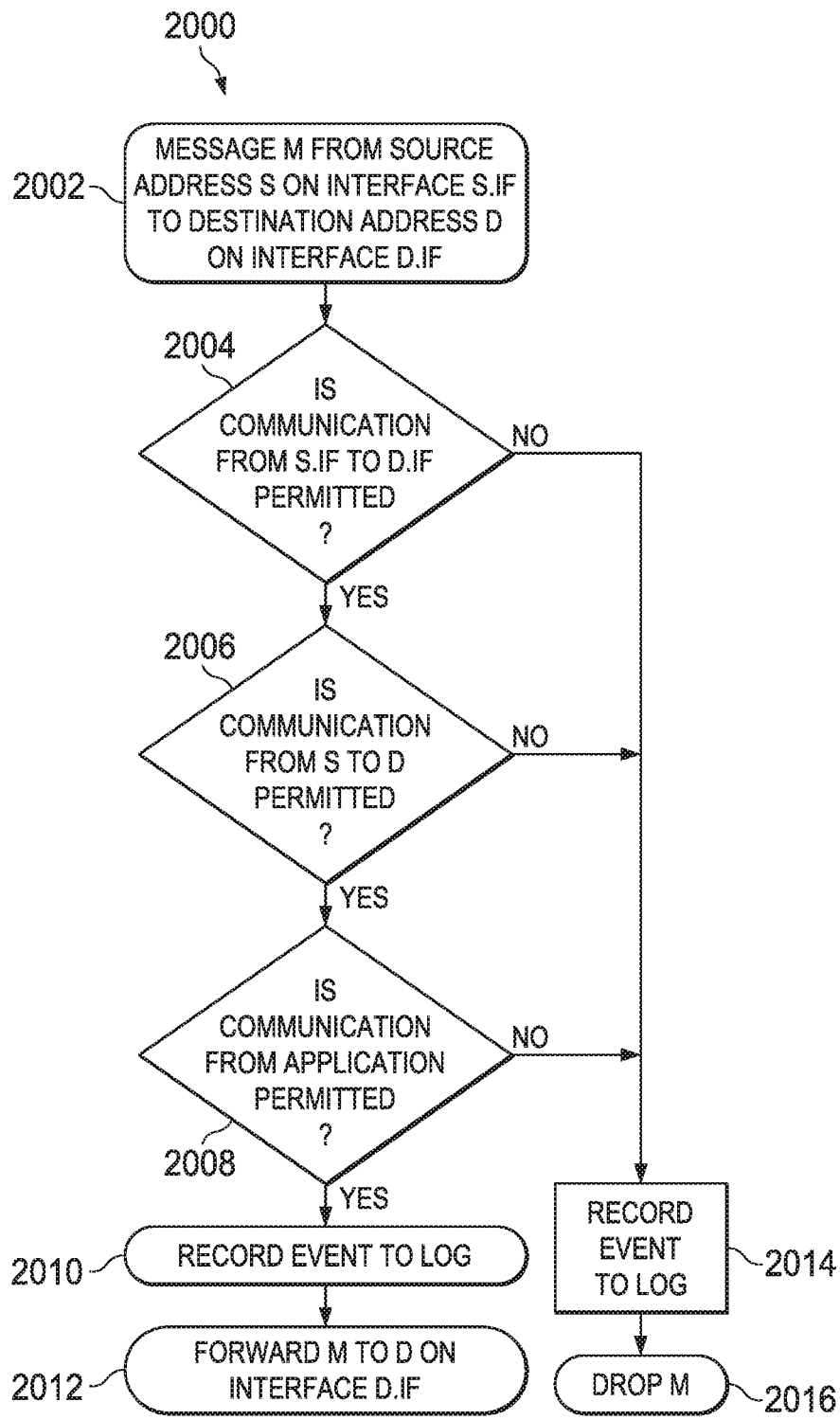

Turning to FIGS. 18 through 20, embodiments are illustrated for unified, dynamic, policy driven access control and segregation across a plurality of different internal network subsystems of communication system 10, which can include vehicular bus subsystems and/or vehicular Ethernet-based subsystems. FIG. 18 illustrates a block diagram of central hub 70 in vehicle 4 (not shown) interconnecting example bus subsystems of vehicle 4, which may be implemented as either wired or wireless networks. Central hub 70 is also suitably connected to OBU 30 and its various network interfaces 26 (e.g., 3G, 4G, WiFi, WiMax, etc.) connecting to in-vehicle mobile devices and to networks and electronic devices external to vehicle 4. For ease of illustration, vehicle 4 and most hardware elements, software elements, and other features and components of OBU 30 are not shown but have been previously described herein with reference to various FIGURES such as FIG. 1.

FIG. 18 illustrates a central hub 70, with hardware components, such as a processor 716, and a memory element 718, and vehicle subsystem interfaces 708 (e.g., CAN, Flexray, MOST, etc.), which have been previously described herein with reference to network interfaces 26 in FIG. 1. Central hub 70 is illustrated in FIG. 18 as a separate interconnection device such as, for example, a gateway with access control and logging functionality as described herein, which may be suitably coupled to OBU 30 for communication between OBU 30 and the bus subsystems and machine devices of the vehicle. As previously explained herein, however, central hub 70 may alternatively be integrated with OBU 30 such that hardware elements, including memory and processing elements, are shared or combined in any suitable manner based on particular needs and implementation requirements.

Central hub 70 also provides various modules and data storage for accomplishing access control and segregation activities. These modules and data storage may include a firewall policy module 702, an access and logging module 714, a firewall policies database 712, and a traffic log database 714. Access and logging module 704 can provide control of communications between a subsystem (which can include a particular machine device on the subsystem) and any other system, subsystem, process, device, component, object, module, or agent. Examples can include communications between different vehicular bus subsystems, between a vehicular bus subsystem and an application process of OBU 30, between a vehicular bus subsystem and an agent of OBU 30, between a vehicular bus subsystem and a personal device connected to OBU 30, and between a vehicular bus subsystem and a network interface 26 of OBU 30. Firewall policy module 702, firewall policies database 712, and traffic log database 714, facilitate providing, storing, and dynamically updating data associated with the access control and segregation activities of central hub 70. The databases may be stored in memory element 718, or may be stored in any other memory accessible to central hub 70. In one embodiment, firewall policies database 712 could be stored as part of an identity profile (e.g., identity profiles of the vehicle itself, of the corresponding machine devices, of the software agents, etc.) in identity profiles database 81 in OBU 30.

FIG. 18 illustrates several example network bus subsystems including Controller Area Network (CAN) buses 720, 722, and 724, Flexray 730 and 732, Media Oriented System Transport (MOST) buses 740, 742, 744, and 746, and Local Interconnect Network (LIN) bus 726. These network subsystems include various machine devices such as controllers, sensors, actuators, communication devices, infotainment devices, and the like. In the example shown in FIG. 18, CAN buses 720 and 724 connect main engine controller and main body controller, respectively, to central hub 70 through appropriate vehicle subsystem interfaces 708 (e.g., a CAN interface). CAN bus 722 connects a transmission sensor and an energy sensor to the main engine controller. LIN bus 726 connects a driver's seat actuator, temperature controls, and windshield wiper actuators to main body controller of CAN bus 724. Flexray 730 connects a chassis module to central hub 70 through an appropriate interface of vehicle subsystem interfaces 708. Flexray 732 connects brakes and electronic stability control (ESB) to the chassis module attached to Flexray 730. Finally, MOST buses 740 and 744 connect an assistance coordinator and an infotainment controller, respectively to central hub 70 through appropriate vehicle subsystem interfaces 708. MOST bus 742 connects a reversing camera and a navigation system to the assistance coordinator, which is connected to central hub 70 by MOST bus 740. MOST bus 746 connects HMI satellite, a telephone, and an infotainment satellite to the infotainment controller connected to central hub 70 via MOST bus 744.

Embodiments of central hub 70 can provide a redundant, high availability interconnection device with firewall functionality across multiple subsystems of the vehicle. The interconnection of vehicular subsystems and OBU 30 enables central hub 70 to enforce comprehensive firewall policies between the numerous components of connected vehicle 4. Accordingly, central hub 70 can be configured as a smart gateway for bridging all of the subsystems in a secure manner such that no malicious, improper, or otherwise unauthorized communication is propagated across subsystems that should not talk to each other (e.g., radio may be prevented from communicating with ESB). Machine devices can be protected from attacks external to the vehicle (e.g., from the Internet or other WAN, from another vehicle, from a road-side user device, etc.) and from attacks internal to the vehicle (e.g., from a malicious machine device connected to one of the bus subsystems). Having secured, firewalled WAN connections to OBU 30 may allow for the development of more features and applications on the connected vehicle platform. Central hub 70 can also be configured with policies to recognize and enable legitimate and necessary communications and interactions with machine devices of the bus subsystems.

In one embodiment, security rules in firewall policy database 712 could be a set of entries related to sources (or senders) and destinations (or receivers) of internal vehicle communications. A 'source' or 'sender' as used herein is any component, device, element, object, process, or module, which encodes data and transmits or sends the encoded data (or message) via a communication channel to one or more receivers. A 'destination' or 'receiver' as used herein is a receiving end of a communication channel and receives decoded messages from a source. A message could include a request for an action to be performed and/or could include data being propagated from the source to the receiver. Each security rule or entry could be related to source and destination interfaces, source and destination addresses, one or more applications, or any suitable combination thereof. For example, an entry could indicate that a source from a particular bus subsystem is permitted to send messages to a destination on another bus subsystem (e.g., CAN, MOST, Flexray, LIN) or to another destination (e.g., WiFi interface, 3G interface, etc.). In one embodiment, any communications not specifically permitted by policy are prohibited and blocked by central hub 70.

Security rules may be preprogrammed by, for example, a manufacturer of the vehicle who has detailed knowledge of the subsystems of the vehicle. The manufacturer will know what types of communications should be allowed and what types of communications should be prohibited. Accordingly, the manufacturer may preprogram security rules in firewall policies database 712 during manufacturing of the vehicle.

Firewall policy module 702 of central hub 70 may allow secure and authorized updates to firewall policies database 712. Accordingly, firewall policies database 712 can be dynamically managed and updated by an authorized agent during the lifetime of the vehicle using either local or remote access to OBU 30. In one embodiment, an authorized entity such as a manufacturer could have a corresponding identity profile on OBU 30, enabling the authorized entity to locally or remotely authenticate to OBU 30 and access firewall policies database 712, if allowed. Local access may occur via physical access to the central hub 70 so that security policies and/or device capabilities can be uploaded. This could occur, for example, by taking a vehicle to a vehicle dealer who can also be an authorized agent of OBU 30. The vehicle dealer can receive a data file of new and/or updated security rules from the manufacturer and upload the data file to central hub 70. Remote access may be available by leveraging the Internet uplink of the vehicle. Remote access could be established, for example, from OBU 30 via a cellular link or other wireless link to the Internet and then to an authorized manufacturer's datacenter, such that the authorized manufacturer could update the firewall policies database 712 as needed. The device capabilities of central hub 70 could also be upgraded in a similar manner.

The dynamic uploading of security rules and any other software or firmware for central hub 70 during the lifetime of the vehicle offers a flexible and extensive access control to internal network subsystems. Manufacturers can react to aftermarket discovered vulnerabilities due to malfunctions or attacks, and can provide enhanced performance based on new techniques. Policies could be specified for a particular vehicle, for vehicles manufactured during a particular time period, for vehicles manufactured at a particular location, for vehicles known to have certain performance issues, for a particular make, model, or class of vehicles, or for any other identifiable and classifiable group of vehicles. Policies could provide limits for an agent with a particular identity profile (e.g., acceleration not allowed beyond a predetermined maximum limit for a particular driver, a particular agent given more or less diagnostic access to vehicular subsystems, etc.). Furthermore, the performance of a vehicle (e.g., speed, etc.) could be controlled with a specially configured security rule.

Access and logging module 704 may be provided in central hub 70 for applying firewall policies and for logging allowed communications and/or prohibited communications across bus subsystems. Access and logging module 704 examines communications (messages) from one subsystem interface to another subsystem interface and applies appropriate policies to permit or deny the messages. The security rules constitute the firewall policies that are enforced by access and logging module 704 of central hub 70. Firewall policies database 712 may include numerous types of security rules that permit certain communication (e.g., communication between specific machine devices, communication between specific machine devices and specific network interfaces 24) and that prohibit any other communication. Access and logging module 704 is configured to understand and appropriately apply such security rules. For instance, one rule could permit one-way communication for a specific message sent from CAN bus 720 towards a wireless interface on OBU 30 (e.g., for sending diagnostic information to a manufacturer). Another rule could explicitly forbid communication for a given set of source addresses, for example, from LIN bus 726 to certain other addresses of MOST bus 746.

Access and logging module 704 may also be configured to apply firewall policies to traffic from devices that are internal to the vehicle, yet external to the vehicle's internal network subsystems, such as personal mobile devices that connect to a WiFi interface on OBU 30. In one example, a personal mobile device could read some predefined diagnostic information (e.g., speed, average fuel consumption, tire pressure, etc.) from the vehicle, but not be permitted to send any traffic in the other direction (e.g., to the vehicle's internal network bus subsystems). Similarly, central hub 70 may also control traffic for applications executing inside OBU 30, which could have different levels of permissions. For example, an application from a vehicle manufacturer that has permission to read from an internal vehicular subsystem may be given authorization to do so, but other applications may be prohibited from such activities by security rules in firewall policies database 712.

Additionally, access and logging module 704 may log events in a traffic log database 714, which can be a centralized, unified log and can be accessible to OBU 30. The logged events may include allowed and/or prohibited communications or a suitable representation thereof. Conditions relevant to the logged communications may also be logged such as, for example, time, communication source, communication destination, and the like. Traffic log 714 can provide a more efficient diagnostic to identify causes of vehicle failures or problems due to anomalies in message flows across various bus subsystems. Without a comprehensive log, determining a cause of a failure or problem in a vehicle can be very complicated and costly due to the difficulty in determining which message flow or flows brought about or contributed to the failure or problem.

Enforcement of the firewall policies can be implemented in hardware, software, or any combination thereof, based on particular needs and configurations of vehicle subsystems. Although access control and segregation activities have been described herein with reference to modules of central hub 70, hardware may also be used to implement such activities. With existing bus architectures (e.g., CAN, LIN, MOST, Flexray), enforcement of firewall policies can be accomplished in hardware by examining source address, destination address, different buses that are communicating, and the kind of information being exchanged.

Hardware may also be used to achieve access control and segregation of Ethernet-based subsystems. For Ethernet-based subsystems of a vehicle (e.g., traditional bus subsystems configured with Ethernet), security rules could be implemented in switches and hardware utilizing media access control (MAC) addresses and sources. For example, a security rule could be implemented so that a first ECU is blocked from communicating with a second ECU at the MAC layer 2. The security rule could also be implemented as a layer 3 or 4 at the packet flow level and could include an application layer security rule, which could be implemented partially in hardware and partially in software. In one example implementation, security rules could be implemented in a MAC filter table in a switch or in an access control list in a layer 3 router. Additional bandwidth and connectivity may enable logging events at any point during network communication. Alternatively, communications between two ECUs could be forced through central hub 70, utilizing the additional bandwidth to connect (or prohibit the connection of) the two ECUs.

In addition to locally logging and monitoring traffic on internal network subsystems, central hub 70 can also be configured to span internal network traffic. Spanning internal network traffic could include stopping the traffic (the communication), making a copy of the traffic, and forwarding the traffic locally or remotely to a pre-selected location (e.g., black box of the vehicle, datacenter of a manufacturer, etc.). Any particular type or types of network traffic on vehicle subsystems can be spanned and further analysis performed. For example, if a manufacturer is concerned about a particular type of communication under particular conditions, these types of communications under these types of conditions may be monitored individually by packets. In a specific example, central hub 70 could forward to a manufacturer's datacenter a copy of all packets from bus subsystem A to bus subsystem B of a vehicle whenever the vehicle reaches a predetermined speed (e.g., 50 mi/hr). Thus, the manufacturer could then perform more detailed analysis of the internal message flows during the particular conditions. Copies of the messages may be sent to the manufacturer datacenter by utilizing an uplink to the Internet from OBU 30. In one scenario, a manufacturer application may be initiated on OBU 30 to establish a network session with the manufacturer's datacenter using a VSIM stored on OBU 30 for the manufacturer. Once the network session is established, the application can then send copies of the desired communications to the manufacturer datacenter.

Turning to FIG. 19, a simplified flowchart illustrates a flow corresponding to firewall policy module 702 for updating, if authorized, firewall policies of central hub 70. In one embodiment, firewall policy flow 1900 begins at 1902 where an agent is attempting to update the firewall (security) policies. A determination is made at 1904 as to whether the update is being attempted via local access. If the access is not local, then a determination is made at 1906 as to whether the agent's identity is known (e.g., if the agent has an identity profile on OBU 30). In one embodiment, there could be only one specific user ID/agent ID that uniquely identifies the manufacturer allowed to perform such updates. This user ID/agent ID could be stored in an identity profile on OBU 30 or in any other suitable memory location. If the agent's identity is unknown, then access to firewall policies database 712 is denied at 1908 and flow 1900 ends. If the identity is known, however, (e.g., identity is vehicle manufacturer), then the identity of the update agent is authenticated at 1910. Authentication may be performed with some type of security credentials including, for example, credentials provided in an identity profile of the agent. After authentication is performed, a determination is made at 1912 as to whether the agent is enabled (or authorized) to perform updates to firewall policies. If the agent is not enabled, then access to firewall policies database 712 is denied at 1914 and flow 1900 ends.

If the agent is enabled to perform updates as determined at 1912, or if the access to OBU 30 is local as determined at 1904, then the agent uploads updated firewall policies at 1916. At 1918 the integrity and correctness of the new firewall policies may be verified. After verification, at 1920, the security rules of firewall policies database 712 are replaced with the updated security rules uploaded by the agent.

If the update is being performed locally, as determined at 1904, firewall policy flow 1900 assumes that the agent attempting to update the firewall policies is already authenticated to the vehicle. It will be apparent, however, that appropriate authentication can be performed to determine whether an agent who is locally accessing OBU 30 (and central hub 70) is authorized to perform such updates, and that any unauthorized agents can be denied access to firewall policies database 712.

Turning to FIG. 20, a simplified flowchart illustrates a flow corresponding to access and logging module 704 for controlling communication between a source and destination in communication system 10, and for logging events associated with such communications. An access and logging flow 2000 may begin at 2002 where a message M (or communication) from source address S on interface S.if to destination address D on interface D.if is received by central hub 70. A determination is made at 2004 as to whether communication from S.if to D.if is permitted. The determination may be made by evaluating relevant security rules in firewall policies database 712. If communication is not permitted, then the communication event (i.e., the message) can be recorded at 2014 in traffic log 714, and message M can be dropped. For example, if a WiFi adapter of OBU 30 is not permitted to talk to a CAN bus of the vehicle, then the message M from the WiFi adapter is dropped at 2016. Thus, in this example, nothing from the WiFi interface, which can be a less secure network connection, is allowed to access the CAN subsystems 720 and 724.

If it is determined at 2004 that communication is permitted between the source and destination interfaces, then a determination is made at 2006 as to whether communication is permitted between the source address and the destination address. The source and destination addresses may uniquely specify a node (or an identity) such as, for example, the address of an iPad within the vehicle and connected to OBU 30 via a WiFi interface on OBU 30. Other addresses could include a unique address of a dashboard on a specific network such as LIN subsystem 726, a unique address for brakes on a specific network such as Flexray 730. This determination of whether the communication is permitted may be made by evaluating relevant security rules in firewall policies database 712. If communications are not permitted from the source address to the destination address, then the communication event can be logged at 2014 and message M can be dropped at 2016.

If it is determined at 2006 that the communication is permitted between the source address and the destination address, then a determination is made at 2008 as to whether communication is permitted between an application process associated with the source address and an application process associated with the destination address (or simply the destination address if there is no corresponding application). Thus, the firewall policies can be implemented to control traffic between different applications of machine devices or OBU 30, or between an application and a machine device, where applications are inclusive of applications that run on different bus subsystems and applications that run on OBU 30.

Particular applications that are exchanging information can be identified and access control can be applied as indicated by corresponding firewall policies. For example, application ID X associated with a source address of a message may be permitted to communicate with a destination address of the message, but application ID Y from the same source address may not be permitted to communicate with the same destination address. In a specific illustration, an authorized manufacturer application on OBU 30 may be permitted to read vehicle diagnostics or other vehicle data (e.g., current speed, rpm, etc.) from machine devices accessible through the bus subsystems, but no other applications on OBU 30 may have similar permissions. In another illustration, firewall policies may specify whether an application corresponding to a particular sensor is permitted to talk to another application. If a communication to a particular destination is not permitted from the application, then the communication event can be logged at 2014 and message M can be dropped at 2016. If, however, the communication from the application to the particular destination is permitted, then the event may be logged at 2010, and at 2012, message M is forwarded to the destination address on destination interface D.if.

A few types of access control and segregation are provided for illustration purposes. First, Flexray subsystem 730 and 732 that may control many crucial functions of a vehicle (e.g., driving, braking) may send communications through the Flexray collected from gas and brake pedals, a throttle, an engine, and the like. MOST subsystem 744 and 746 may send communications collected from a radio, a DVD/CD player, headphones, and the like. The communications from the Flexray and the MOST subsystems can be blocked at central hub 70 from communicating with each other based on appropriate security rules in firewall policies database 712. In another example, a manufacturer may have a network session established with OBU 30 through, for example, a secure 3G interface of OBU 30. If the manufacturer needs to read diagnostics from the vehicle internal network subsystems, then one or more security rules of the firewall policies could permit access to CAN buses 720, 722, and 724 when the source is the particular known manufacturer, and could prohibit access to CAN buses 720, 722, and 724 when the source is not the manufacturer and is external to the vehicle.

Figure 21:
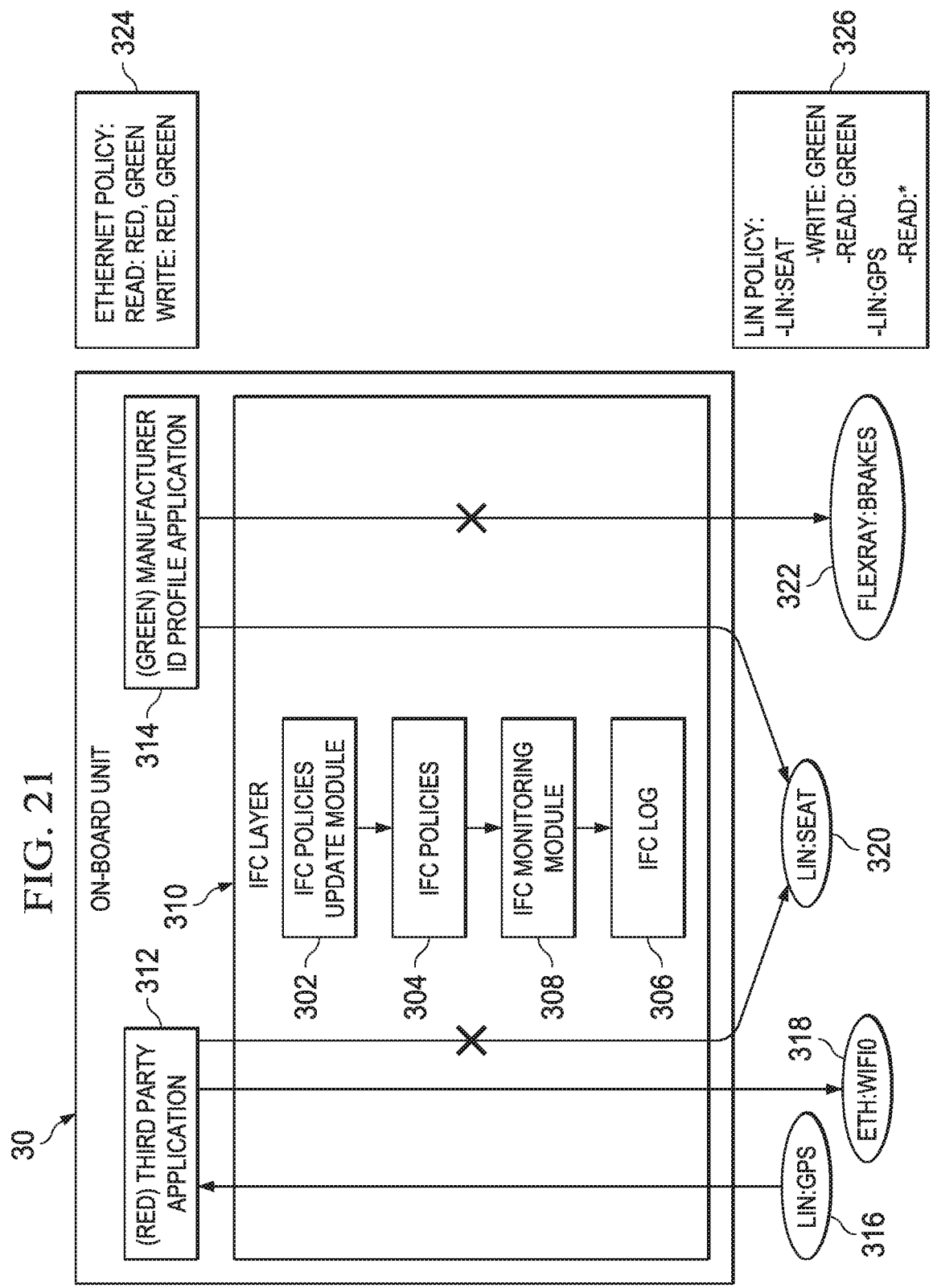
FIG. 21 is a simplified block diagram of an embodiment of an on-board unit (OBU) and exemplary vehicular subsystems in the communication system in accordance with the present disclosure.

Turning to FIGS. 21 through 24, embodiments are illustrated for remote, unified, policy driven information flow control (IFC) in communication system 10. FIG. 21 illustrates a block diagram of OBU 30, which may be part of vehicle 4 (not shown) with an information flow control (IFC) layer 310 configured to monitor and control information flow between applications on OBU 30 and end points of subsystems of vehicle 4, where the end points include, for example, machine devices (e.g., sensors, actuators, ECUs, etc.) and network interfaces (e.g., WiFi, 3G, etc.). In addition, IFC layer 310 may also monitor and control information flow between applications on OBU 30. In one embodiment, a central hub 70 (shown in FIG. 18) interconnects internal subsystems of vehicle 4, and can be suitably integrated with OBU 30 and IFC layer 310 or can be separately implemented from OBU 30 (as shown in FIG. 18) with suitable communication pathways to OBU 30. For ease of illustration, hardware elements, interfaces, and other features and components of OBU 30 are not all shown but have been previously described herein with reference to various figures including FIGS. 1 and 18.

IFC layer 310 of OBU 30 includes an IFC policies update module 302, an IFC monitoring module 308, an IFC policies database 304, and an IFC log database 306. IFC policies update module 302 and IFC policies database 304 facilitate providing, storing, and dynamically updating policies associated with the information flow control activities of IFC layer 310. IFC policies may be stored in IFC policies database 304, which may be stored in any suitable memory element (e.g., memory element 24 shown in FIG. 1). IFC policies can be stored in any suitable manner, including through database configs or metadata. In one embodiment, IFC policies database 304 is a mapping database that maps applications, end points, and associated data to corresponding IFC policies using application IDs, end point addresses, or any other suitable identifiers of the applications, end points, and associated data. Additionally, at least some IFC policies (or a portion of these policies) could be stored as part of an identity profile on OBU 30 when an IFC policy corresponds to an agent with an identity profile (e.g., a software agent with an identity profile) on OBU 30.

IFC log database 306 may be provided for logging events when a message is determined to have violated a policy. In other embodiments, all communication events (i.e., both allowed and denied messages) or any subset thereof may be logged to IFC log database 306. Conditions relevant to the communication events may also be logged such as, for example, time, source, receiver, and the like. IFC log database 306 may also be stored in any suitable memory element (e.g., memory element 24).

Information flow can occur when an application process attempts to access an end point or another application or vice versa (e.g., by sending a message). Examples of information flow between an application process and an end point include an application process reading data from a machine device or interface of the vehicle, an application process writing to a network interface of OBU 30, or an application process writing to a machine device of the vehicle to control the behavior of the vehicle. IFC monitoring module 308 can provide control of information flow between end points of subsystems in vehicle 4, between application processes associated with applications on OBU 30, and between end points and application processes of OBU 30. Using IFC policies, IFC monitoring module 308 can prevent an application process from accessing vehicle data that the application is not authorized to access and can prevent an application process from sending messages to a receiver that the application is not authorized to access. In alternative embodiments, IFC policies can be enforced by a monitoring device or module connected to each subsystem within the vehicle or within the applications running on vehicle ECUs.

OBU 30 may have multiple applications, including software agents and any associated applications, that can be executed on behalf of a manufacturer, other authorized entities, or a human agent (e.g., a driver, passengers) of the vehicle 4. Two exemplary types of applications that can exist on OBU 30 are shown in FIG. 21, including a third party application 312 and a manufacturer ID profile application 314. These are representative of applications that may be designed to collect data associated with the vehicle (e.g., sensor data, actuator data, etc.), to send data to the bus subsystems for controlling the behavior of the vehicle, to attempt to make network connections through a network interface, or to otherwise interact with the vehicle subsystems or other applications of OBU 30. Manufacturer ID profile application 314 represents an application installed in the vehicle by an entity such as a manufacturer. Manufacturer ID profile application 314 could be installed in OBU 30 during manufacturing, or uploaded to OBU remotely or locally sometime during the lifetime of the vehicle. Third party application 312 represents an application developed by a third party (not the manufacturer), which is not necessarily under the control of the manufacturer of the vehicle. For example, third party applications may be independently developed and then installed by an owner, driver, or passenger of the vehicle. Thus, many different applications may be available and, therefore, an OBU could be configured with any possible combination of available applications. Moreover, this configuration could change over time as new applications are installed and/or updated and as existing applications are removed from OBU 30.

Also shown in FIG. 21 are example end points, such as machine devices and interfaces of subsystems of the vehicle. These examples include a GPS 316 on a LIN subsystem, a WiFi interface 318 on an Ethernet subsystem, a seat actuator 320 on the LIN subsystem, and brake sensors 322 on a Flexray subsystem. The vehicular subsystems shown in FIG. 21 (i.e., LIN, Ethernet, and Flexray) have been previously described herein with reference to various figures, including FIGS. 1 and 18. It will be appreciated that the subsystems shown in FIG. 21 are for illustrative purposes only and any combination of the various subsystems including, but not limited to those described herein, may be provided in a vehicle based on particular needs and vehicle configuration.

In addition to controlling access to vehicle data and machine devices, a manufacturer of a vehicle might also need to control propagation of vehicle data that has been appropriately accessed. In one scenario, a user may install a third party application on OBU 30 to gather statistical information about gas consumption of the vehicle. This could be accomplished by connecting to various end points on the internal subsystems such as a fuel reader, a mileage reader, and a brake sensor. A different application installed on OBU 30 may have authorization to read GPS data in order to find coupons and advertisements relevant to the location of the vehicle. A manufacturer, however, may not wish to disclose a sum of GPS, speed, mileage, and brake information to a single application as this could give the application the ability to compute performance factors of the car that are otherwise considered classified and private manufacturer information. Accordingly, controlling the propagation of properly accessed vehicle information can prevent the sum of the information from being accessible to a single application.

In another example scenario, a manufacturer may not allow reading brake sensor data to any unauthorized application. A manufacturer logging service, however, may be designed to log brake sensor data, and thereby, have permission to read brake sensor data. If the logging service is allowed to share other information with third party applications or entities, then the manufacturer may need to control how the brake sensor data is propagated within the vehicle to prohibit its accidental leak from the logging service to unauthorized applications.

Applying flow control techniques enables manufacturers to control how vehicle data can be accessed by other applications and how it is propagated between different applications. Flow control policies (IFC policies) declare which principals have access to the data, and whether and to which other principals the data can be propagated. In one embodiment, all sources or owners of data, including machine devices and network interfaces within the vehicle are marked with flow control policies. Readers of the data, such as various applications designed to operate on OBU 30, and the data itself may also be marked with flow control policies. Moreover, flow control policies of an owner of data are inherited by its data. With all sources or owners of data, readers of data, and data itself having flow control policies, flow control techniques can be applied to control both access to and propagation of vehicle data.

In one example embodiment, each set of flow control policies includes an interaction specification and IFC tags for access level and message data of an application or end point (including applications of end points). An interaction specification for an application or end point can identify other applications with which communication is allowed and can also identify the types of access or communication (e.g., read to, write to, read from, write from) allowed, where 'write' can include adding, modifying, deleting, moving, cutting, or otherwise manipulating data. An example interaction specification for a first application on OBU 30 may indicate that the first application can perform read actions only to data of a machine device and a second application associated with the machine device cannot perform read or write actions to data associated with the first application.

In another example of an interaction specification, an identity profile application on OBU 30, which accesses identity profiles of agents associated with OBU 30, may allow read access to certain data within the identity profiles, but may not allow write access for a third party application on OBU 30. Such policies may be configured in order to protect the data of the identity profile on OBU 30 while allowing the third party application to read some identity profile information. This could be desirable so that the third party application can publish the identity profile information to a social media website, whereby the agent associated with the identity profile could potentially download it to another connected vehicle. In this example, flow control policies (e.g., interaction specification and IFC tags) for the third party application could be configured by the manufacturer as permitting read only access to data associated with the identity profile application and the flow control policies for the ID profile application could be configured as only permitting access to identity profile information by certain applications tagged as read only.

Generally, IFC tags can be used to verify a message from a source is legitimate and authorized. IFC tags of an application can be used to identify every message sent or received by a corresponding application process by propagating the IFC tags to the message. Thus, applications and end points that touch or process a message can be identified by evaluating the tags of the message. In addition, data can be tagged with an owner's IFC tags to protect the data. In one embodiment, different classes of applications that have similar behavior in terms of accessing machine devices and interfaces can be grouped together using one or more of the same tags. As a result, policies can be expressed for a group of applications as well as for individual applications by using tags. In one example implementation, a virtualized environment of OBU 30 could include a related group or class of virtualized applications (e.g., all manufacturer applications) and any application in this virtualized environment could be assigned the same set of flow control policies.

IFC tags may include, but are not limited to, secrecy, integrity, and ownership of data. Secrecy can include the level of access of a particular application, which can then be propagated to messages sent by a corresponding application process. For example, the secrecy tag could include appropriate levels of access for the application, as determined by the manufacturer, for accessing end points and other applications and any data associated with those end points and other applications. Secrecy tags propagated to data could provide information about a secrecy level of the data, which protects the data from being read by applications without an appropriate level of access. The integrity tag can offer the receiver of a message or data the ability to determine whether the message or data has been modified or otherwise altered after being verified by its source (e.g., if the message was intercepted by malicious software and modified for malicious purposes). Integrity tags could also provide information about which individual applications or classes of applications are allowed (or not allowed) to modify (or write) the data. The ownership tag can be used to verify that the message or data did in fact originate from the indicated source. Ownership tags can also be used to delegate ownership of data. New owners may have permission to modify data IFC tags, enabling them to share or modify the data at their discretion. In one example the source of a message or data can verify a message or data with a private key. The receiver of the message or data can verify the integrity and ownership of the message or data with a corresponding public key. Additionally, tags may also indicate encryption protocols to use for any messages or data associated with the tags.

In one embodiment, IFC policies database 304 could be preprogrammed with a set of flow control policies (e.g., interaction specifications and IFC tags) for access level and message data for each application and end point initially installed on OBU 30 during manufacturing. Subsequently, the manufacturer can dynamically download IFC policies when a new application is added to OBU 30 or when existing applications and end points need to receive updated IFC policies. When this occurs, the new or updated IFC policies can be propagated to appropriate entities within the vehicle. For example, IFC policies for end points or other applications identified in the updated IFC policies may be updated to reflect the policies downloaded by the manufacturer. In one specific example, if an updated IFC policy for an application removes the ability for the application to control (or write) to a particular end point, then the end point interaction specification may also be updated to reflect this change. Any private interfaces may have a default policy to deny information, unless the manufacturer adds a particular application or end point to an authorized reader group in the IFC tag of the interface.

FIG. 21 illustrates example policies and enforcement of those policies to information flow between applications 312 and 314 and end points 316, 318, 320, and 322. Although this example represents the tags by color, it will be apparent that this is for illustrative purposes and any suitable type of tag indicating a level of access and type of access could be used. Third party application 312 is tagged red and manufacturer ID profile application is tagged green. Ethernet policy 324 includes criteria for accessing the Internet via a WiFi interface 318 on OBU 30. The policy 324 allows any applications tagged red or green to both read and write to WiFi interface 318. A LIN policy 326 is a policy for a seat specific actuator and controller 320 and for a GPS 316. The LIN GPS policy allows any application or end point to read from GPS 316, but no applications or end points can write to GPS 316. The LIN seat policy indicates that read and write actions to the seat actuator and controller 320 are only allowed by applications tagged as green.

For purposes of illustration, assume the third party application 312 in FIG. 21 is a social media application that reads the sensor data of GPS 316 and publishes the GPS data to a social media website. It is important for both safety and privacy that the flow of information generated by this application is confined to data read from the GPS and does not affect any other sensors or actuators in the vehicle. The LIN GPS policy allows all applications and end points to read GPS sensor data. Therefore, IFC monitoring module 308 can intercept a message from third party application 312 (which is marked as red) and evaluate LIN policy 326 for GPS 316. Because LIN policy 326 for GPS 316 allows all applications to read GPS 316, IFC monitoring module 308 may forward the message to GPS 316, if the ownership and integrity of the message are verified, thereby allowing third party application 312 to read the GPS sensor data.

After third party application 312 gets the GPS data, it may attempt to write the data to WiFi interface 318, for purposes of uploading the information to the social media website. All messages (including the data from the GPS) coming from third party application 312 will be marked red. IFC monitoring module 308 can intercept the message from third party application 312 and evaluate the Ethernet policy 324. Because the Ethernet policy allows red applications to write to WiFi interface 318, IFC monitoring module 308 may forward the message and data to WiFi interface 318, if the ownership and integrity of the message are verified, thereby allowing third party application 312 to send the GPS data to the social media website.

If third party application 312 attempts to write to another end point for which it is not tagged as having write permissions the write message will be blocked, regardless of whether the write message was generated with malicious intent or by error. For example, if third party application 312, attempts to read or write to seat actuator and controller 320, IFC monitoring module can intercept the read/write message and evaluate LIN policy 326. Because the LIN seat rules allow only applications tagged green to read or write to seat actuator and controller 320, the read/write message from third party application 312 tagged red may be blocked or any other appropriate action may be taken. In addition, such an event may be logged in IFC log database 306.

In the other example shown, IFC monitoring module 308 can intercept a message to write to seat actuator and controller 320 from manufacturer ID profile application 314, which is tagged green. A manufacturer identity profile may contain a preconfigured seat position that manufacturer ID profile application 314 adjusts whenever the vehicle is started. The green tag is propagated to the message from the application. IFC monitoring module 308 intercepts the message, evaluates LIN policy 326, and allows the message, because green tagged applications are authorized to write to seat actuator and controller 320 per LIN policy 326. In one embodiment, the manufacturer identity profile may include default settings for a driver seat position, and an identity profile associated with a human agent may be used for driver seat settings whenever the human is driving the vehicle. Also in FIG. 21, no policies are indicated for brakes of Flexray subsystem. In one embodiment, an application or end point having no policies is assigned a default policy to deny access. Thus, in this example scenario, if manufacturer ID profile application 314 attempts to read or write to flexray brakes 322, IFC monitoring module 308 will deny access.

Figure 22:
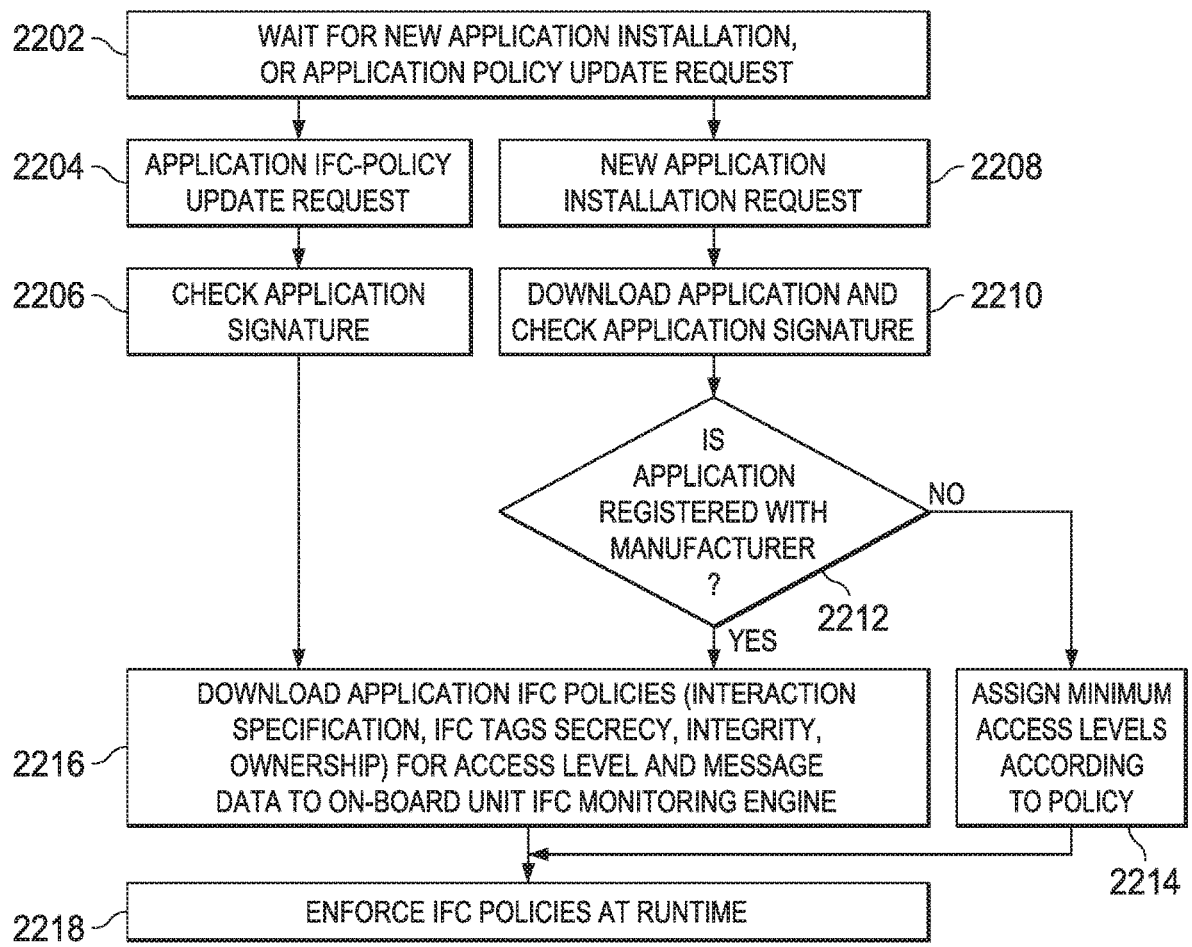
FIGS. 22-23 are simplified flowcharts associated with possible activities associated with the OBU of FIG. 21 in the communication system of the present disclosure.

Turning to FIG. 22, a simplified flowchart illustrates a flow corresponding to IFC policy module 302 for updating, if authorized, IFC policies of IFC policy database 304. In one embodiment, IFC policy update flow 2200 begins at 2202, waiting for a new application installation or an application policy update request. In one example, a new application request could result from a user attempting to download a new application onto OBU 30. In another example, an application policy update request could be initiated by a manufacturer who has new IFC policies for a particular third party or manufacturer application already installed on OBU 30. Also, OBU 30 could request policy updates from the manufacturer, for example, on a periodic basis. If an application IFC-policy update request is made at 2204 then the application signature is checked at 2206. The application signature is checked to ensure the correct application IFC-policies are being updated. At 2216, application IFC policies for access level and message data may be downloaded to OBU 30. In one example embodiment, the IFC policies include interaction specification and IFC tags for access level and message data. IFC tags may include, but are not limited to, secrecy, integrity, and ownership. The interaction specification and IFC tags may be updated in IFC policy database 304 and these IFC policies are enforced at runtime, as indicated at 2218.

With reference to 2208, if a new application installation request is made, then the new application is downloaded and an application signature is checked at 2210. The application may be downloaded from any accessible application source (e.g., third party developer, application provider, manufacturer, transportable storage device, in-vehicle mobile device, another vehicle with an OBU, etc.). A determination is made at 2212 as to whether the application is registered with the manufacturer. If the application is registered with the manufacturer (either as a manufacturer application or as a third party application), then at 2216 application IFC policies (e.g., interaction specification and IFC tags) for access level and message data may be downloaded to OBU 30 and added to IFC policy database 304. If the application is not registered with the manufacturer, then in one embodiment, the application could be blocked from being downloaded to OBU 30. In another embodiment shown in FIG. 22, however, the unregistered application could be downloaded to OBU 30 and assigned minimum access levels according to policy at 2214. The IFC policies are enforced at runtime, as indicated at 2218.

Figure 23:
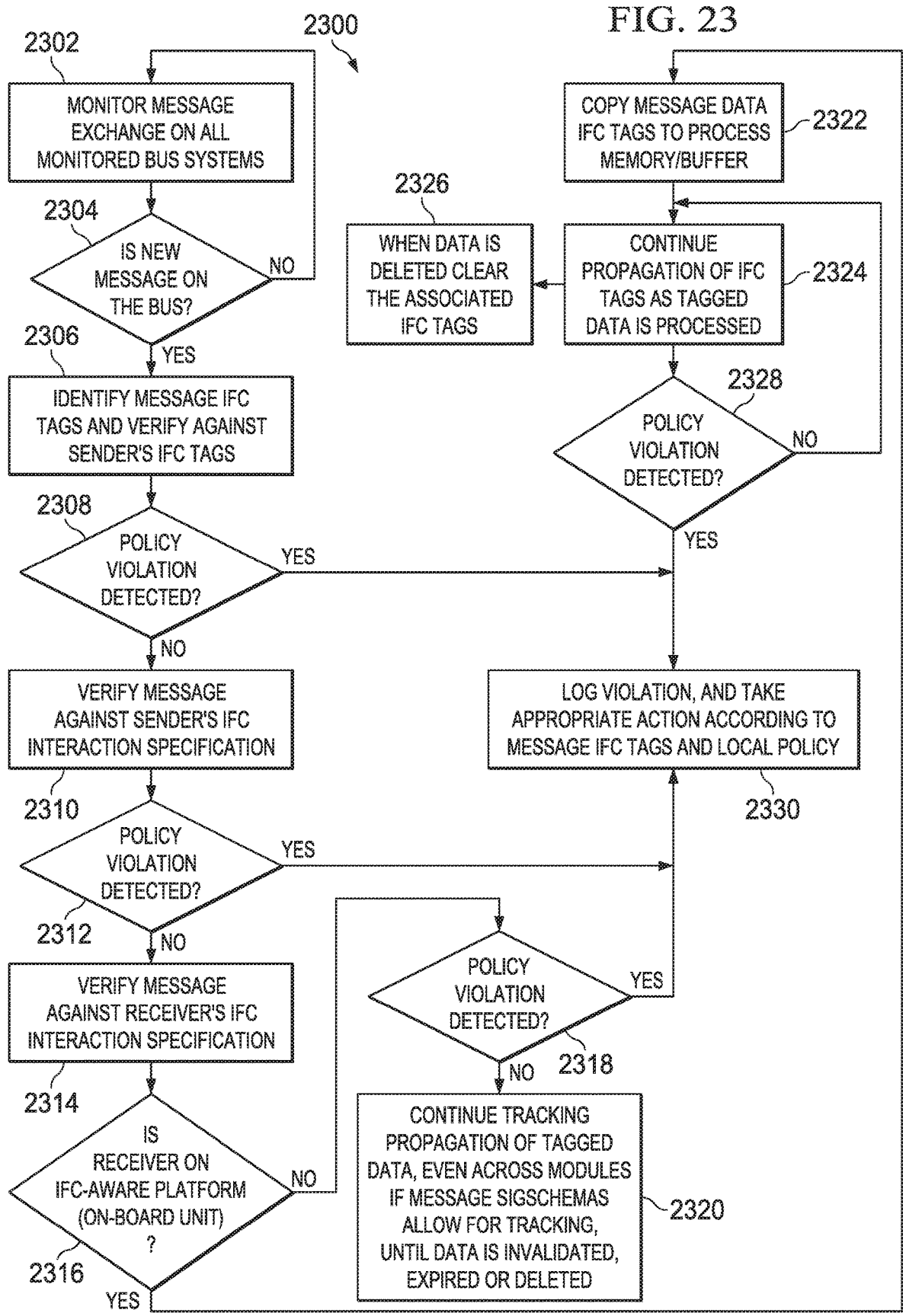

Turning to FIG. 23, a simplified flowchart illustrates a flow corresponding to IFC monitoring module 308 for controlling information flow across vehicle applications, machine devices, and interfaces in communication system 10. An information flow control flow 2300 may begin at 2302 where message exchanges are monitored on all monitored bus subsystems. A determination is made at 2304 as to whether a new message is on one of the bus subsystems. If no new messages are detected, then the bus subsystems continue to be monitored at 2302.

If a new message is detected at 2304, however, then message IFC tags are identified and verified against the sender's IFC tags at 2306. This verification can be done to ensure the sender (e.g., an application process of an application) has permission to propagate data in the message. For example, if an application is the owner of the data, then the application may have permission to propagate the data and to give read and write access permissions to other applications. An application that has only read access to the data, however, may not have permission to propagate the data to applications that do not have permission to read. Additionally, an application that has permission to read but not write, may not propagate a modified version of the data. The verification in 2306 can also be done to determine whether the message and any associated data actually originated from the sender and whether the message or any associated data was modified or otherwise altered after being sent by the sender. A determination is made at 2308 as to whether a policy violation related to the message and sender IFC tags is detected. If a policy violation is detected at 2308, then the violation may be logged in IFC log database 306 and appropriate action may taken at 2330 according to message IFC tags and local policy (e.g., send an alert to the driver, block message, delete message data, etc.).

If a policy violation is not detected at 2308, however, then the message is verified against the sender's IFC interaction specification. A determination is made at 2312 as to whether a policy violation related to the sender's interaction specification is detected. This verification is performed to ensure that the sender is allowed to send this type of message (e.g., read sensor on LIN bus, write to actuator on Flexray, write to Ethernet WiFi interface, etc.). If a policy violation is detected at 2312, then the violation may be logged in IFC log database 306 and appropriate action may be taken at 2330 according to message IFC tags and local policy. If a policy violation is not detected at 2312, then the message is verified against the receiver's IFC interaction specification at 2314. A determination is made at 2316 as to whether the receiver of the message is on an IFC-aware platform (e.g., IFC-aware OBU). If the platform is not IFC-aware, then a determination is made at 2318 as to whether a policy violation related to the receiver's interaction specification is detected. If a policy violation is detected at 2318, then the violation may be logged in IFC log database 306 and appropriate action may be taken at 2330 according to message IFC tags and local policy.

If a policy violation is not detected at 2318, then the data may be tracked, but policies are not enforced. Thus, for a platform that is not IFC-aware, the operating system can be enabled to be IFC-aware. If the operating system is virtualized, then the platform underneath the virtualization can be enabled to be IFC-aware. Once the platform is enabled to be IFC-aware, propagation of tagged data may continue to be tracked at 2320, across modules, if a message signature schema allows for tracking, until the data is invalidated, expired, or deleted.

If the receiver is determined to be on an IFC-aware platform at 2316, then the IFC tags of message data being received by an application process may be copied to a process memory or buffer at 2322. Propagation of IFC tags may occur at 2324 as tagged data is processed (e.g., copying data, sending data, modifying data, or otherwise manipulating data). A determination is made at 2328 as to whether a policy violation has been detected. This verification is performed to ensure that the receiver's interaction specification permits the particular type (e.g., a read request, a write request, etc.) of the message received, that the message has the appropriate access level required by the receiver, and that propagation of tagged data is permitted. If a policy violation is detected at 2328 when processing the tagged data, then the violation may be logged in IFC log database 306 and appropriate action may be taken at 2330 according to message IFC tags and local policy. If a policy violation is not detected at 2328 then propagation of IFC tags may continue as tagged data is processed and tagged data may continue to be checked for policy violations. Once the tagged data is deleted, then the associated IFC tags in the process memory or buffer may be cleared at 2326.

Figure 24:
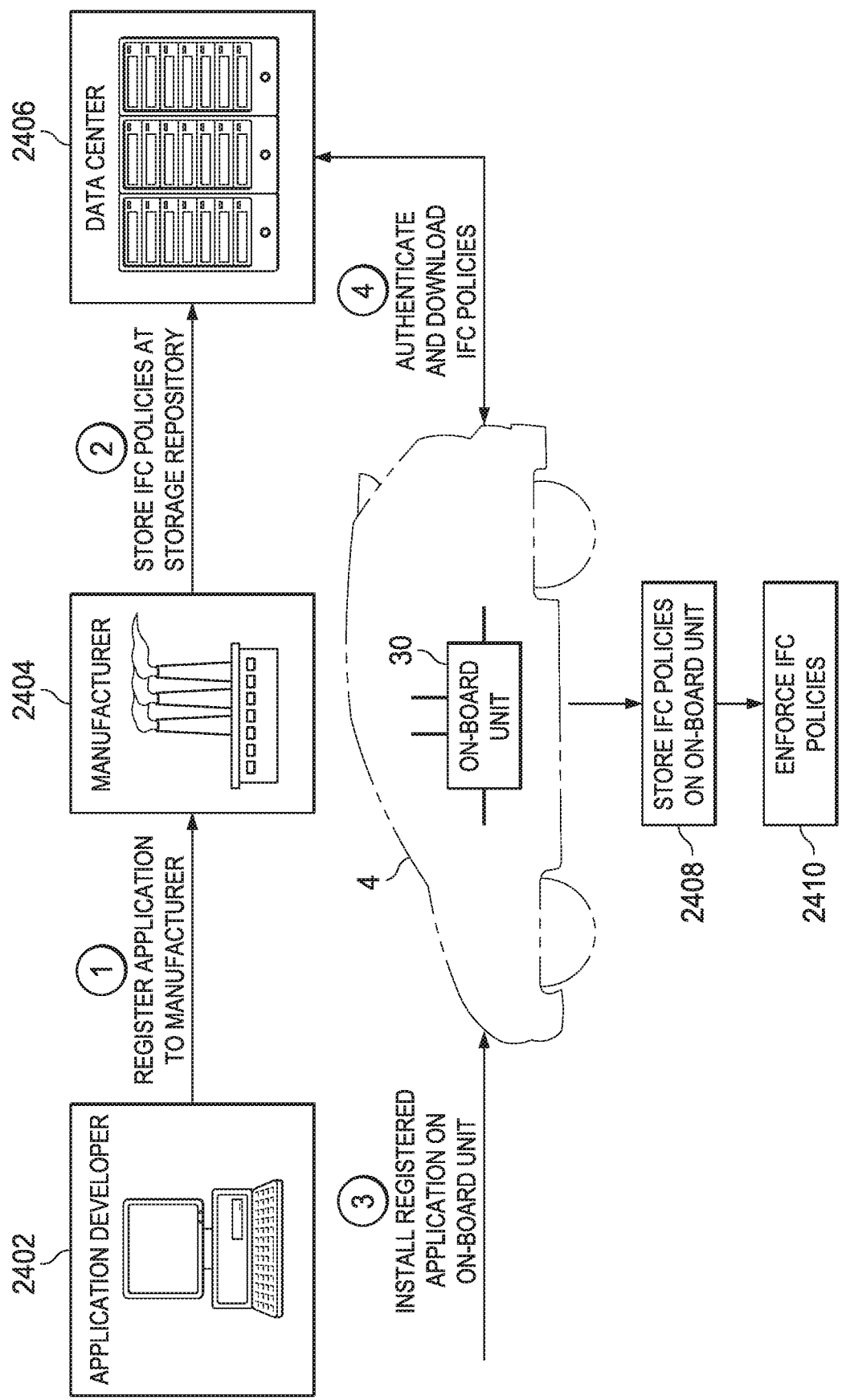
FIG. 24 is a simplified flow illustrating the enabling of information flow control in a vehicular environment in accordance with the present disclosure.

With reference to FIG. 24, a simplified flow diagram illustrates how information flow control can be enabled in a vehicular environment for third party applications. In one example scenario, a third party application developer 2402 can create an application that can be used in a vehicular environment. In one embodiment, unknown applications that are not registered with the manufacturer could be handled in accordance with a policy defined in OBU 30. One example policy could prohibit all unregistered applications from being installed on OBU 30. Another example policy could allow installation of unregistered applications and set a minimum level of access for that application. Numerous other types of policies could be configured to control how an unregistered application is handled.

At step 1 of FIG. 24, the application developer 2402 can make a request to a vehicle manufacturer 2404 to register the application. Vehicle manufacturer 2404 can evaluate the application and assign appropriate IFC policies to each application and can potentially update other tags with new application IFC policies. In addition, vehicle manufacturer 2404 and application developer 2402 can negotiate a contractual arrangement to control propagation of information that has been released to a third party. For example, the interaction specification of the application (e.g., what messages can be sent, what messages can be received, what data from the vehicle is allowed to propagate, etc.) can be negotiated and enforced via a contract between manufacturer 2404 and third party application developer 2402. Thus, in one scenario, application developer 2402 may be bound contractually not to release all of the information made available to the application from the vehicle.

Once manufacturer 2404 has assigned appropriate IFC policies to the application, at step 2, the IFC policies can be stored at a data center 2406 (e.g., manufacturer data center or any other authorized data center), which can be accessed by vehicles of the manufacturer through various networks such as the Internet. At step 3, a user (e.g., owner, passenger, driver, etc.) of a vehicle may install the application created by the third party application developer 2402. Installing the application could be accomplished numerous ways including, for example, locally downloading with a transportable memory element, remotely downloading through access to external networks (e.g., the Internet), or downloading through access to an in-vehicle device or to another vehicle. During installation, a signature of the application may be checked to determine whether the application is registered with manufacturer 2404. In one embodiment, the installation can be blocked if the application is not registered. If the application is registered, then at step 4 the OBU can connect to the manufacturer's data center 2406, and after authenticating to data center 2406, can download appropriate IFC policies for the new application. After the IFC policies are downloaded to OBU 30, they can be stored in OBU 30 and enforced at runtime of the application as indicated at 2408 and 2410, respectively.

IFC policies may also be updated at any suitable time by the manufacturer. Thus step 4 of FIG. 24 could be initiated at other appropriate times. For example, if an application was previously installed on OBU 30 and appropriate IFC policies were downloaded during installation, additional or updated policies may be necessary at a later time during the lifetime of the vehicle (e.g., if the manufacturer/application developer contract changes, if the application is upgraded with new functionality, if the manufacturer determines a problem with existing policies, etc.). In this scenario, OBU 30 can authenticate to the data center, the application signature can be checked again, and the updated IFC policies can be downloaded to OBU 30.

In certain implementations and numerous examples provided herein, vehicle 4 is described with reference to an automobile. Communication system 10, however, is not limited to automobiles, but can be applied to a myriad of other types of vehicles (e.g., airplanes, boats, trains, etc.). It will be appreciated that the broad teachings disclosed herein are intended to include any type of vehicle used to move from one location to another location, including vehicles that are not designed to transport humans.

Numerous embodiments have been shown and described herein for on-board unit (OBU) 30 including embodiments to achieve wireless interface selection, seamless mobility, access control and segregation of vehicular subsystems, and information flow control between machine devices and vehicular applications. OBU 30 may be configured to achieve any one or more of these activities using any embodiment described herein or any appropriate combination of such embodiments.

In certain example implementations, at least some portions of enabling wireless interface selection, seamless mobility, and communication and access control activities outlined herein may be implemented in software. This could be inclusive of software provided in connection manager 60, mobility manager 70, user module 85, traffic processor 34, and IFC layer 310 of OBU 30 and in other modules and elements such as modules provided in controller 90 and in central hub 70 (which could be suitably integrated in OBU 30). These elements and/or modules can cooperate with each other in order to perform the wireless interface selection, seamless mobility, and communication and access control activities as discussed herein. In other embodiments, one or more of these features may be implemented in hardware, provided external to these elements, or consolidated in any appropriate manner. For example, some of the processors associated with the various elements may be removed, or otherwise consolidated such that a single processor and a single memory location are responsible for certain activities. In a general sense, the arrangements depicted in FIGURES provided herein may be more logical in their representations, whereas a physical architecture may include various permutations, combinations, and/or hybrids of these elements.

Any of the memory items discussed herein should be construed as being encompassed within the broad term 'memory element.' Similarly, any of the potential processing elements, modules, and machines described in this Specification should be construed as being encompassed within the broad term 'processor.' Furthermore, OBU 30, and each separate component of communication system 10, may include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method comprising:
   intercepting a message in a network environment of a vehicle, the message being sent from a source to a receiver;
   evaluating one or more predefined policies to determine whether the source is permitted to communicate with the receiver, the one or more predefined policies including security rules for network communications with a plurality of subsystems in the network environment, wherein evaluating the one or more predefined policies includes:
      evaluating a security rule related to the network communications between a first bus system of the source from among the plurality of subsystems and a second bus system of the receiver from among the plurality of subsystems, and
      evaluating a source address of the source and a destination address of the receiver and different buses that are communicating for transmitting the message; and
   blocking the message if the source is not permitted to communicate with the receiver.

2. The method of claim 1, wherein the source is not permitted to communicate with the receiver if the one or more predefined policies indicate that a first interface associated with the source is not permitted to communicate with a second interface associated with the receiver.

3. The method of claim 1, wherein the source is not permitted to communicate with the receiver if the one or more predefined policies indicate that a first network address associated with the source is not permitted to communicate with a second network address associated with the receiver.

4. The method of claim 1, wherein the source is not permitted to communicate with the receiver if the one or more predefined policies indicate that a first application process associated with the source is not permitted to communicate with a second application process associated with the receiver.

5. The method of claim 1, wherein the source is not permitted to communicate with the receiver if the one or more predefined policies indicate that an application process associated with the source is not permitted to communicate with a network address associated with the receiver.

6. The method of claim 1, further comprising:
   logging an event representing the message.

7. The method of claim 1, further comprising:
   establishing a network connection from an on-board unit (OBU) of the vehicle to a remote node;
   authenticating the OBU to the remote node; and
   downloading updated policies to the OBU from the remote node, the updated policies including updated security rules for the network communications with the plurality of subsystems; and
   updating the predefined one or more policies with the updated policies.

8. The method of claim 1, wherein the source is a first machine device on a first subsystem in the network environment of the vehicle, wherein the receiver is a second machine device on a second subsystem in the network environment of the vehicle.

9. The method of claim 1, wherein the source is a machine device on a first subsystem in the network environment of the vehicle, wherein the receiver is a network interface of an on-board unit (OBU) of the vehicle.

10. The method of claim 1, wherein the source is an application process on an on-board unit (OBU) of the vehicle, wherein the receiver is a machine device on a first subsystem in the network environment of the vehicle.

11. The method of claim 1, wherein intercepting the message, evaluating the one or more predefined policies, and blocking the message are performed by one or more hardware elements of the plurality of subsystems.

12. The method of claim 1, wherein the predefined policies include the security rules for a specific subset of vehicles manufactured by a vehicle manufacturer.

13. The method of claim 1, wherein evaluating the one or more predefined policies includes:
   evaluating a type of the message to be communicated between the first bus system and the second bus system.

14. An apparatus, comprising:
   a communication interface that enables network communications; a processor; and
   a memory storing data and instructions executable by the processor, wherein the processor is configured to execute the instructions to:
      intercept a message in a network environment of a vehicle, the message being sent from a source to a receiver;
      evaluate one or more predefined policies to determine whether the source is permitted to communicate with the receiver, the one or more predefined policies including security rules for the network communications with a plurality of subsystems in the network environment, wherein the processor is configured to evaluate the one or more predefined policies by:
         evaluating a security rule related to the network communications between a first bus system of the source from among the plurality of subsystems and a second bus system of the receiver from among the plurality of subsystems, and
         evaluating a source address of the source and a destination address of the receiver and different buses that are communicating for transmitting the message; and
      block the message if the source is not permitted to communicate with the receiver.

15. The apparatus of claim 14, wherein the source is not permitted to communicate with the receiver if the one or more predefined policies indicate that a first interface associated with the source is not permitted to communicate with a second interface associated with the receiver.

16. The apparatus of claim 14, wherein the source is not permitted to communicate with the receiver if the one or more predefined policies indicate that a first network address associated with the source is not permitted to communicate with a second network address associated with the receiver.

17. The apparatus of claim 14, wherein the source is not permitted to communicate with the receiver if the one or more predefined policies indicate that a first application process associated with the source is not permitted to communicate with a second application process associated with the receiver.

18. A non-transitory computer-readable storage medium encoded with software comprising computer executable instructions which, when executed by a processor, cause the processor to:
   intercept a message in a network environment of a vehicle, the message being sent from a source to a receiver;
   evaluate one or more predefined policies to determine whether the source is permitted to communicate with the receiver, the one or more predefined policies including security rules for network communications with a plurality of subsystems in the network environment, wherein the instructions cause the processor to evaluate the one or more predefined policies by:
  evaluating a security rule related to the network communications between a first bus system of the source from among the plurality of subsystems and a second bus system of the receiver from among the plurality of subsystems, and
  evaluating a source address of the source and a destination address of the receiver and different buses that are communicating for transmitting the message; and
block the message if the source is not permitted to communicate with the receiver.

19. The non-transitory computer-readable storage medium of claim 18, wherein the instructions cause the processor to perform an additional operation including:
  storing the security rules in a firewall policy database, wherein at least one of the security rules is preprogrammed by a manufacturer of the vehicle and the security rules include a local interconnect network (LIN) specific rule.

20. The non-transitory computer-readable medium of claim 18, wherein the instructions cause the processor to evaluate the one or more predefined policies by:
  evaluating whether communication is permitted between a first application process associated with the source and a second application process associated with the receiver.

* * * * *